US010621820B2

(12) United States Patent
Arnone et al.

(10) Patent No.: US 10,621,820 B2
(45) Date of Patent: Apr. 14, 2020

(54) INTERMEDIATE IN-GAME RESOURCE HYBRID GAMING SYSTEM

(71) Applicant: Gamblit Gaming, LLC, Glendale, CA (US)

(72) Inventors: Miles Arnone, Sherborn, MA (US); Frank Cire, Pasadena, CA (US); Clifford Kaylin, Los Angeles, CA (US); Scott Shimmin, Vista, CA (US)

(73) Assignee: Gamblit Gaming, LLC, Glendale, CA (US)

(*) Notice: Subject to any disclaimer, the term of this patent is extended or adjusted under 35 U.S.C. 154(b) by 0 days.

(21) Appl. No.: 15/920,388

(22) Filed: Mar. 13, 2018

(65) Prior Publication Data

US 2018/0308311 A1 Oct. 25, 2018

Related U.S. Application Data

(63) Continuation of application No. 15/287,129, filed on Oct. 6, 2016, now Pat. No. 9,916,721, which is a continuation of application No. 14/815,774, filed on Jul. 31, 2015, now Pat. No. 9,483,165, which is a continuation of application No. PCT/US2014/014112, filed on Jan. 31, 2014.

(60) Provisional application No. 61/790,155, filed on Mar. 15, 2013, provisional application No. 61/759,296, filed on Jan. 31, 2013.

(51) Int. Cl.
*G07F 17/32* (2006.01)
*G06F 3/0484* (2013.01)

(52) U.S. Cl.
CPC ...... *G07F 17/3225* (2013.01); *G06F 3/04842* (2013.01); *G07F 17/32* (2013.01); *G07F 17/3244* (2013.01); *G07F 17/3286* (2013.01); *G07F 17/3295* (2013.01)

(58) Field of Classification Search
None
See application file for complete search history.

(56) References Cited

U.S. PATENT DOCUMENTS

| | | | |
|---|---|---|---|
| 5,413,357 | A | 5/1995 | Schulze et al. |
| 5,718,429 | A | 2/1998 | Keller |
| 5,785,592 | A | 7/1998 | Jacobsen |
| 5,853,324 | A | 12/1998 | Kami et al. |
| 5,963,745 | A | 10/1999 | Collins et al. |

(Continued)

FOREIGN PATENT DOCUMENTS

JP 20040097610 A1 5/2004

OTHER PUBLICATIONS

U.S. Appl. No. 14/815,764 Arnone, et al. filed Jul. 31, 2015.

(Continued)

*Primary Examiner* — Ronald Laneau
(74) *Attorney, Agent, or Firm* — Frank Cire; Caitlyn Ross

(57) ABSTRACT

An electronic gaming machine is provided. In an entertainment game, utilization of an entertainment game element by a player may trigger a wager in accordance with a gambling proposition. Based on the outcome of the wager, the player may be awarded an intermediate in-game resource for use in the entertainment game. The intermediate in-game resource may be used by the player to acquire an entertainment game resource or element that may be used to enhance the player's play of the entertainment game.

18 Claims, 29 Drawing Sheets

Intermediate In-Game Resource Hybrid Game 128
RWE 102
RW game OS 104
P/RNG 106
Table Ln-RWC 108
RWC meters 110
GWE 112
GW game OS 114
Table Ln-GWC 116
GWC meters 118
Intermediate In-Game Resource Module 119
ESE 120
Gambling game user interface 122
Entertainment game user interface 124

(56) References Cited

U.S. PATENT DOCUMENTS 6,050,895 A 4/2000 Luciano
6,165,071 A 12/2000 Weiss
6,227,974 B1 5/2001 Eilat
6,267,669 B1 7/2001 Luciano
6,302,791 B1 10/2001 Frohm et al.
6,685,563 B1 2/2004 Meekins et al.
6,712,693 B1 3/2004 Hettinger
6,761,632 B2 7/2004 Bansemer et al.
6,761,633 B2 7/2004 Riendeau
6,764,397 B1 7/2004 Robb
6,811,482 B2 11/2004 Letovsky
7,118,105 B2 10/2006 Benevento
7,294,058 B1 11/2007 Slomiany
7,326,115 B2 2/2008 Baerlocher
7,361,091 B2 4/2008 Letovsky
7,517,282 B1 4/2009 Pryor
7,575,517 B2 8/2009 Parham et al.
7,682,239 B2 3/2010 Friedman et al.
7,720,733 B2 5/2010 Jung
7,753,770 B2 7/2010 Walker et al.
7,753,790 B2 7/2010 Nguyen
7,766,742 B2 8/2010 Bennett et al.
7,775,885 B2 8/2010 Van Luchene
7,798,896 B2 9/2010 Katz
7,828,657 B2 11/2010 Booth
7,917,371 B2 3/2011 Jung et al.
7,931,531 B2 4/2011 Oberberger
7,938,727 B1 5/2011 Konkle
7,950,993 B2 5/2011 Oberberger
7,967,674 B2 6/2011 Baerlocher
7,980,948 B2 7/2011 Rowe
7,996,264 B2 8/2011 Kusumoto et al.
8,012,023 B2 9/2011 Gates
8,047,908 B2 11/2011 Walker
8,047,915 B2 11/2011 Lyle
8,060,829 B2 11/2011 Jung et al.
8,075,383 B2 12/2011 Friedman et al.
8,087,999 B2 1/2012 Oberberger
8,113,938 B2 2/2012 Friedman et al.
8,118,654 B1 2/2012 Nicolas
8,128,487 B2 3/2012 Hamilton et al.
8,135,648 B2 3/2012 Oram
8,137,193 B1 3/2012 Kelly et al.
8,142,272 B2 3/2012 Walker
8,157,653 B2 4/2012 Buhr
8,167,695 B2 5/2012 Rowe
8,167,699 B2 5/2012 Inamura
8,177,628 B2 5/2012 Manning
8,182,338 B2 5/2012 Thomas
8,182,339 B2 5/2012 Anderson
8,187,068 B2 5/2012 Slomiany
8,206,210 B2 6/2012 Walker
8,308,544 B2 11/2012 Friedman
8,430,735 B2 4/2013 Oberberger
8,475,266 B2 7/2013 Arnone
8,480,470 B2 7/2013 Napolitano et al.
8,485,893 B2 7/2013 Rowe
8,622,809 B1 1/2014 Arora et al.
8,864,564 B2 10/2014 Oberberger
8,998,694 B2 4/2015 Rowe
9,070,257 B1 6/2015 Scalise
9,092,946 B2 7/2015 Rowe
9,111,412 B2 8/2015 Rowe
9,454,873 B2 9/2016 Rowe
2001/0004609 A1 6/2001 Walker et al.
2001/0019965 A1 9/2001 Ochi
2002/0022509 A1 2/2002 Nicastro et al.
2002/0090990 A1 7/2002 Joshi et al.
2002/0175471 A1 11/2002 Faith
2003/0060286 A1 3/2003 Walker et al.
2003/0119576 A1 6/2003 McClintic et al.
2003/0139214 A1 7/2003 Wolf et al.
2003/0171149 A1 9/2003 Rothschild
2003/0204565 A1 10/2003 Guo et al.
2003/0211879 A1 11/2003 Englman
2004/0092313 A1 5/2004 Saito et al.
2004/0102238 A1 5/2004 Taylor
2004/0121839 A1 6/2004 Webb
2004/0225387 A1 11/2004 Smith
2005/0003878 A1 1/2005 Updike
2005/0096124 A1 5/2005 Stronach
2005/0116411 A1 6/2005 Herrmann et al.
2005/0192087 A1 9/2005 Friedman et al.
2005/0233791 A1 10/2005 Kane
2005/0233806 A1 10/2005 Kane et al.
2005/0239538 A1 10/2005 Dixon
2005/0269778 A1 12/2005 Samberg
2005/0288101 A1 12/2005 Lockton et al.
2006/0003823 A1 1/2006 Zhang
2006/0003830 A1 1/2006 Walker et al.
2006/0035696 A1 2/2006 Walker
2006/0040735 A1 2/2006 Baerlocher
2006/0068913 A1 3/2006 Walker et al.
2006/0084499 A1 4/2006 Moshal
2006/0084505 A1 4/2006 Yoseloff
2006/0135250 A1 6/2006 Rossides
2006/0154710 A1 7/2006 Serafat
2006/0166729 A1 7/2006 Saffari et al.
2006/0189371 A1 8/2006 Walker et al.
2006/0223611 A1 10/2006 Baerlocher
2006/0234791 A1 10/2006 Nguyen et al.
2006/0240890 A1 10/2006 Walker
2006/0246403 A1 11/2006 Monpouet et al.
2006/0258433 A1 11/2006 Finocchio et al.
2007/0026924 A1 2/2007 Taylor
2007/0035548 A1 2/2007 Jung et al.
2007/0038559 A1 2/2007 Jung et al.
2007/0064074 A1 3/2007 Silverbrook et al.
2007/0087799 A1 4/2007 Van Luchene
2007/0093299 A1 4/2007 Bergeron
2007/0099696 A1 5/2007 Nguyen et al.
2007/0117641 A1 5/2007 Walker et al.
2007/0129149 A1 6/2007 Walker
2007/0142108 A1 6/2007 Linard
2007/0156509 A1 7/2007 Jung et al.
2007/0167212 A1 7/2007 Nguyen
2007/0167239 A1 7/2007 O'Rourke
2007/0173311 A1 7/2007 Morrow et al.
2007/0191104 A1 8/2007 Van Luchene
2007/0202941 A1 8/2007 Miltenberger
2007/0203828 A1 8/2007 Jung et al.
2007/0207847 A1 9/2007 Thomas
2007/0259717 A1 11/2007 Mattice
2007/0293306 A1 12/2007 Nee et al.
2008/0004107 A1 1/2008 Nguyen et al.
2008/0014835 A1 1/2008 Weston et al.
2008/0015004 A1 1/2008 Gatto et al.
2008/0064488 A1 3/2008 Oh
2008/0070659 A1 3/2008 Naicker
2008/0070690 A1 3/2008 Van Luchene
2008/0070702 A1 3/2008 Kaminkow
2008/0096665 A1 4/2008 Cohen
2008/0108406 A1 5/2008 Oberberger
2008/0108425 A1 5/2008 Oberberger
2008/0113704 A1 5/2008 Jackson
2008/0119283 A1 5/2008 Baerlocher
2008/0146308 A1 6/2008 Okada
2008/0161081 A1 7/2008 Berman
2008/0176619 A1 7/2008 Kelly
2008/0191418 A1 8/2008 Lutnick et al.
2008/0195481 A1 8/2008 Lutnick
2008/0248850 A1 10/2008 Schugar
2008/0254893 A1 10/2008 Patel
2008/0274796 A1 11/2008 Lube
2008/0274798 A1 11/2008 Walker et al.
2008/0305856 A1* 12/2008 Walker .................... G07F 17/32 463/25
2008/0311980 A1 12/2008 Cannon
2008/0318668 A1 12/2008 Ching
2009/0011827 A1 1/2009 Englman
2009/0023489 A1 1/2009 Toneguzzo
2009/0023492 A1 1/2009 Erfanian
2009/0061974 A1 3/2009 Lutnick et al.
2009/0061975 A1 3/2009 Ditchev

(56) References Cited

U.S. PATENT DOCUMENTS

2009/0061991 A1 3/2009 Popovich
2009/0061997 A1 3/2009 Popovich
2009/0061998 A1 3/2009 Popovich
2009/0061999 A1 3/2009 Popovich
2009/0082093 A1 3/2009 Okada
2009/0088239 A1 4/2009 Iddings
2009/0098934 A1 4/2009 Amour
2009/0118006 A1 5/2009 Kelly et al.
2009/0124344 A1 5/2009 Mitchell et al.
2009/0131158 A1 5/2009 Brunet De Courssou et al.
2009/0131175 A1 5/2009 Kelly et al.
2009/0143141 A1 6/2009 Wells
2009/0149233 A1 6/2009 Strause et al.
2009/0156297 A1 6/2009 Andersson et al.
2009/0176560 A1 7/2009 Herrmann et al.
2009/0176566 A1 7/2009 Kelly
2009/0181777 A1 7/2009 Christiani
2009/0221355 A1 9/2009 Dunaevsky et al.
2009/0239610 A1 9/2009 Olive
2009/0247272 A1 10/2009 Abe
2009/0270164 A1 10/2009 Seelig
2009/0275393 A1 11/2009 Kisenwether
2009/0291755 A1 11/2009 Walker et al.
2009/0309305 A1 12/2009 May
2009/0312093 A1 12/2009 Walker et al.
2009/0325686 A1 12/2009 Davis
2010/0004058 A1 1/2010 Acres
2010/0016056 A1 1/2010 Thomas et al.
2010/0029373 A1 2/2010 Graham et al.
2010/0035674 A1 2/2010 Slomiany
2010/0056247 A1 3/2010 Nicely
2010/0056260 A1 3/2010 Fujimoto
2010/0062836 A1 3/2010 Young
2010/0093420 A1 4/2010 Wright
2010/0093444 A1 4/2010 Biggar et al.
2010/0105454 A1 4/2010 Weber
2010/0120525 A1 5/2010 Baerlocher et al.
2010/0124983 A1 5/2010 Gowin et al.
2010/0137047 A1 6/2010 Englman et al.
2010/0174593 A1 7/2010 Cao
2010/0184509 A1 7/2010 Sylla et al.
2010/0203940 A1 8/2010 Alderucci et al.
2010/0210344 A1 8/2010 Edidin et al.
2010/0227672 A1 9/2010 Amour
2010/0227688 A1 9/2010 Lee
2010/0240436 A1 9/2010 Wilson et al.
2010/0285869 A1 11/2010 Walker
2010/0304825 A1 12/2010 Davis
2010/0304839 A1 12/2010 Johnson
2010/0304842 A1 12/2010 Friedman et al.
2011/0009177 A1 1/2011 Katz
2011/0009178 A1 1/2011 Gerson
2011/0045896 A1 2/2011 Sak et al.
2011/0070945 A1 3/2011 Walker
2011/0077087 A1 3/2011 Walker et al.
2011/0082571 A1 4/2011 Murdock et al.
2011/0105206 A1 5/2011 Rowe et al.
2011/0107239 A1 5/2011 Adoni
2011/0109454 A1 5/2011 McSheffrey
2011/0111820 A1 5/2011 Filipour
2011/0111837 A1 5/2011 Gagner
2011/0111841 A1 5/2011 Tessmer
2011/0118011 A1 5/2011 Filipour et al.
2011/0201413 A1 8/2011 Oberberger
2011/0207523 A1 8/2011 Filipour et al.
2011/0212766 A1 9/2011 Bowers
2011/0212767 A1 9/2011 Barclay
2011/0218028 A1 9/2011 Acres
2011/0218035 A1 9/2011 Thomas
2011/0230258 A1 9/2011 Van Luchene
2011/0230260 A1 9/2011 Morrow et al.
2011/0230267 A1 9/2011 Van Luchene
2011/0244944 A1 10/2011 Baerlocher
2011/0263312 A1 10/2011 De Waal
2011/0269522 A1 11/2011 Nicely et al.
2011/0275440 A1 11/2011 Faktor
2011/0287828 A1 11/2011 Anderson et al.
2011/0287841 A1 11/2011 Watanabe
2011/0312408 A1 12/2011 Okuaki
2011/0319169 A1 12/2011 Lam
2012/0004747 A1 1/2012 Kelly
2012/0028718 A1 2/2012 Barclay et al.
2012/0058814 A1 3/2012 Lutnick
2012/0077569 A1 3/2012 Watkins
2012/0108323 A1 5/2012 Kelly
2012/0135793 A1 5/2012 Antonopoulos
2012/0149461 A1* 6/2012 Walker .................... G07F 17/32 463/25
2012/0202587 A1 8/2012 Allen
2012/0302311 A1 11/2012 Luciano
2012/0322545 A1 12/2012 Arnone et al.
2013/0029760 A1 1/2013 Wickett
2013/0131848 A1 5/2013 Arnone et al.
2013/0190074 A1 7/2013 Arnone et al.
2013/0260869 A1 10/2013 Leandro et al.
2014/0087801 A1 3/2014 Nicely et al.
2014/0087808 A1 3/2014 Leandro et al.
2014/0087809 A1 3/2014 Leupp et al.
2014/0357350 A1 12/2014 Weingardt et al.
2016/0171827 A1 6/2016 Washington
2017/0148271 A1 5/2017 Graboyes Goldman et al.

OTHER PUBLICATIONS

U.S. Appl. No. 14/815,774 Arnone, et al. filed Jul. 31, 2015.
U.S. Appl. No. 14/817,032 Arnone, et al. filed Aug. 3, 2015.
U.S. Appl. No. 14/822,890 Arnone, et al. filed Aug. 10, 2015.
U.S. Appl. No. 14/823,951 Arnone, et al. filed Aug. 11, 2015.
U.S. Appl. No. 14/823,987 Arnone, et al. filed Aug. 11, 2015.
U.S. Appl. No. 14/825,056 Arnone, et al. filed Aug. 12, 2015.
U.S. Appl. No. 14/835,590 Arnone, et al. filed Aug. 25, 2015.
U.S. Appl. No. 14/836,902 Arnone, et al. filed Aug. 26, 2015.
U.S. Appl. No. 14/839,647 Arnone, et al. filed Aug. 28, 2015.
U.S. Appl. No. 14/842,684 Arnone, et al. filed Sep. 1, 2015.
U.S. Appl. No. 14/842,785 Arnone, et al. filed Sep. 1, 2015.
U.S. Appl. No. 14/854,021 Arnone, et al. filed Sep. 14, 2015.
U.S. Appl. No. 14/855,322 Arnone, et al. filed Sep. 15, 2015.
U.S. Appl. No. 14/859,065 Arnone, et al. filed Sep. 18, 2015.
U.S. Appl. No. 14/865,422 Arnone, et al. filed Sep. 25, 2015.
U.S. Appl. No. 14/867,809 Arnone, et al. filed Sep. 28, 2015.
U.S. Appl. No. 14/868,287 Arnone, et al. filed Sep. 28, 2015.
U.S. Appl. No. 14/868,364 Arnone, et al. filed Sep. 28, 2015.
U.S. Appl. No. 14/869,809 Arnone, et al. filed Sep. 29, 2015.
U.S. Appl. No. 14/869,819 Arnone, et al. filed Sep. 29, 2015.
U.S. Appl. No. 14/885,894 Arnone, et al. filed Oct. 16, 2015.
U.S. Appl. No. 14/919,665 Arnone, et al. filed Oct. 21, 2015.
U.S. Appl. No. 14/942,844 Arnone, et al. filed Nov. 16, 2015.
U.S. Appl. No. 14/942,883 Arnone, et al. filed Nov. 16, 2015.
U.S. Appl. No. 14/949,759 Arnone, et al. filed Nov. 23, 2015.
U.S. Appl. No. 14/952,758 Arnone, et al. filed Nov. 25, 2015.
U.S. Appl. No. 14/952,769 Arnone, et al. filed Nov. 25, 2015.
U.S. Appl. No. 14/954,922 Arnone, et al. filed Nov. 30, 2015.
U.S. Appl. No. 14/954,931 Arnone, et al. filed Nov. 30, 2015.
U.S. Appl. No. 14/955,000 Arnone, et al. filed Nov. 30, 2015.
U.S. Appl. No. 14/956,301 Arnone, et al. filed Dec. 1, 2015.
U.S. Appl. No. 14/965,231 Arnone, et al. filed Dec. 10, 2015.
U.S. Appl. No. 14/965,846 Arnone, et al. filed Dec. 10, 2015.
U.S. Appl. No. 14/981,640 Arnone, et al. filed Dec. 28, 2015.
U.S. Appl. No. 14/981,775 Arnone, et al. filed Dec. 28, 2015.
U.S. Appl. No. 14/984,943 Arnone, et al. filed Dec. 30, 2015.
U.S. Appl. No. 14/984,965 Arnone, et al. filed Dec. 30, 2015.
U.S. Appl. No. 14/984,978 Arnone, et al. filed Dec. 30, 2015.
U.S. Appl. No. 14/985,107 Arnone, et al. filed Dec. 30, 2015.
U.S. Appl. No. 14/995,151 Arnone, et al. filed Jan. 13, 2016.
U.S. Appl. No. 14/974,432 Arnone, et al. filed Dec. 18, 2015.
U.S. Appl. No. 14/997,413 Arnone, et al. filed Jan. 15, 2016.
U.S. Appl. No. 15/002,233 Arnone, et al. filed Jan. 20, 2016.
U.S. Appl. No. 15/005,944 Arnone, et al. filed Jan. 25, 2016.
U.S. Appl. No. 15/011,322 Arnone, et al. filed Jan. 29, 2016.

(56) References Cited

OTHER PUBLICATIONS

U.S. Appl. No. 15/051,535 Arnone, et al. filed Feb. 23, 2016.
U.S. Appl. No. 15/053,236 Arnone, et al. filed Feb. 25, 2016.
U.S. Appl. No. 15/057,095 Arnone, et al. filed Feb. 29, 2016.
U.S. Appl. No. 15/060,502 Arnone, et al. filed Mar. 3, 2016.
U.S. Appl. No. 15/362,660 Arnone, et al. filed Nov. 28, 2016.
U.S. Appl. No. 15/365,628 Arnone, et al. filed Nov. 30, 2016.
U.S. Appl. No. 15/367,541 Arnone, et al. filed Dec. 2, 2016.
U.S. Appl. No. 15/369,394 Arnone, et al. filed Dec. 5, 2016.
U.S. Appl. No. 15/370,425 Arnone, et al. filed Dec. 6, 2016.
U.S. Appl. No. 15/375,711 Arnone, et al. filed Dec. 12, 2016.
U.S. Appl. No. 15/387,117 Arnone, et al. filed Dec. 21, 2016.
U.S. Appl. No. 15/392,887 Arnone, et al. filed Dec. 28, 2016.
U.S. Appl. No. 15/393,212 Arnone, et al. filed Dec. 28, 2016.
U.S. Appl. No. 15/394,257 Arnone, et al. filed Dec. 29, 2016.
U.S. Appl. No. 15/396,352 Arnone, et al. filed Dec. 30, 2016.
U.S. Appl. No. 15/396,354 Arnone, et al. filed Dec. 30, 2016.
U.S. Appl. No. 15/396,365 Arnone, et al. filed Dec. 30, 2016.
U.S. Appl. No. 15/406,474 Arnone, et al. filed Jan. 13, 2017.
U.S. Appl. No. 15/413,322 Arnone, et al. filed Jan. 23, 2017.
U.S. Appl. No. 15/415,833 Arnone, et al. filed Jan. 25, 2017.
U.S. Appl. No. 15/417,030 Arnone, et al. filed Jan. 26, 2017.
U.S. Appl. No. 15/422,453 Arnone, et al. filed Feb. 1, 2017.
U.S. Appl. No. 15/431,631 Arnone, et al. filed Feb. 13, 2017.
U.S. Appl. No. 15/434,843 Arnone, et al. filed Feb. 16, 2017.
U.S. Appl. No. 15/439,499 Arnone, et al. filed Feb. 22, 2017.
U.S. Appl. No. 15/449,249 Arnone, et al. filed Mar. 3, 2017.
U.S. Appl. No. 15/449,256 Arnone, et al. filed Mar. 3, 2017.
U.S. Appl. No. 15/450,287 Arnone, et al. filed Mar. 6, 2017.
U.S. Appl. No. 15/456,079 Arnone, et al. filed Mar. 10, 2017.
U.S. Appl. No. 15/457,827 Arnone, et al. filed Mar. 13, 2017.
U.S. Appl. No. 15/458,490 Arnone, et al. filed Mar. 14, 2017.
U.S. Appl. No. 15/460,195 Arnone, et al. filed Mar. 15, 2017.
U.S. Appl. No. 15/463,725 Arnone, et al. filed Mar. 20, 2017.
U.S. Appl. No. 15/464,282 Arnone, et al. filed Mar. 20, 2017.
U.S. Appl. No. 15/465,521 Arnone, et al. filed Mar. 21, 2017.
U.S. Appl. No. 15/470,869 Arnone, et al. filed Mar. 27, 2017.
U.S. Appl. No. 15/473,523 Arnone, et al. filed Mar. 29, 2017.
U.S. Appl. No. 15/483,773 Arnone, et al. filed Apr. 10, 2017.
U.S. Appl. No. 15/489,343 Arnone, et al. filed Apr. 17, 2017.
U.S. Appl. No. 15/491,617 Arnone, et al. filed Apr. 19, 2017.
U.S. Appl. No. 15/583,295 Arnone, et al. filed May 1, 2017, 2017.
U.S. Appl. No. 15/589,780 Arnone, et al. filed May 8, 2017.
U.S. Appl. No. 15/597,123 Arnone, et al. filed May 16, 2017.
U.S. Appl. No. 15/597,812 Arnone, et al. filed May 17, 2017.
U.S. Appl. No. 15/599,590 Arnone, et al. filed May 19, 2017.
U.S. Appl. No. 15/605,688 Arnone, et al. filed May 25, 2017.
U.S. Appl. No. 15/605,705 Arnone, et al. filed May 25, 2017.
U.S. Appl. No. 15/626,754 Arnone, et al. filed Jun. 19, 2017.
U.S. Appl. No. 15/631,762 Arnone, et al. filed Jun. 23, 2017.
U.S. Appl. No. 15/632,478 Arnone, et al. filed Jun. 26, 2017.
U.S. Appl. No. 15/632,479 Arnone, et al. filed Jun. 26, 2017.
U.S. Appl. No. 15/632,943 Arnone, et al. filed Jun. 26, 2017.
U.S. Appl. No. 15/632,950 Arnone, et al. filed Jun. 26, 2017.
U.S. Appl. No. 15/641,119 Arnone, et al. filed Jul. 3, 2017.
U.S. Appl. No. 14/185,847 Arnone, et al., filed Feb. 20, 2014.
U.S. Appl. No. 14/203,459 Arnone, et al., filed Mar. 10, 2014.
U.S. Appl. No. 14/205,272 Arnone, et al., filed Mar. 11, 2014.
U.S. Appl. No. 13/854,658, Arnone, et al., filed Apr. 1, 2013.
U.S. Appl. No. 13/855,676, Arnone, et al., filed Apr. 2, 2013.
U.S. Appl. No. 13/872,946, Arnone, et al., filed Apr. 29, 2013.
U.S. Appl. No. 13/886,245, Arnone, et al., filed May 2, 2013.
U.S. Appl. No. 13/888,326, Arnone, et al., filed May 6, 2013.
U.S. Appl. No. 13/890,207, Arnone, et al., filed May 8, 2013.
U.S. Appl. No. 13/896,783, Arnone, et al., filed May 17, 2013.
U.S. Appl. No. 13/898,222, Arnone, et al., filed May 20, 2013.
U.S. Appl. No. 13/900,363, Arnone, et al., filed May 22, 2013.
U.S. Appl. No. 13/903,895, Arnone, et al., filed May 28, 2013.
U.S. Appl. No. 13/917,513, Arnone, et al., filed Jun. 13, 2013.
U.S. Appl. No. 13/917,529, Arnone, et al., filed Jun. 13, 2013.
U.S. Appl. No. 13/920,031, Arnone, et al., filed Jun. 17, 2013.
U.S. Appl. No. 13/928,166, Arnone, et al., filed Jun. 26, 2013.
U.S. Appl. No. 13/935,410, Arnone, et al., filed Jul. 3, 2013.
U.S. Appl. No. 13/935,468, Arnone, et al., filed Jul. 3, 2013.
U.S. Appl. No. 13/686,876, Arnone, et al., filed Nov. 27, 2012.
U.S. Appl. No. 13/944,662, Arnone, et al., filed Jul. 17, 2013.
U.S. Appl. No. 13/962,815, Arnone, et al., filed Aug. 8, 2013.
U.S. Appl. No. 13/962,839, Meyerhofer, et al., filed Aug. 8, 2013.
U.S. Appl. No. 14/018,315, Arnone, et al., filed Sep. 4, 2013.
U.S. Appl. No. 14/019,384, Arnone, et al., filed Sep. 5, 2013.
U.S. Appl. No. 14/023,432, Arnone, et al., filed Sep. 10, 2013.
U.S. Appl. No. 13/600,671, Arnone, et al., filed Aug. 31, 2012.
U.S. Appl. No. 13/582,408, Arnone, et al., filed Sep. 26, 2012.
U.S. Appl. No. 13/849,458, Arnone, et al., filed Mar. 22, 2013.
U.S. Appl. No. 14/135,562, Arnone, et al., filed Dec. 19, 2013.
U.S. Appl. No. 14/080,767, Arnone, et al., filed Nov. 14, 2013.
U.S. Appl. No. 14/043,838, Arnone, et al., filed Oct. 1, 2013.
U.S. Appl. No. 14/162,735, Arnone, et al., filed Jan. 23, 2014.
U.S. Appl. No. 14/161,230, Arnone, et al., filed Jan. 22, 2014.
U.S. Appl. No. 14/083,331, Arnone, et al., filed Nov. 18, 2013.
U.S. Appl. No. 14/014,310, Arnone, et al., filed Aug. 29, 2013.
U.S. Appl. No. 14/152,953, Arnone, et al., filed Jan. 10, 2014.
U.S. Appl. No. 14/162,724, Arnone, et al., filed Jan. 23, 2014.
U.S. Appl. No. 14/104,897, Arnone, et al., filed Dec. 12, 2013.
U.S. Appl. No. 14/174,813 Arnone, et al., filed Feb. 6, 2014.
U.S. Appl. No. 14/175,986 Arnone, et al., filed Feb. 7, 2014.
U.S. Appl. No. 14/176,014 Arnone, et al., filed Feb. 7, 2014.
U.S. Appl. No. 14/179,487 Arnone, et al., filed Feb. 12, 2014.
U.S. Appl. No. 14/179,492 Arnone, et al., filed Feb. 12, 2014.
U.S. Appl. No. 14/181,190 Arnone, et al., filed Feb. 14, 2014.
U.S. Appl. No. 14/186,393 Arnone, et al., filed Feb. 21, 2014.
U.S. Appl. No. 14/188,587 Arnone, et al., filed Feb. 24, 2014.
WIPO/ISA International Search Report and Written Opinion, PCT/US14/14112, dated May 27, 2014.
U.S. Appl. No. 15/063,365 Arnone, et al. filed Mar. 7, 2016.
U.S. Appl. No. 15/063,496 Arnone, et al. filed Mar. 7, 2016.
U.S. Appl. No. 15/073,602 Arnone, et al. filed Mar. 17, 2016.
U.S. Appl. No. 15/074,999 Arnone, et al. filed Mar. 18, 2016.
U.S. Appl. No. 15/077,574 Arnone, et al. filed Mar. 22, 2016.
U.S. Appl. No. 15/083,284 Arnone, et al. filed Mar. 28, 2016.
U.S. Appl. No. 15/091,395 Arnone, et al. filed Apr. 5, 2016.
U.S. Appl. No. 15/093,685 Arnone, et al. filed Apr. 7, 2016.
U.S. Appl. No. 15/098,287 Arnone, et al. filed Apr. 13, 2016.
U.S. Appl. No. 15/098,313 Arnone, et al. filed Apr. 13, 2016.
U.S. Appl. No. 15/130,101 Arnone, et al. filed Apr. 15, 2016.
U.S. Appl. No. 15/133,624 Arnone, et al. filed Apr. 20, 2016.
U.S. Appl. No. 15/134,852 Arnone, et al. filed Apr. 21, 2016.
U.S. Appl. No. 15/139,148 Arnone, et al. filed Apr. 26, 2016.
U.S. Appl. No. 15/141,784 Arnone, et al. filed Apr. 29, 2016.
U.S. Appl. No. 15/155,107 Arnone, et al. filed May 16, 2016.
U.S. Appl. No. 15/156,222 Arnone, et al. filed May 16, 2016.
U.S. Appl. No. 15/158,530 Arnone, et al. filed May 18, 2016.
U.S. Appl. No. 15/161,174 Arnone, et al. filed May 20, 2016.
U.S. Appl. No. 15/170,773 Arnone, et al. filed Jun. 1, 2016.
U.S. Appl. No. 15/174,995 Arnone, et al. filed Jun. 6, 2016.
U.S. Appl. No. 15/179,940 Arnone, et al. filed Jun. 10, 2016.
U.S. Appl. No. 15/189,797 Arnone, et al. filed Jun. 22, 2016.
U.S. Appl. No. 15/190,745 Arnone, et al. filed Jun. 23, 2016.
U.S. Appl. No. 15/191,050 Arnone, et al. filed Jun. 23, 2016.
U.S. Appl. No. 15/219,257 Arnone, et al. filed Jul. 25, 2016.
U.S. Appl. No. 15/227,881 Arnone, et al. filed Aug. 3, 2016.
U.S. Appl. No. 15/241,683 Arnone, et al. filed Aug. 19, 2016.
U.S. Appl. No. 15/245,040 Arnone, et al. filed Aug. 23, 2016.
U.S. Appl. No. 15/233,294 Arnone, et al. filed Aug. 24, 2016.
U.S. Appl. No. 15/252,190 Arnone, et al. filed Aug. 30, 2016.
U.S. Appl. No. 15/255,789 Arnone, et al. filed Sep. 2, 2016.
U.S. Appl. No. 15/261,858 Arnone, et al. filed Sep. 9, 2016.
U.S. Appl. No. 15/264,521 Arnone, et al. filed Sep. 13, 2016.
U.S. Appl. No. 15/264,557 Arnone, et al. filed Sep. 13, 2016.
U.S. Appl. No. 15/271,214 Arnone, et al. filed Sep. 20, 2016.
U.S. Appl. No. 15/272,318 Arnone, et al. filed Sep. 21, 2016.
U.S. Appl. No. 15/273,260 Arnone, et al. filed Sep. 22, 2016.
U.S. Appl. No. 15/276,469 Arnone, et al. filed Sep. 26, 2016.

(56) References Cited

OTHER PUBLICATIONS

U.S. Appl. No. 15/280,255 Arnone, et al. filed Sep. 29, 2016.
U.S. Appl. No. 15/286,922 Arnone, et al. filed Oct. 6, 2016.
U.S. Appl. No. 15/287,129 Arnone, et al. filed Oct. 6, 2016.
U.S. Appl. No. 15/289,648 Arnone, et al. filed Oct. 10, 2016.
U.S. Appl. No. 15/297,019 Arnone, et al. filed Oct. 18, 2016.
U.S. Appl. No. 15/298,533 Arnone, et al. filed Oct. 20, 2016.
U.S. Appl. No. 15/336,696 Arnone, et al. filed Oct. 27, 2016.
U.S. Appl. No. 15/339,898 Arnone, et al. filed Oct. 31, 2016.
U.S. Appl. No. 15/345,451 Arnone, et al. filed Nov. 7, 2016.
U.S. Appl. No. 14/799,481 Arnone, et al. filed Jul. 14, 2015.
U.S. Appl. No. 15/362,214 Arnone, et al. filed Nov. 28, 2016.
U.S. Appl. No. 15/651,934 Arnone, et al. filed Jul. 17, 2017.
U.S. Appl. No. 15/657,826 Arnone, et al. filed Jul. 24, 2017.
U.S. Appl. No. 15/657,835 Arnone, et al. filed Jul. 24, 2017.
U.S. Appl. No. 15/664,535 Arnone, et al. filed Jul. 31, 2017.
U.S. Appl. No. 15/667,168 Arnone, et al. filed Aug. 2, 2017.
U.S. Appl. No. 15/267,511 Rowe, filed Sep. 16, 2016.
U.S. Appl. No. 15/681,966 Arnone, et al. filed Aug. 21, 2017.
U.S. Appl. No. 15/681,970 Arnone, et al. filed Aug. 21, 2017.
U.S. Appl. No. 15/681,978 Arnone, et al. filed Aug. 21, 2017.
U.S. Appl. No. 15/687,922 Arnone, et al. filed Aug. 28, 2017.
U.S. Appl. No. 15/687,927 Arnone, et al. filed Aug. 28, 2017.
U.S. Appl. No. 15/694,520 Arnone, et al. filed Sep. 1, 2017.
U.S. Appl. No. 15/694,738 Arnone, et al. filed Sep. 1, 2017.
U.S. Appl. No. 15/713,595 Arnone, et al. filed Sep. 22, 2017.
U.S. Appl. No. 15/715,144 Arnone, et al. filed Sep. 25, 2017.
U.S. Appl. No. 15/716,317 Arnone, et al. filed Sep. 26, 2017.
U.S. Appl. No. 15/716,318 Arnone, et al. filed Sep. 26, 2017.
U.S. Appl. No. 15/728,096 Arnone, et al. filed Oct. 9, 2017.
U.S. Appl. No. 15/784,961 Arnone, et al. filed Oct. 16, 2017.
U.S. Appl. No. 15/790,482 Arnone, et al. filed Oct. 23, 2017.
U.S. Appl. No. 15/794,712 Arnone, et al. filed Oct. 26, 2017.
U.S. Appl. No. 15/797,571 Arnone, et al. filed Oct. 30, 2017.
U.S. Appl. No. 15/804,413 Arnone, et al. filed Nov. 6, 2017.
U.S. Appl. No. 15/811,412 Arnone, et al. filed Nov. 13, 2017.
U.S. Appl. No. 15/811,419 Arnone, et al. filed Nov. 13, 2017.
U.S. Appl. No. 15/815,629 Arnone, et al. filed Nov. 16, 2017.
U.S. Appl. No. 15/822,908 Arnone, et al. filed Nov. 27, 2017.
U.S. Appl. No. 15/822,912 Arnone, et al. filed Nov. 27, 2017.
U.S. Appl. No. 15/830,614 Arnone, et al. filed Dec. 4, 2017.
U.S. Appl. No. 15/834,006 Arnone, et al. filed Dec. 6, 2017.
U.S. Appl. No. 15/837,795 Arnone, et al. filed Dec. 11, 2017.
U.S. Appl. No. 15/845,433 Arnone, et al. filed Dec. 18, 2017.
U.S. Appl. No. 15/858,817 Arnone, et al. filed Dec. 29, 2017.
U.S. Appl. No. 15/858,826 Arnone, et al. filed Dec. 29, 2017.
U.S. Appl. No. 15/862,329 Arnone, et al. filed Jan. 4, 2018.
U.S. Appl. No. 15/864,737 Arnone, et al. filed Jan. 8, 2018.
U.S. Appl. No. 14/205,303 Arnone, et al., filed Mar. 11, 2014.
U.S. Appl. No. 14/205,306 Arnone, et al., filed Mar. 11, 2014.
U.S. Appl. No. 14/209,485 Arnone, et al., filed Mar. 13, 2014.
U.S. Appl. No. 14/214,310 Arnone, et al., filed Mar. 14, 2014.
U.S. Appl. No. 14/222,520 Arnone, et al., filed Mar. 21, 2014.
U.S. Appl. No. 14/253,813 Arnone, et al., filed Apr. 15, 2014.
U.S. Appl. No. 14/255,253 Arnone, et al., filed Apr. 17, 2014.
U.S. Appl. No. 14/255,919 Arnone, et al. filed Apr. 17, 2014.
U.S. Appl. No. 14/263,988 Arnone, et al. filed Apr. 28, 2014.
U.S. Appl. No. 14/270,335 Arnone, et al. filed May 5, 2014.
U.S. Appl. No. 14/271,360 Arnone, et al. filed May 6, 2014.
U.S. Appl. No. 13/961,849 Arnone, et al. filed Aug. 7, 2013.
U.S. Appl. No. 13/746,850 Arnone, et al. filed Jan. 22, 2013.
U.S. Appl. No. 14/288,169 Arnone, et al. filed May 27, 2014.
U.S. Appl. No. 14/304,027 Arnone, et al. filed Jun. 13, 2014.
U.S. Appl. No. 14/306,187 Arnone, et al. filed Jun. 16, 2014.
U.S. Appl. No. 14/312,623 Arnone, et al. filed Jun. 23, 2014.
U.S. Appl. No. 14/330,249 Arnone, et al. filed Jul. 14, 2014.
U.S. Appl. No. 14/339,142 Arnone, et al. filed Jul. 23, 2014.
U.S. Appl. No. 14/458,206 Arnone, et al. filed Aug. 12, 2014.
U.S. Appl. No. 14/461,344 Arnone, et al. filed Aug. 15, 2014.
U.S. Appl. No. 14/462,516 Arnone, et al. filed Aug. 18, 2014.
U.S. Appl. No. 14/467,646 Meyerhofer, et al. filed Aug. 25, 2014.
U.S. Appl. No. 14/474,023 Arnone, et al. filed Aug. 29, 2014.
U.S. Appl. No. 14/486,895 Arnone, et al. filed Sep. 15, 2014.
U.S. Appl. No. 14/507,206 Arnone, et al. filed Oct. 6, 2014.
U.S. Appl. No. 14/521,338 Arnone, et al. filed Oct. 22, 2014.
U.S. Appl. No. 14/535,808 Arnone, et al. filed Nov. 7, 2014.
U.S. Appl. No. 14/535,816 Arnone, et al. filed Nov. 7, 2014.
U.S. Appl. No. 14/536,231 Arnone, et al. filed Nov. 7, 2014.
U.S. Appl. No. 14/536,280 Arnone, et al. filed Nov. 7, 2014.
U.S. Appl. No. 14/549,137 Arnone, et al. filed Nov. 20, 2014.
U.S. Appl. No. 14/550,802 Arnone, et al. filed Nov. 21, 2014.
U.S. Appl. No. 14/555,401 Arnone, et al. filed Nov. 26, 2014.
U.S. Appl. No. 14/559,840 Arnone, et al. filed Dec. 3, 2014.
U.S. Appl. No. 14/564,834 Arnone, et al. filed Dec. 9, 2014.
U.S. Appl. No. 14/570,746 Arnone, et al. filed Dec. 15, 2014.
U.S. Appl. No. 14/570,857 Arnone, et al. filed Dec. 15, 2014.
U.S. Appl. No. 14/586,626 Arnone, et al. filed Dec. 30, 2014.
U.S. Appl. No. 14/586,639 Arnone, et al. filed Dec. 30, 2014.
U.S. Appl. No. 14/586,645 Arnone, et al. filed Dec. 30, 2014.
U.S. Appl. No. 14/598,151 Arnone, et al. filed Jan. 15, 2015.
U.S. Appl. No. 14/601,063 Arnone, et al. filed Jan. 20, 2015.
U.S. Appl. No. 14/601,108 Arnone, et al. filed Jan. 20, 2015.
U.S. Appl. No. 14/608,000 Arnone, et al. filed Jan. 28, 2015.
U.S. Appl. No. 14/608,087 Arnone, et al. filed Jan. 28, 2015.
U.S. Appl. No. 14/608,093 Arnone, et al. filed Jan. 28, 2015.
U.S. Appl. No. 14/610,897 Arnone, et al. filed Jan. 30, 2015.
U.S. Appl. No. 14/611,077 Arnone, et al. filed Jan. 30, 2015.
U.S. Appl. No. 14/604,629 Arnone, et al. filed Jan. 23, 2015.
U.S. Appl. No. 14/625,475 Arnone, et al. filed Feb. 18, 2015.
U.S. Appl. No. 14/617,852 Arnone, et al. filed Feb. 9, 2015.
U.S. Appl. No. 14/627,428 Arnone, et al. filed Feb. 20, 2015.
U.S. Appl. No. 14/642,427 Arnone, et al. filed Mar. 9, 2015.
U.S. Appl. No. 14/665,991 Arnone, et al. filed Mar. 23, 2015.
U.S. Appl. No. 14/666,010 Arnone, et al. filed Mar. 23, 2015.
U.S. Appl. No. 14/666,022 Arnone, et al. filed Mar. 23, 2015.
U.S. Appl. No. 14/642,623 Arnone, et al. filed Mar. 9, 2015.
U.S. Appl. No. 14/663,337 Arnone, et al. filed Mar. 19, 2015.
U.S. Appl. No. 14/666,284 Arnone, et al. filed Mar. 23, 2015.
U.S. Appl. No. 14/679,885 Arnone, et al. filed Apr. 6, 2015.
U.S. Appl. No. 14/685,378 Arnone, et al. filed Apr. 13, 2015.
U.S. Appl. No. 14/686,675 Arnone, et al. filed Apr. 14, 2015.
U.S. Appl. No. 14/686,678 Arnone, et al. filed Apr. 14, 2015.
U.S. Appl. No. 14/701,430 Arnone, et al. filed Apr. 30, 2015.
U.S. Appl. No. 14/703,721 Arnone, et al. filed May 4, 2015.
U.S. Appl. No. 14/708,138 Arnone, et al. filed May 8, 2015.
U.S. Appl. No. 14/708,141 Arnone, et al. filed May 8, 2015.
U.S. Appl. No. 14/708,160 Arnone, et al. filed May 8, 2015.
U.S. Appl. No. 14/708,161 Arnone, et al. filed May 8, 2015.
U.S. Appl. No. 14/708,162 Arnone, et al. filed May 8, 2015.
U.S. Appl. No. 14/710,483 Arnone, et al. filed May 12, 2015.
U.S. Appl. No. 14/714,084 Arnone, et al. filed May 15, 2015.
U.S. Appl. No. 14/715,463 Arnone, et al. filed May 18, 2015.
U.S. Appl. No. 14/720,620 Arnone, et al. filed May 22, 2015.
U.S. Appl. No. 14/720,624 Arnone, et al. filed May 22, 2015.
U.S. Appl. No. 14/720,626 Arnone, et al. filed May 22, 2015.
U.S. Appl. No. 14/727,726 Arnone, et al. filed Jun. 1, 2015.
U.S. Appl. No. 14/730,183 Arnone, et al. filed Jun. 3, 2015.
U.S. Appl. No. 14/731,321 Arnone, et al. filed Jun. 4, 2015.
U.S. Appl. No. 14/740,078 Arnone, et al. filed Jun. 15, 2015.
U.S. Appl. No. 14/742,517 Arnone, et al. filed Jun. 17, 2015.
U.S. Appl. No. 14/743,708 Arnone, et al. filed Jun. 18, 2015.
U.S. Appl. No. 14/746,731 Arnone, et al. filed Jun. 22, 2015.
U.S. Appl. No. 14/748,122 Arnone, et al. filed Jun. 23, 2015.
U.S. Appl. No. 14/788,581 Arnone, et al. filed Jun. 30, 2015.
U.S. Appl. No. 14/793,685 Arnone, et al. filed Jul. 7, 2015.
U.S. Appl. No. 14/793,704 Arnone, et al. filed Jul. 7, 2015.
U.S. Appl. No. 14/797,016 Arnone, et al. filed Jul. 10, 2015.

* cited by examiner

INTERMEDIATE IN-GAME RESOURCE HYBRID GAMING SYSTEM

CROSS-REFERENCE TO RELATED APPLICATIONS

The current application is a continuation of U.S. patent application Ser. No. 15/287,129, filed Oct. 6, 2016, which is a continuation of U.S. patent application Ser. No. 14/815,774, filed Jul. 31, 2015, and issued as U.S. Pat. No. 9,483,165 on Nov. 1, 2016, which is a continuation of Patent Cooperation Treaty Application No. PCT/US14/14112, filed Jan. 31, 2014 which claims priority to U.S. Provisional Application No. 61/759,296, filed Jan. 31, 2013, and U.S. Provisional Application No. 61/790,155, filed Mar. 15, 2013, the disclosures of which are incorporated herein by reference as if set forth herewith.

FIELD

Embodiments of the present invention are generally related to gaming and more specifically to systems and processes that provide a wagering hybrid game in conjunction with a non-wagering game.

BACKGROUND

The gaming machine manufacturing industry provides a variety of gaming machines to enable wagering for interested parties whilst providing an entertainment experience. An exemplary gaming machine is a slot machine. As the demographic of eligible players has shifted with time to newer generations who have grown accustomed to highly sophisticated graphics and interactive video games, a need has arisen to increase the entertainment content present on a gaming machine to keep it relevant, at least to a growing portion of a casino's patronage. The subject design is a form of gaming machine, designed for use in a physical or virtual casino environment, which provides players an environment in which to play for cash, prizes and points, either against the casino or in head to head modes in a controlled and regulated manner while being allowed to use their skills and adeptness at a particular type of game. An example of such a game would be a challenging word spelling game, or an interactive action game such as is found on video game consoles popular today, such as a PlayStation®, an Xbox®, a Wii® or a PC based game.

SUMMARY

Systems are provided for an intermediate in-game resource hybrid gaming system. In some embodiments, a network distributed intermediate in-game resource hybrid gaming system, includes a real world server connected to a game world server, where the real world server is constructed to provide a gambling proposition, where the gambling proposition is configured to provide a randomly generated payout for a wager of an amount of credits, receive from the game world server, gameplay gambling event occurrences, where the gambling event occurrences are based upon a player's skillful execution of an entertainment game that triggers the wager of the amount of credits of the gambling proposition and generation of the randomly generated payout for the gambling proposition for the wager of the amount of credits, determine, an outcome of a gambling event, and communicate, to the game world server, the outcome of the gambling event.

In further embodiments, the system further includes a controller connected to the game world server by a network, where the controller is constructed to execute the entertainment game providing the outcome upon the player's skillful execution of the entertainment game, where the entertainment game includes a quanta selector user interface that displays to a player a selection of a plurality of elements for the entertainment game, the quanta selector user interface allowing the player to select between the plurality of elements based on the outcome of the gambling event, communicate, to the game world server, gameplay gambling event occurrences, where the gambling event occurrences are based upon the player's skillful execution of the entertainment game that trigger the wager of the amount of credits of the gambling proposition and generation of the randomly generated payout for the gambling proposition for the wager of the amount of credits, receive, from the game world server, the outcome of the gambling event, and receive, from the game world server, an amount of quanta to allocate.

In some embodiments, the system further includes the game world server connecting the controller to the real world server by the network, where the game world server is constructed to manage the entertainment game, receive, from the controller, gameplay gambling event occurrences, where the gambling event occurrences are based upon the player's skillful execution of the entertainment game that trigger the wager of the amount of credits of the gambling proposition and generation of the randomly generated payout for the gambling proposition for the wager of the amount of credits, communicate, to the real world server, gameplay gambling event occurrences received from the controller to the real world server, where the gambling event occurrences are based upon the player's skillful execution of the entertainment game that trigger the wager of the amount of credits of the gambling proposition and generation of the randomly generated payout for the gambling proposition for the wager of the amount of credits, receive, from the real world server, the outcome of the gambling event, communicate, to the controller, the outcome of the gambling event, determine the amount of quanta to award the player based on the outcome of the gambling event and a quanta pay table distinct from a pay table utilized of the gambling proposition, where quanta is an intermediate in-game resource used to provide the plurality of entertainment game in-game elements, and communicate, to the controller, the amount of quanta to allocate.

In numerous embodiments, the controller is further constructed to display a plurality of indicators of the plurality entertainment game in-game elements, the plurality of indicators displayed to indicate an availability of the plurality entertainment game in-game elements for selection on a basis of the amount of the quanta awarded to the player.

In some embodiments the controller is further constructed to gray-out the plurality of indicators in inverse proportion to the amount of quanta.

In still further embodiments, the game world server is further constructed to allocate the quanta to enabled elements.

In some embodiments, the game world server is further constructed to convert the quanta to actionable elements.

In several embodiments, the game world server is further constructed to issue quanta even when the outcome of the gambling event issues no real credit.

DETAILED DESCRIPTION

Turning now to the drawings, systems and methods for providing an intermediate in-game resource hybrid game (HyG) are illustrated. In accordance with embodiments of the invention, an entertainment game is provided by an Entertainment System Engine (ESE) and a gambling game is provided by a Real World Engine (RWE). A Game World Engine (GWE) monitors the game play of the entertainment game provided by the ESE and determines when a gambling event is to occur based on the game play of the entertainment game. The GWE then requests that the RWE resolve the gambling event in the gambling game by providing a gambling outcome either while game play in the entertainment game is continued or while is paused to resolve the gambling event. The RWE resolves the gambling event including resolving any wagers on the outcome of the gambling event and provides the results to the GWE. The GWE then determines any effects the results of the outcome of the gambling event have on the entertainment game and updates the ESE accordingly to continue game play.

In many embodiments of intermediate in-game resource hybrid games (HyG), the consumption of an Enabling Element (EE), the occurrence of an Action Element (AE), and/or some other player interaction with an entertainment initiates a gambling event in the gambling game.

The intermediate in-game resource hybrid game can provide one or more gambling games. In the gambling game(s), the outcomes of a gambling event and associated wagers are determined solely on the outcome of a pseudo random or random number generator (P/RNG) based gaming module. In accordance with embodiments of the invention, the intermediate in-game resource hybrid game offers an enriched gaming experience, based on game play of the fixed shooter game provided by an entertainment system engine which through the game world engine (GWE) of the intermediate in-game resource hybrid game triggers real world gambling events in the one or more gambling games via the real world engine (RWE).

Intermediate In-Game Resource Hybrid Games

Figure 1:
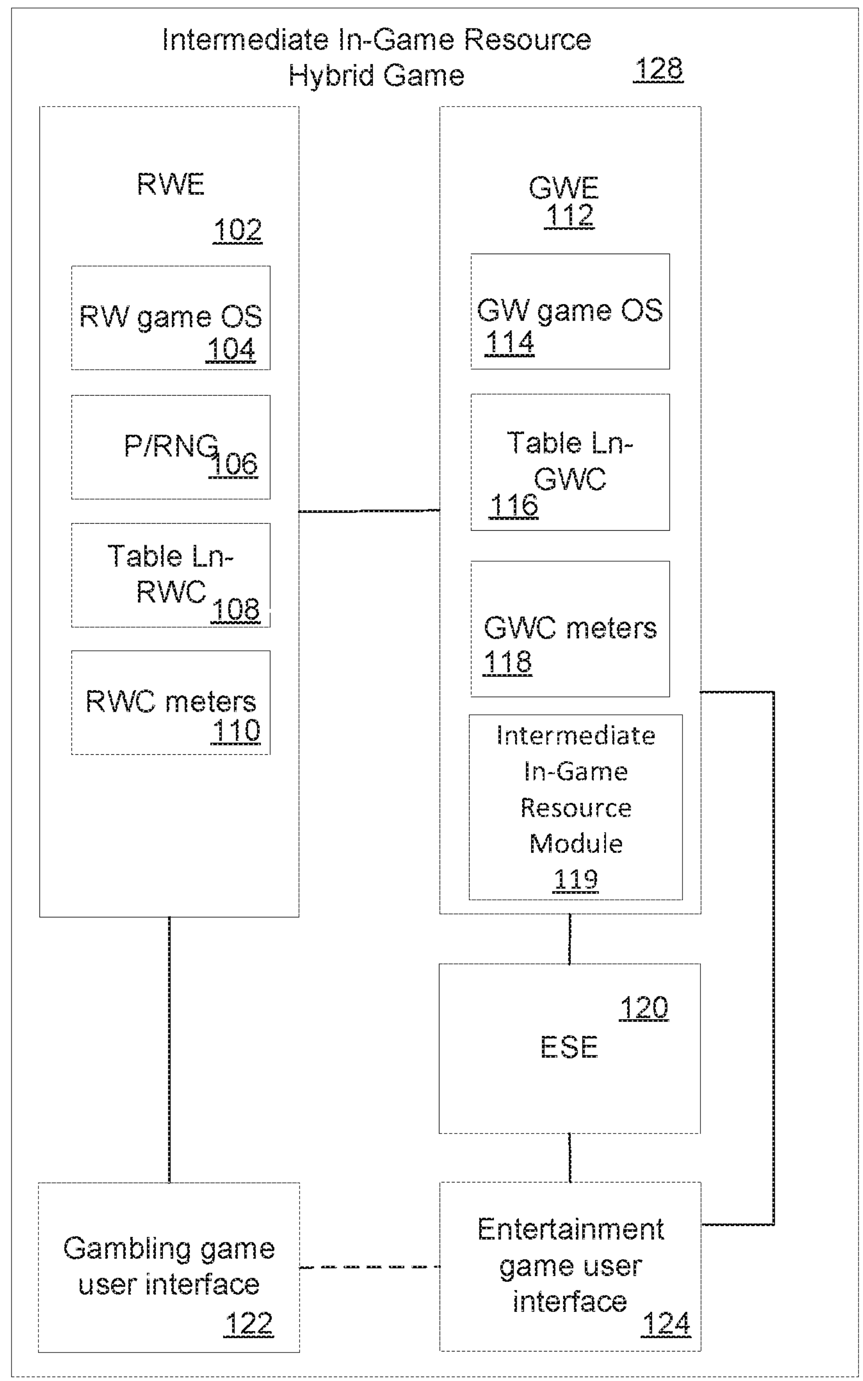
FIG. 1 illustrates a conceptual diagram of components of an intermediate in-game resource hybrid game in accordance with an embodiment of the invention.

In accordance with many embodiments of the invention, an intermediate in-game resource hybrid game integrates high-levels of entertainment content with a game of skill (entertainment game) and a gambling experience with a game of chance (gambling game). An intermediate in-game resource hybrid game provides for random outcomes independent of player skill while providing that the user's gaming experience (as measured by obstacles/challenges encountered, time of play and other factors) is shaped by the player's skill. The outcome of a gambling proposition that is determined by a pseudo random or random number generator (P/RNG) or other such device that provides a random outcome in response to a request. In accordance with some embodiments, the wager game may be initiated in response to a game object related player action. An intermediate in-game resource hybrid game in accordance with an embodiment of the invention is illustrated in FIG. 1. The intermediate in-game resource hybrid game 128 includes a Real World Engine (RWE) 102, a Game World Engine (GWE) 112, an Entertainment System Engine (ESE) 120, a gambling game user interface 122 and an entertainment game user interface 124. The entertainment game user interface includes an intermediate in-game resource user interface as described herein. In some embodiments, the user interfaces can be part of the same user interface. The RWE 102 is connected with the GWE 112 and the gambling game user interface 122. The ESE 120 is connected with the GWE 112 and the entertainment game user interface 124. The GWE 112 is connected also with the entertainment game user interface 124.

In accordance with several embodiments, the RWE 102 is the operating system for the gambling game of the intermediate in-game resource hybrid game 128 and controls and operates the gambling game. The operation of a gambling game is enabled by Real World Currency (RC), such as money or other real world funds. A gambling game can increase or decrease an amount of RC based on random gambling outcomes, where the gambling proposition of a gambling game is typically regulated by gaming control bodies. In many embodiments, the RWE includes a Real World (RW) operating system (OS) 104, P/RNG 106, level n real-world credit pay tables (Table Ln-RC) 108, RC meters 110 and other software constructs that enable a game of chance to offer a fair and transparent gambling proposition, and to contain the auditable systems and functions that can enable the game to obtain gaming regulatory body approval.

A pseudo random or random number generator (P/RNG) 106 includes software and/or hardware algorithms and/or processes, which are used to generate random outcomes. A level n real-world credit pay table (Table Ln-RC) 108 is a table that can be used in conjunction with P/RNG 106 to dictate the RC earned as a function of sponsored gameplay and is analogous to the pay tables used in a conventional slot machine. Table Ln-RC payouts are independent of player skill. There can be one table or multiple tables included in Ln-RC pay tables 108 contained in a gambling game, the selection of which can be determined by factors including (but not limited to) game progress that a player has earned, and/or bonus rounds for which a player can be eligible. RCs are credits analogous to slot machine game credits, which are entered into a gambling game by the user, either in the form of money such as hard currency or electronic funds. RCs can be decremented or augmented based on the outcome of a pseudo random or random number generator according to the table Ln-RC real world credits pay table 108, independent of player skill. In certain embodiments, an amount of RC can be used as criteria in order to enter higher ESE game levels. RC can be carried forward to higher game levels or paid out if a cash out is opted for by a player. The amount of RC used to enter a specific level of the game level n need not be the same for each level.

In accordance with some embodiments of the invention, the GWE 112 manages the overall intermediate in-game resource hybrid game operation, with the RWE 102 and the ESE 120 effectively being support units to the GWE 112. In accordance with some of these embodiments, the GWE 112 contains mechanical, electronic, and software systems for an entertainment game. The GWE 112 includes an Operating System (OS) 114 that provides control of the entertainment game. The GWE additionally contains a level n game world credit pay table (table Ln-GWC) 116 from where to take input from this table to affect the play of the entertainment game. The GWE 112 can further couple to the RWE 102 to determine the amount of RC available on the game and other metrics of wagering on the gambling game (and potentially affect the amount of RC in play on the RWE). The GWE additionally contains various audit logs and activity meters (such as the GWC meter) 118. The GWE 112 can also couple to a centralized server for exchanging various data related to the player and their activities on the game. The GWE 112 furthermore couples to the ESE 120.

In accordance with some embodiments, the GWE includes an intermediate in-game resource module 119. The intermediate in-game resource module includes the control logic for controlling the GWE's generation of intermediate in-game resources as described herein.

In accordance with some embodiments, a level n game world credit pay table (Table Ln-GWC) 116 dictates the Game World Credit (GWC) earned as a function of player skill in the nth level of the game. The payouts governed by this table are dependent upon player skill and sponsored gameplay at large and can or cannot be coupled to a RNG. In accordance with some embodiments, GWCs are player points earned or depleted as a function of player skill, specifically as a function of player performance in the context of the game. GWC is analogous to the score in a typical video game. Each entertainment game has one or more scoring criterion, embedded within the table Ln-GWC 116 that reflects player performance against the goal(s) of the game. GWCs can be carried forward from one level of sponsored gameplay to another, and ultimately paid out in various manners such as directly in cash, or indirectly such as by earning entrance into a sweepstakes drawing, or earning participation in, or victory in, a tournament with prizes. GWCs can be stored on a player tracking card or in a network-based player tracking system, where the GWCs are attributed to a specific player.

In accordance with certain embodiments, the operation of the GWE does not affect the RWE's gambling operation except for player choice parameters, including but not limited to, wager terms such as, but not limited to, a wager amount, how fast the player wants to, and/or agreement to wager into a bonus round. In this sense, the RWE 102 provides a fair and transparent, non-skill based gambling proposition co-processor to the GWE 112. In the illustrated embodiment, the communication link shown between the GWE 112 and the RWE 102 allows the GWE 112 to obtain information from the RWE 102 as to the amount of RC available in the gambling game. The communication link can also convey a status operation of the RWE (such as on-line or tilt). The communication link can further communicate the various gambling control factors which the RWE 102 uses as input, such as the number of RC consumed per game or the player's election to enter a jackpot round. In FIG. 1, the GWE 112 is also shown as connecting to the player's user interface directly, as this can be utilized to communicate certain entertainment game club points, player status, control the selection of choices and messages which a player can find useful in order to adjust the entertainment game experience or understand their gambling status in the RWE 102.

In accordance with various embodiments of the invention, the ESE 120 manages and controls the visual, audio, and player control for the entertainment game. In accordance with certain embodiments, the ESE 120 accepts input from a player through a set of hand controls, and/or head, gesture, and/or eye tracking systems and outputs video, audio and/or other sensory output to a user interface. In accordance with many embodiments, the ESE 120 can exchange data with and accept control information from the GWE 112. In accordance with some of these embodiments an ESE 120 can be implemented using a Personal Computer (PC), a Sony PlayStation® (a video game console developed by Sony Computer Entertainment of Tokyo Japan), or Microsoft Xbox® (a video game console developed by Microsoft Corporation of Redmond, Wash.) running a specific entertainment game software program. In accordance with some of these embodiments, ESE 120 can be an electromechanical game system of an intermediate in-game resource hybrid game that is an electromechanical hybrid game. An electromechanical hybrid game executes an electromechanical game for player entertainment. The electromechanical game can be any game that utilizes both mechanical and electrical components, where the game operates as a combination of mechanical motions performed by at least one player or the electromechanical game itself. Various electromechanical hybrid games are discussed in Patent Cooperation Treaty Application No. PCT/US12/58156, filed Sep. 29, 2012, the contents of which are hereby incorporated by reference in their entirety.

The ESE 120 operates mostly independently from the GWE 112, except that via the interface, the GWE 112 can send certain entertainment game control parameters and resources or elements to the ESE 120 to affect its play, such as (but not limited to) what level of character to be using, changing the difficulty level of the game, changing the type of gun or car in use, and/or requesting portions to become available or to be found by the character. These game control parameters and elements can be based on a gambling outcome of a gambling game that was triggered by an element in the entertainment game being acted upon by the player. The ESE 120 can accept this input from the GWE 112, make adjustments, and continue entertainment game gameplay all the while running seamlessly from the player's perspective. The ESE's operation is mostly skill based, except for where the ESE's processes can inject complexities into the game by chance in its normal operation to create unpredictability in the entertainment game. Utilizing this interface, the ESE 120 can also communicate player choices made in the game to the GWE 112, such as but not limited to selection of a different gun, and/or the player picking up a special portion in the GW environment. The GWE's function in this architecture, being interfaced with the ESE 120, is to allow the transparent coupling of entertainment software to a fair and transparent random chance gambling game, providing a seamless perspective to the player that they are playing a typical popular entertainment game (which is skill based). In accordance with certain embodiments, the ESE 120 can be used to enable a wide range of entertainment games including but not limited to popular titles from arcade and home video games, such as but not limited to Gears of War (a third person shooter game developed by Epic Games of Cary, N.C.), Time Crisis (a shooter arcade game developed by Namco Ltd of Tokyo, Japan), or Madden Football (an American football video game developed by EA Tiburon of Maitland, Fla.). Providers of such software can provide the previously described interface by which the GWE 120 can request amendments to the operation of the ESE software in order to provide seamless and sensible operation as both a gambling game and an entertainment game.

In accordance with some embodiments, the RWE 102 can accept a trigger to run a gambling game in response to actions taken by the player in the entertainment game as conveyed by the ESE 120 to the GWE 112, or as triggered by the GWE 112 based on its algorithms, background to the overall game from the player's perspective, but can provide information to the GWE 112 to expose the player to certain aspects of the gambling game, such as (but not limited to) odds, amount of RC in play, and amount of RC available. The RWE 102 can accept modifications in the amount of RC wagered on each individual gambling try, or the number of gambling games per minute the RWE 102 can execute, entrance into a bonus round, and other factors, all the while these factors can take a different form than that of a typical slot machine. An example of a varying wager amount that the player can choose can include, but is not limited to, gameplay with a more powerful character, a more powerful gun, or a better car. These choices can increase or decrease the amount wagered per individual gambling game, in the same manner that a standard slot machine player can decide to wager more or less credits for each pull of the handle. In accordance with some of these embodiments, the RWE 102 can communicate a number of factors back and forth to the GWE 112, via an interface, such increase/decrease in wager being a function of the player's decision making as to their operational profile in the entertainment game (such as but not limited to the power of the character, gun selection or car choice). In this manner, the player is always in control of the per game wager amount, with the choice mapping to some parameter or component that is applicable to the entertainment game experience of the intermediate in-game resource hybrid game. In accordance with a particular embodiment, the RWE 102 operation can be a game of chance as a gambling game running every 10 seconds where the amount wagered is communicated from the GWE 112 as a function of choices the player makes in the operation profile in the entertainment game.

In accordance with many embodiments, an intermediate in-game resource hybrid game integrates a video game style gambling machine, where the gambling game (including an RWE 102 and RC) is not player skill based, while at the same time allows players to use their skills to earn club points which a casino operator can translate to rewards, tournament opportunities and prizes for the players. The actual exchange of monetary funds earned or lost directly from gambling against a game of chance in a gambling game, such as a slot machine, is preserved. At the same time, a rich environment of rewards to stimulate gamers can be established with the entertainment game. In accordance with some of these embodiments, the intermediate in-game resource hybrid game can leverage very popular titles with gamers and provides a sea change environment for casinos to attract players with games that are more akin to the type of entertainment that a younger generation desires. In accordance with various embodiments, players can use their skill towards building and banking Game World Credit (GWC) that in turn can be used to win tournaments and various prizes as a function of their gamer prowess. Numerous embodiments minimize the underlying changes needed to the aforementioned entertainment software for the intermediate in-game resource hybrid game to operate within an entertainment game construct, thus making a plethora of complex game titles and environments, rapid and inexpensive to deploy in a gambling environment.

In accordance with some embodiments, the use of the RWE, GWE and ESE allows for the separation of control of an intermediate in-game resource hybrid game between different devices. For example, the ESE may be hosted by a device that is separate from any devices that host the RWE and/or GWE. Through separation of control of the functions of the ESE, RWE and GWE, the RWE may be isolated from the player's device, thus preventing player interference with the RWE and the gambling game. In addition, as the ESE is responsible for providing the entertainment game, intermediate in-game resource hybrid games may provide for complex entertainment games for the player as the ESE need not include the tightly regulated components of the RWE, thus providing for more freedom in ESE design. Also, separation of control allows a GWE to provide complex wager initiation rules that would not be possible if the either the ESE or the RWE were to be in control of the wager initiation.

In accordance with various embodiments, an intermediate in-game resource hybrid game allows for interleaving of continuous wagering within an entertainment game. For example, instead of wagering once, and then playing an entertainment game to completion, or playing an entertainment game to completion and then placing a wager, an intermediate in-game resource hybrid game allows a gaming system or device to be provided to a player where the gaming system or device provides a complex and interesting entertainment game with wagering incorporated throughout the entertainment game.

In various embodiments, an intermediate in-game resource hybrid game provides for feedback into the entertainment game of additional entertainment game resources that are made available in the ESE for the use of the player as the result of wagering outcomes. The additional entertainment game resources may enable portions of the entertainment game that were not available to the player without the resources.

In many embodiments, an intermediate in-game resource hybrid game provides the ability to use the intermediate in-game resource hybrid game in more than one jurisdiction, as the ESE is a component separate from the GWE and RWE. For example, the ESE may be operated as either a pure entertainment game, or as a gambling game depending on the type can characteristics of the RWE that the ESE is coupled to.

In some embodiments, an intermediate in-game resource hybrid game provides for display of an entertainment game on a player's device that the player is using to interact with the entertainment game, as well as providing a separate display of a state of a gambling game on a separate gambling game display. The separate gambling game display may be on the player's device within the same physical display device, on a separate device having a separate physical screen, or on a separate physical display device on the player's device.

In many embodiments, an intermediate in-game resource hybrid game provides a quanta selector user interface that displays to a player a selection of in-game elements for an entertainment game. The quanta selector user interface allows a player to select between entertainment game in-game resources or elements rather than have these elements arbitrarily provided to the player based on wagering outcomes.

In accordance with some embodiments, intermediate in-game resource hybrid games also allow players to gain entry into subsequent competitions through the accumulation of Game World Credits (GWC) as a function of the user's demonstrated skill at the game. These competitions can pit individual players or groups of players against one another and/or against the casino to win prizes based upon a combination of chance and skill. These competitions can be either asynchronous events, whereby players participate at a time and/or place of their choosing, or they can be synchronized events, whereby players participate at a specific time and/or venue.

In accordance with some embodiments, one or more players engage in playing an entertainment game, resident in the ESE, the outcomes of which are dependent at least in part on skill. The intermediate in-game resource hybrid game can include an entertainment game that includes head to head play between a single player and the computer, between two or more players against one another, or multiple players playing against the computer and/or each other, as well as the process by which players bet on the outcome of the entertainment game. The entertainment game can also be a game where the player is not playing against the computer or any other player, such as in games where the player is effectively playing against himself or herself (such as but not limited to Solitaire and Babette).

The designs disclosed herein relate generally to an interactive entertainment game where skill and chance may coalesce to provide a rich arcade-style gaming experience, visually exciting and challenging, where players may wager cash, credits prizes and points in order to win more of the foregoing.

Many of the embodiments of the design provide an enticing method of gaming to the players who expect a high level of entertainment content in their gaming experience compared to the relatively simple game methods in use today.

Figure 2:
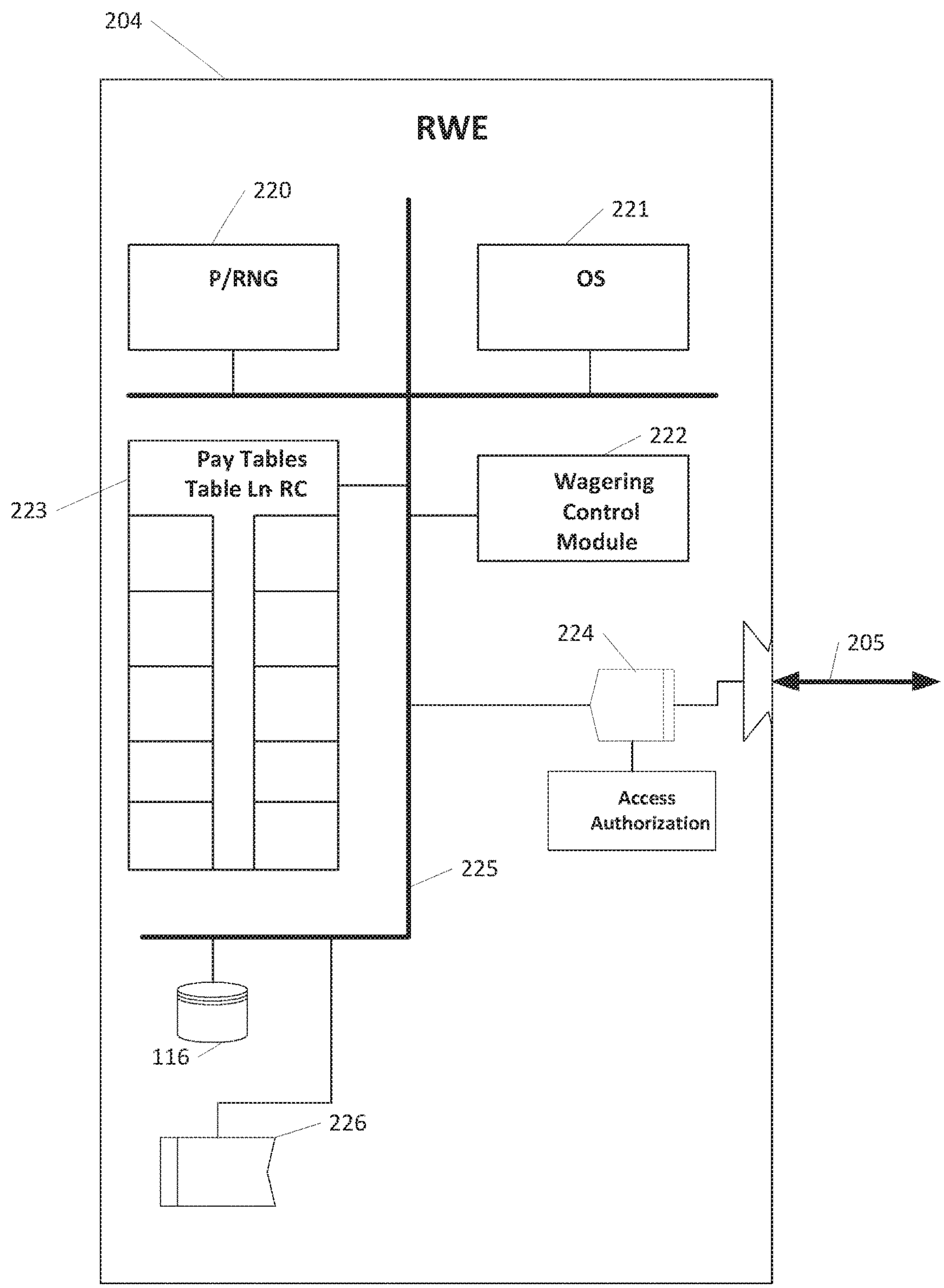
FIG. 2 illustrates a conceptual diagram of aspects of a Real World Engine (RWE) of an intermediate in-game resource hybrid game in accordance with some embodiments of the invention.

The components provided by the RWE for an intermediate in-game resource hybrid game in accordance with embodiments of the invention are shown in FIG. 2. In accordance with embodiments of the invention, the RWE includes an internal bus 225 that connects an operating system OS 221, a pseudo random or random number generator (P/RNG) 220, one or more pay tables (Table Ln-RC) 223 which would control the functions of the RWE, a pseudo random or random number generator (P/RNG) 220 to produce random numbers, one or more pay tables (Table Ln-RC) 223, a wagering control module 222, an authorization access module 224, and a RC credit meter 226 that are included in the RWE 204. The RW OS 221 controls the functions of the RWE. The P/RNG 220 includes one or more RNGs that are used to produce random numbers for use in resolving gambling events and other process requiring a random number to determine an outcome. The one or more pay tables (Table Ln-RC) 223 contain a plurality of factors indexed by the random number to be multiplied with the RC wagered to determine the payout on a successful wager. A wagering control module 222 performs the processes to resolve a wager on a proposition of a gambling event. The resolution process includes, but is not limited to, pulling random numbers, looking up factors in Pay Tables, multiplying the factors by the amount of RC wagered, and administering a RC credit meter 226. A repository (a credit meter) 926 maintains a record of the amount of RC which player has deposited in the game and has been accumulated by the player.

An external connection allows the RWE 204 to interface to another system or device, which is shown in FIG. 2 as the Internet 205 but may be any other network and/or device. The authorization access module 224 of RWE 204 is connected to the external connection and provides a method to permit access and command exchange between an external system and the RWE 904. The RWE 904 also contains storage for statuses, wagers, wager outcomes, meters and other historical events in a storage device 116.

Figure 3:
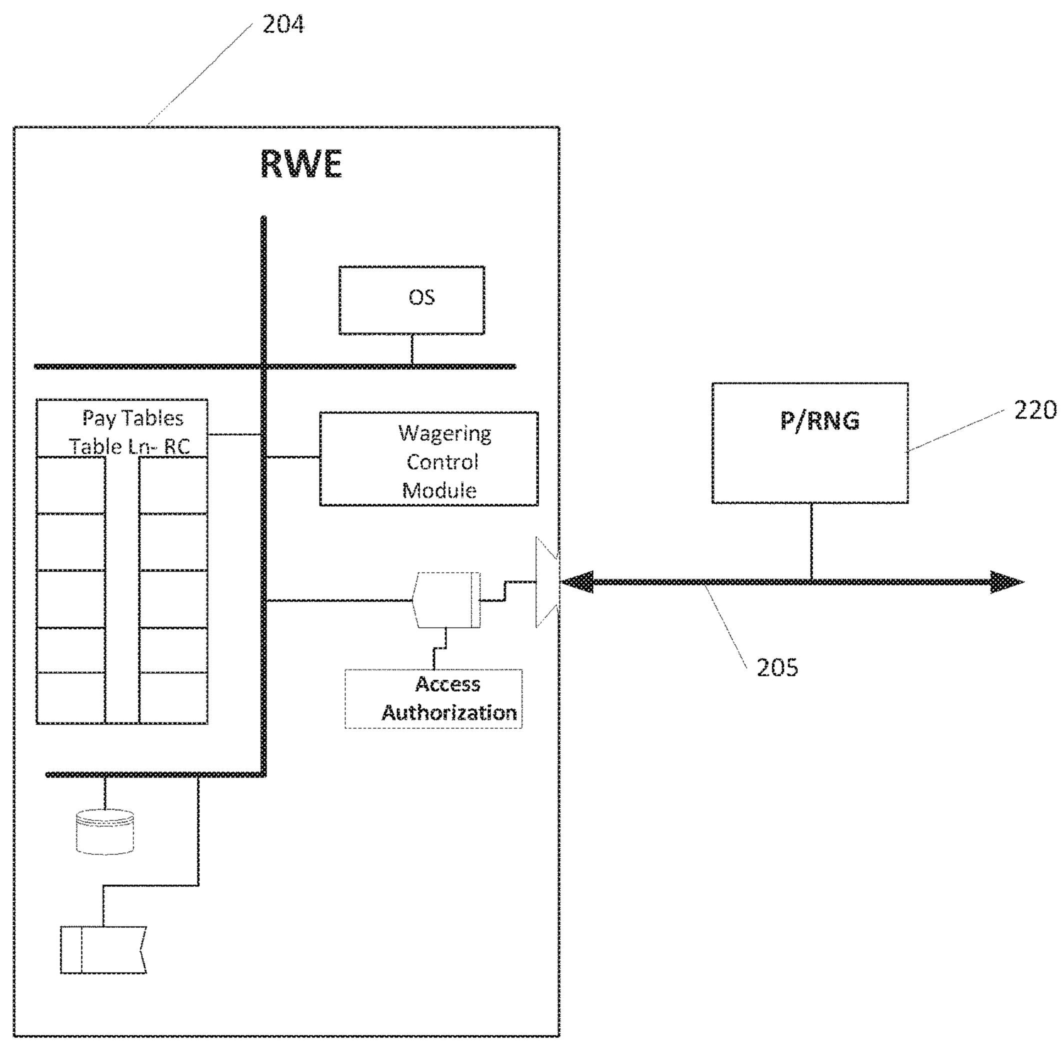
FIG. 3 illustrates a conceptual diagram of aspects of a Real World Engine of an intermediate in-game resource hybrid game in accordance with some other embodiments of the invention.

In some embodiments, the RWE communicates with external systems to provide various functions of an intermediate in-game resource hybrid game in accordance with embodiments of the invention. The components of an RWE that communicate with an external system to provide a component of the RWE in accordance with embodiments of the invention are shown in FIG. 3. The RWE 204 shown in FIG. 3 is similar to the RWE shown in FIG. 2. However, the P/RNG 220 which is an external system connected to the RWE 204 by the internet 905 in accordance with embodiments of the invention. The P/RNG 220 could be a central deterministic system, such as a regulated and controlled random numbered ball selection device, or some other system which provides random or pseudo random numbers to one or a plurality of connected RWEs 204. One skilled in the art will recognize that only P/RNG 220 is an external system in the shown embodiments. However, any of the components could be external systems without departing from the invention and P/RNG 220 is shown as an example only.

In FIGS. 2 and 3, the RWE 204 interfaces with other systems/devices or to an external P/RNG 220 using the Internet 205. However, one skilled in the art will note that nothing would preclude using a different interface than the internet 205 in other embodiments of the invention. Other examples of interfaces include, but are not limited to, a LAN, a USB interface, or some other method by which two electronic and software constructs could communicate with each other.

Figure 4:
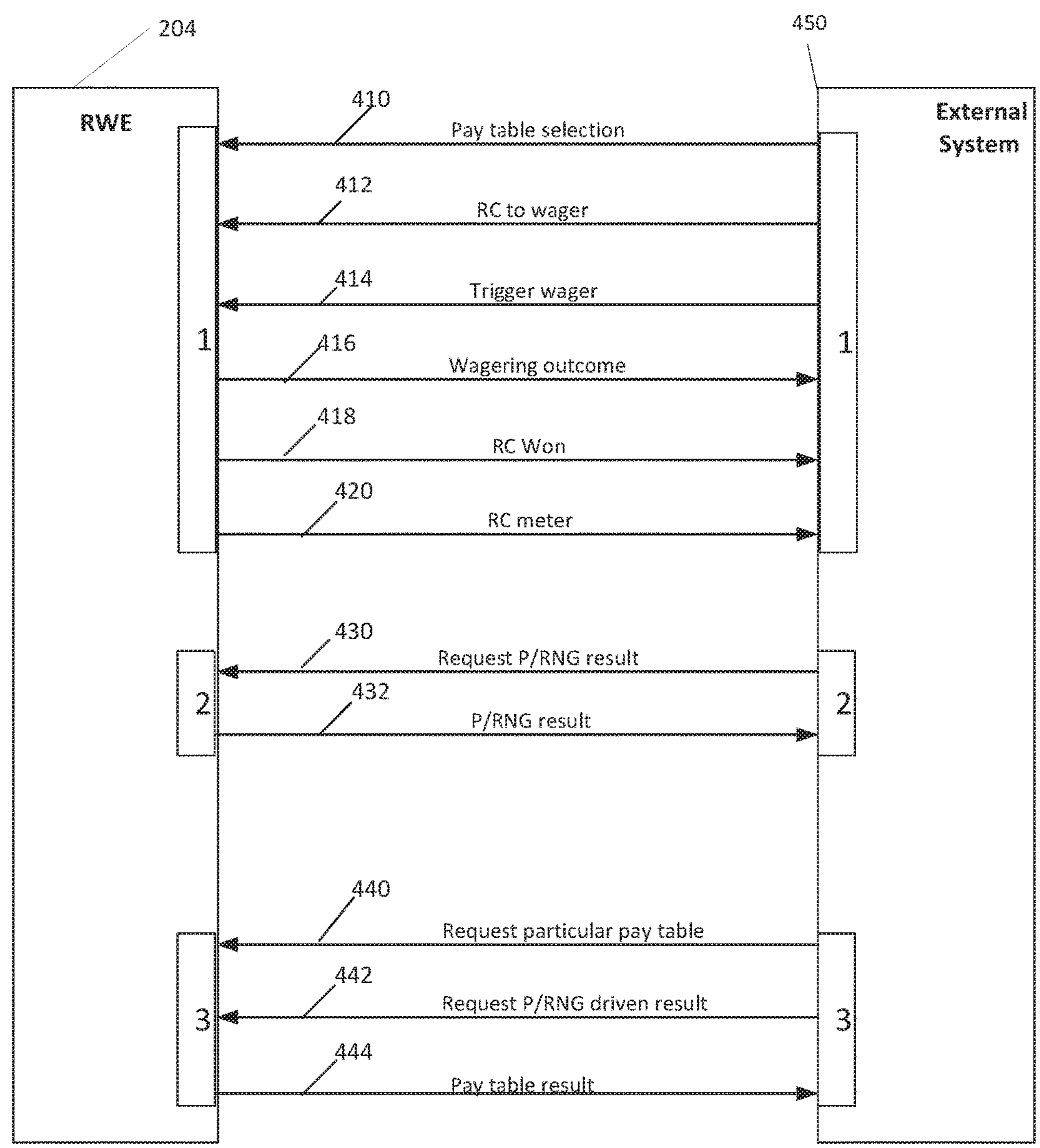
FIG. 4 illustrates a signaling diagram of communications between a Real World Engine (RWE) and an external system to provide various functions in accordance with embodiments of the invention.

The RWE and an external system typically communicate to provide the resolution of gambling events to resolve wagers on the events. The signals between the RWE and an external system to provide some process related to resolving gambling events in accordance with embodiments of the invention are shown in FIG. 4. In accordance with embodiments of the invention, the primary function of the RWE 204 is to manage wagering events and to provide random (or pseudo random) numbers from an RNG. At the top of the figure, a 6 component communication exchange grouped by the "1" box is shown for a wager on a proposition in a gambling event during an intermediate in-game resource hybrid game in accordance with embodiments of the invention. An external system 450 that is requesting wagering support from the RWE 204 instructs the RWE 204 as to the pay table (Table Ln-RC) to use (410), followed by the amount of RC to wager on the proposition of the gambling event (412). Next, the external system 450 signals the RWE to trigger a wager or perform the gambling event (414). The RWE 204 resolves the gambling event. The RWE 204 then informs external system 450 as to the outcome of the wager (416), the amount of RC won (418), and the amount of RC in the player's account (in the credit repository) (420).

A second communication exchange between the RWE 204 and an external system 450 in accordance with embodiments of the invention that is shown in FIG. 4 is grouped by the "2" box in FIG. 4 and relates to the external system 450 needing a P/RNG result support from the RWE 204. In this exchange, the external system 450 requests a P/RNG result from the RWE 204 (430). The RWE 204 returns a P/RNG result to the external 450 in response to the request (432). The result may be generated as a function of the internal P/RNG in the RWE 204, or from a P/RNG external to the RWE 204 to which the RWE 204 is connected.

A third communication exchange between the RWE 204 and the external system 405 in accordance with embodiments of the invention that is shown in FIG. 4 is grouped by the "3" box in the figure and relates to the external system 450 wanting support on coupling a P/RNG result to a particular Pay Table contained in the RWE 204. In this exchange, the external system 450 instructs the RWE as to the pay table (Table Ln-RC) to use 450. The external system then requests a result whereby the P/RNG result is coupled to the requested Pay Table (442). The result is returned to the external system 405 by RWE 204 (444). Such an aspect is different from the first exchange shown by the box"1" sequence in that no actual RC wager is conducted. However, such a process t might be useful in coupling certain non-RC wagering entertainment game behaviors and propositions to the same final resultant wagering return which is understood for the intermediate in-game resource hybrid game to conduct wagering.

In regards to FIG. 4, one skilled in the art will note that the thrust of the FIG. 4 is to convey overall functional exchanges between an RWE 204 and an external system 450. As such, various protocol layers necessary for error free and secure communication, and other status, setup, and configuration commands which one might expect in any protocol between two connected systems have been omitted for clarity. Furthermore, some or all of the various commands and responses illustrated could be combined into one or more communication packets without departing from the invention.

Figure 5:
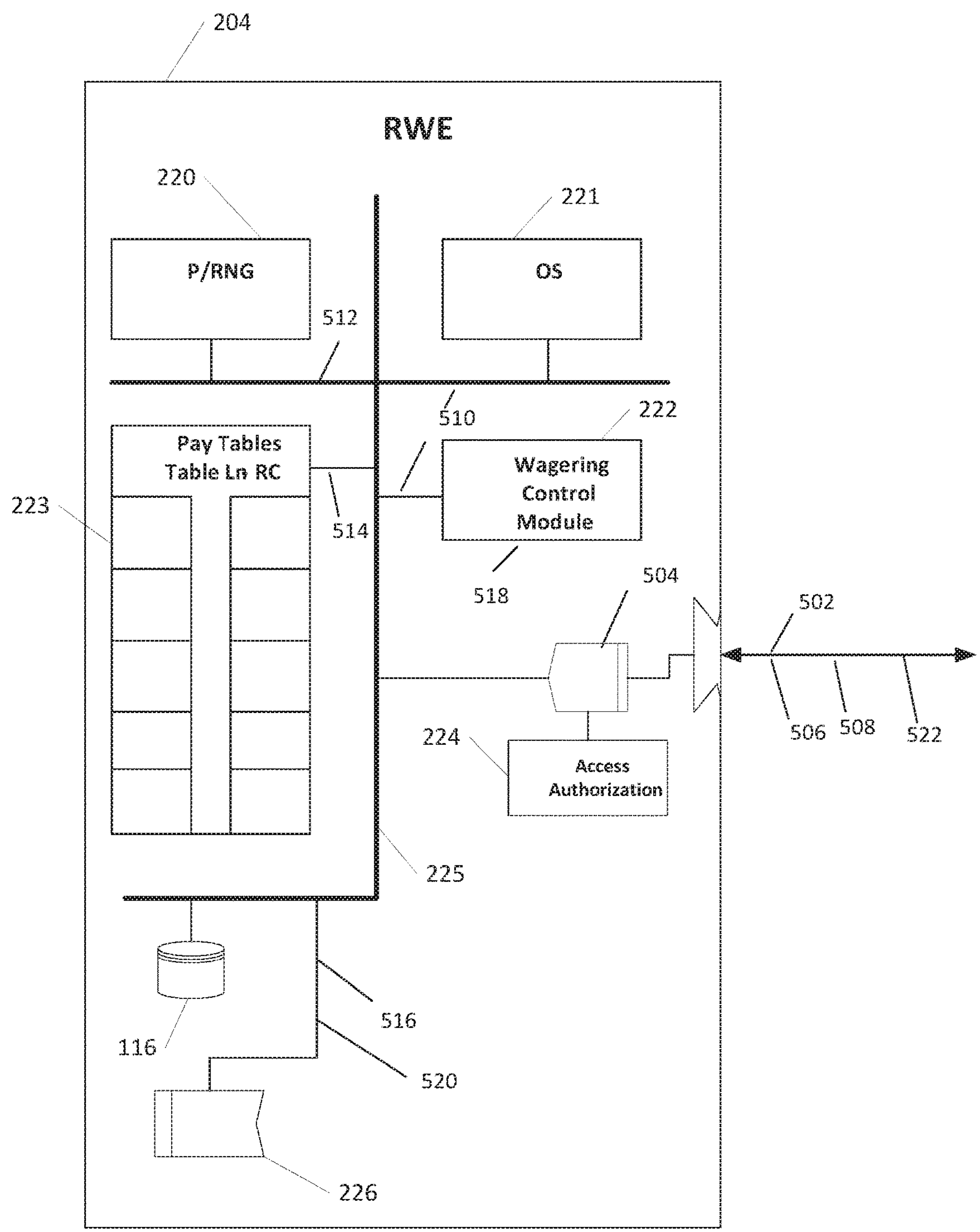
FIG. 5 illustrates a conceptual diagram of a process flow and signaling in a Real World Engine to provide various functions in accordance with embodiments of the invention.

The process flow for functional communication exchanges, such as communication exchanges described above with reference to FIG. 4, between a RWE and an external system in accordance with embodiments of the invention are shown in FIG. 5. The process begins by a RWE 204 receiving signals from an external system requesting a connection to RWE 204. The Access Authorization Module determines that the external system authorized to connect to RWE 204 (504) and transmits an authorization response to the external system. The external systems that provide requests a request for a gambling event is to be performed to RWE 294 (506). The request may include an indication of a wager amount on a proposition in the gambling event, and a proper pay table to use to resolve the wager. The external system then sends a signal to trigger the gambling event (508).

The OS 221 instructs the Wager Control Module 222 as to the RC wager and the Pay Table to select as well as to resolve the wager execute (510). In response to the request to execute the gambling event, the wager control module 222 requests a P/RNG result from the P/RNG 220 (512); retrieves a proper pay table or tables from the pay tables 223 (514), adjusts the RC of the player in the RC repository 926 as instructed (516; applies the P/RNG result to the particular pay table or tables (518); and multiplies the resultant factor from the Pay Table by the amount of RC to determine the result of the wager (518). Wager Control Module 222 then adds the amount of RC won by the wager to the RC repository 426 (520); and provides the outcome of the wager, and the amount of RC in the RWE and the RC won (522). One skilled in the art will recognize that there may be many embodiments of an RWE 204 which could be possible, including forms where many modules and components of the RWE are located in various servers and locations, so the foregoing is not meant to be exhaustive or all inclusive, but rather provide information about an RWE 204 in accordance with some embodiments of the invention.

Figure 6:
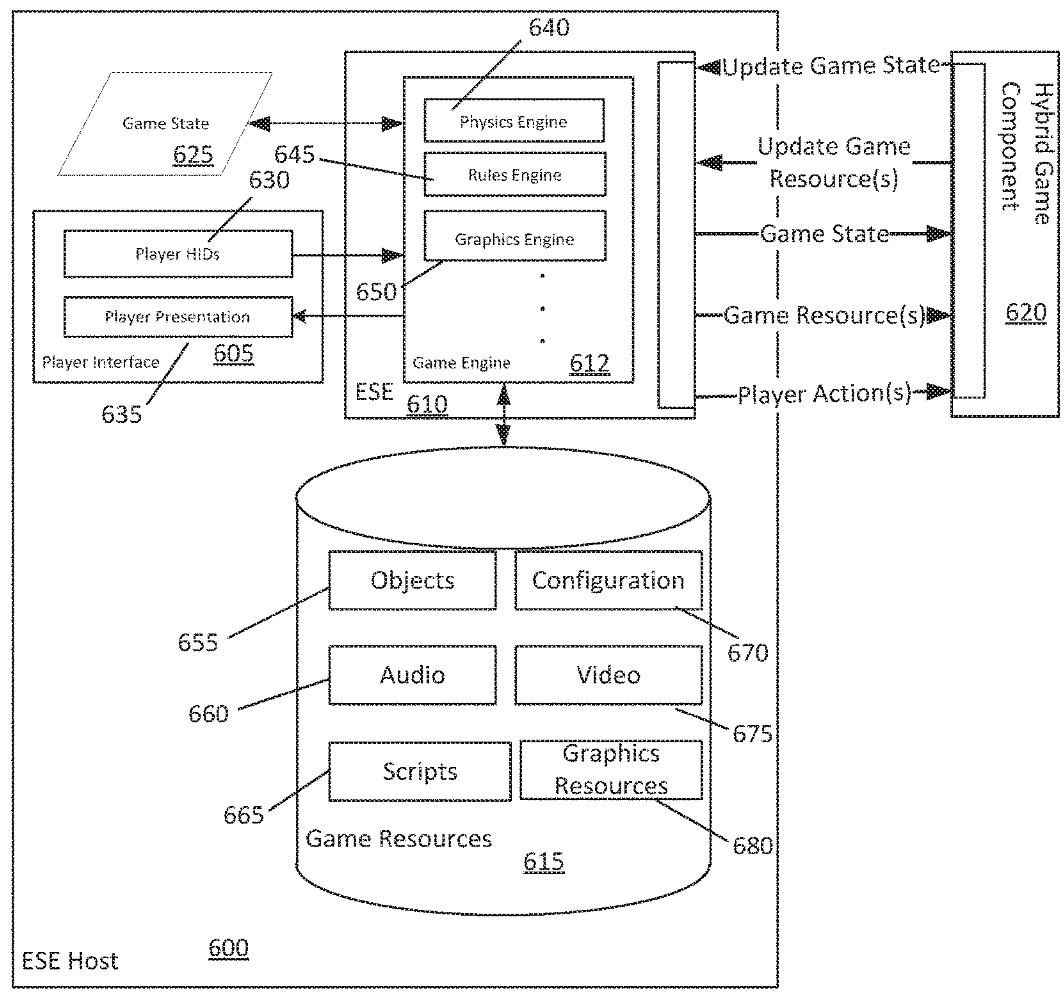
FIG. 6 illustrates a conceptual diagram of aspects of an Entertainment System Engine in accordance with embodiments of the invention.

A block diagram of components an ESE being provided by an ESE host for an intermediate in-game resource hybrid game in accordance with embodiments of the invention are shown in FIG. 6. An ESE 610 may be part of the entertainment game itself, may be a software module that is executed by the entertainment game, or may provide an execution environment for the entertainment game for a particular host. The ESE 610 and associated entertainment game are hosted by an ESE host 600. The ESE host 600 is a computing device that is capable of hosting the ESE 610 and the entertainment game. Exemplary hosts include video game consoles, smart phones, personal computers, tablet computers, or the like. The entertainment game includes a game engine 612 that generates a player interface 605 for interaction with by a player. The player interface includes a player presentation 635 that is presented to a player through the player interface. The player presentation 635 may be audio, visual or tactile, or any combination of such. The player interface 635 further includes one or more Human Input Devices (HIDs) 630 that the player uses to interact with the entertainment game. Various components or sub-engines of the game engine read data from a game state in order to implement the features of the game. Components of the game engine include a physics engine 640 used to simulate physical interactions between virtual objects in the game state, a rules engine 645 for implementing the rules of the game, a P/RNG that may be used for influencing or determining certain variables and/or outcomes to provide a randomizing influence on game play, a graphics engine 650 used to generate a visual representation of the game state to the player, an audio engine to generate audio outputs for the player interface, and any other engine needed to provide the entertainment game. The game engine 612 reads and writes game resources 615 stored on a data store of the ESE host. The game resources 615 include game objects 655 having graphics and/or control logic used to implement game world objects of the game engine. The game resources 615 also include video files 675 that are used to generate cut-scenes for the entertainment game. The game resources 615 may also include audio files 660 used to generate music, sound effects, etc. within the entertainment game. The game resources 615 may also include configuration files 670 used to configure the features of the entertainment game. The game resources 615 may also include scripts 665 or other types of control code used to implement various game play features of the entertainment game. The game resources 615 may also include graphics resources 680 including, but not limited to, textures, and objects that are used by the game engine to render objects displayed in the entertainment game.

In operation, components of the game engine 612 read portions of the game state 625 and generate the player presentation for the player which is presented to the player using the player interface 605. The player perceives the presentation 635 and provides player inputs using the HIDs 630. The corresponding player inputs are received as player actions or inputs by various components of the game engine 612. The game engine translates the player actions into interactions with the virtual objects of the game world stored in the game state 625. Components of the game engine 612 use the player interactions with the virtual objects of the game and the game state 625 to update the game state 625 and update the presentation 635 presented to the user. The process loops in a game loop continuously while the player plays the game.

In some embodiments, the ESE is a host running a browser that communicates with a server serving documents in a markup language, such as Hypertext Markup Language 5 (HTML 5) or the like, and the functions of the game engine are performed by the browser on the basis of the markup language found in the documents. In some embodiments, the ESE is a host hosting a specialized software platform, such as Adobe Flash or the like, used to implement games or other types of multimedia presentations, and the functions of the game engine are performed by the specialized platform.

The ESE 610 provides one or more interfaces between an entertainment game and other components 620 of an intermediate in-game resource hybrid game, such as a GWE. The ESE 610 and the other intermediate in-game resource hybrid game component 620 communicate with each other using the interfaces, such as by passing various types of data and sending and receiving messages, status information, commands and the like. Examples of communications include, but are not limited to, requesting by the intermediate in-game resource hybrid game component 620 that the ESE 610 update the game state using information provided by the other component; requesting, by the intermediate in-game resource hybrid game component 620, that the ESE 610 update one or more game resources using information provided by the intermediate in-game resource hybrid game component 620; the ESE 610 providing all or a portion of the game state; the ESE 610 providing one or more of the game resources to the intermediate in-game resource hybrid game component 620; and the ESE 610 communicating player actions to the other intermediate in-game resource hybrid game component 620. The player actions may be low level player interactions with the player interface, such as manipulation of an HID, or may be high level interactions with objects as determined by the entertainment game. The player actions may also include resultant actions such as modifications to the game state or game resources resulting from the player's actions taken in the game. Other examples of player actions include actions taken by entities, such as Non-Player Characters (NPC) of the entertainment game, that act on behalf of, or under the control of, the player.

Elements are a limited resource consumed within an entertainment game to advance entertainment game gameplay. In playing the entertainment game using the elements, a player can (optionally) consume and accrue game world credits (GWC) within the entertainment game. These credits can be in the form of (but are not limited to) game world credits, experience points, or points generally. Wagers can be made in the gambling game as triggered by the player's use of one or more elements of the entertainment game. The wagers are made using real world credits (RC). The real world credits can be credits in an actual currency, or can be credits in a virtual currency which may have a real world value. Gambling outcomes from the gambling game can cause consumption, loss or accrual of RC. In addition, gambling outcomes in the gambling game can influence elements in the entertainment game such as (but not limited to) by restoring a consumed element, causing the loss of an element, restoration or placement of a fixed element. In certain embodiments, gambling games can facilitate the wager of GWC for a randomly generated payout of GWC or a wager of elements for a randomly generated payout of elements. In particular embodiments, an amount of GWC and/or elements used as part of a wager can have a RC value if cashed out of a gameplay session.

Example elements include enabling elements (EE) which are elements that enable a player's play of the entertainment game and whose consumption by the player while playing the entertainment game can trigger a wager in a gambling game. Another non limiting example of an element is a reserve enabling element (REE), which is an element that converts into one or more enabling elements upon occurrence of a release event in skill wagering interleaved game gameplay. Other types of elements include actionable elements (AE) which are elements that are acted upon to trigger a wager in the gambling game and may or may not be restorable during normal play of the entertainment game. Another type of element is a common enabling element (CEE) which as an element that may be shared by two or more players and the use of which by any of the players causes a wager to be triggered.

In progressing through entertainment game gameplay, elements can be utilized by a player during interactions with a controlled entity (CE) which is a character, entity, inanimate object, device or other object under control of a player.

Also, entertainment game gameplay progress and wager triggers can be dependent upon a game world variable such as, but not limited to: a required game object (RGO) which is a specific game object in an entertainment game acted upon for an AE to be completed (such as but not limited to a specific key needed to open a door); a required environmental condition (REC) which is a game state present within an entertainment game for an AE to be completed (such as but not limited to daylight whose presence enables a character to walk through woods); or a controlled entity characteristic (CEC) which is a status of the CE within an entertainment game for an AE to be completed (such as but not limited to a CE to have full health points before entering battle). Although various gameplay resources, such as but not limited to GWC, RC and elements as discussed above, any gameplay resource can be utilized to advance gameplay as well as form the basis for a trigger of a wager as appropriate to the specification of a specific application in accordance with various embodiments of the invention. Various hybrid games are discussed in PCT Application Nos. PCT/US11/26768, filed Mar. 1, 2011, PCT/US11/63587, filed Dec. 6, 2011, and PCT/US12/50204 filed Aug. 9, 2012, each disclosure of which is hereby incorporated by reference in its entirety.

Figure 7:
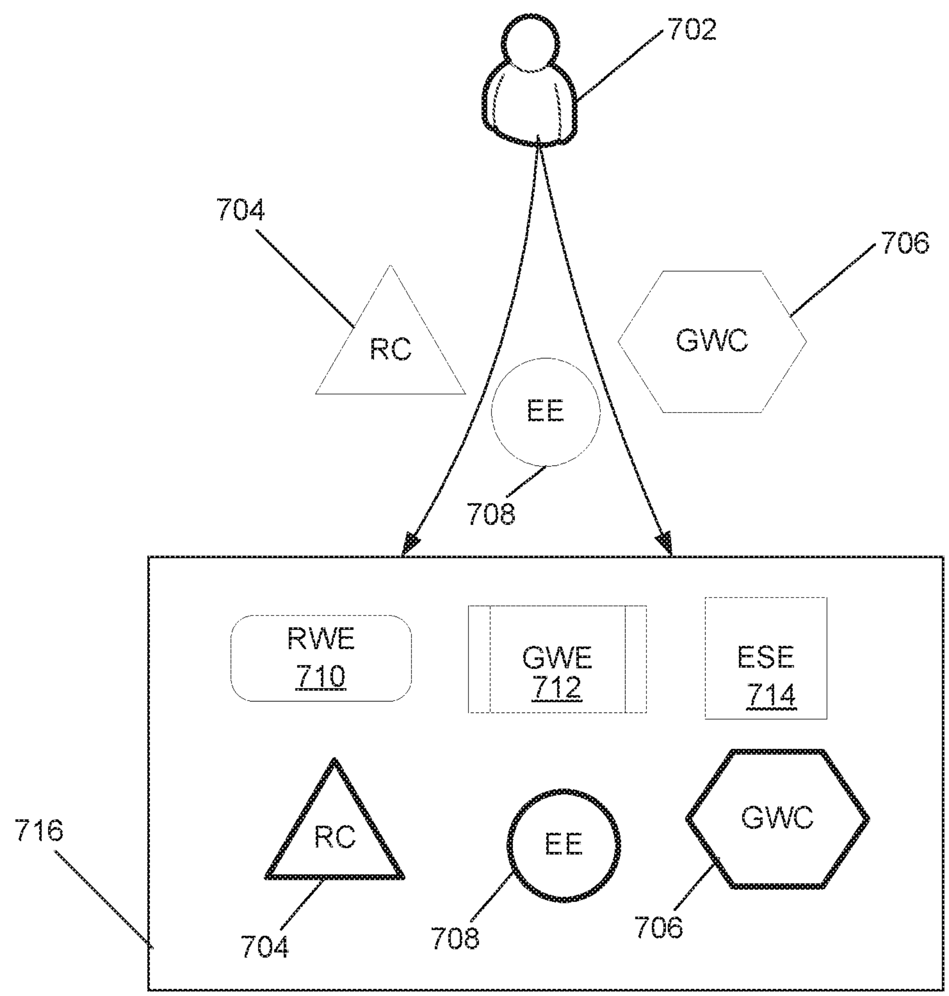
FIG. 7 illustrates a conceptual diagram of interactions between a user and an intermediate in-game resource hybrid game in accordance with embodiments of the invention.

In accordance with some embodiments, a player can interact with an intermediate in-game resource hybrid game by using RC in interactions with a gambling game along with GWC and elements in interactions with an entertainment game. The gambling game can be executed by a RWE while an entertainment game can be executed with an ESE and managed with a GWE. A conceptual diagram that illustrates how resources such as GWC, RC and elements, such as but not limited to enabling elements (EE), are utilized in an intermediate in-game resource hybrid game in accordance with an embodiment of the invention is illustrated in FIG. 7. The conceptual diagram illustrates that RC 704, EE 708 and GWC 706 can be utilized by a player 702 in interactions with the RWE 710, GWE 712 and ESE 714 of a based intermediate in-game resource hybrid game 716. The contribution of elements, such as EE 708, can be linked to a player's access to credits, such as RC 704 or GWC 706. Electronic receipt of these credits can come via a smart card, voucher or other portable media, or as received over a network from a server. In accordance with certain embodiments, these credits can be drawn on demand from a player profile located in a database locally on an intermediate in-game resource hybrid game or in a remote server.

Figure 8:
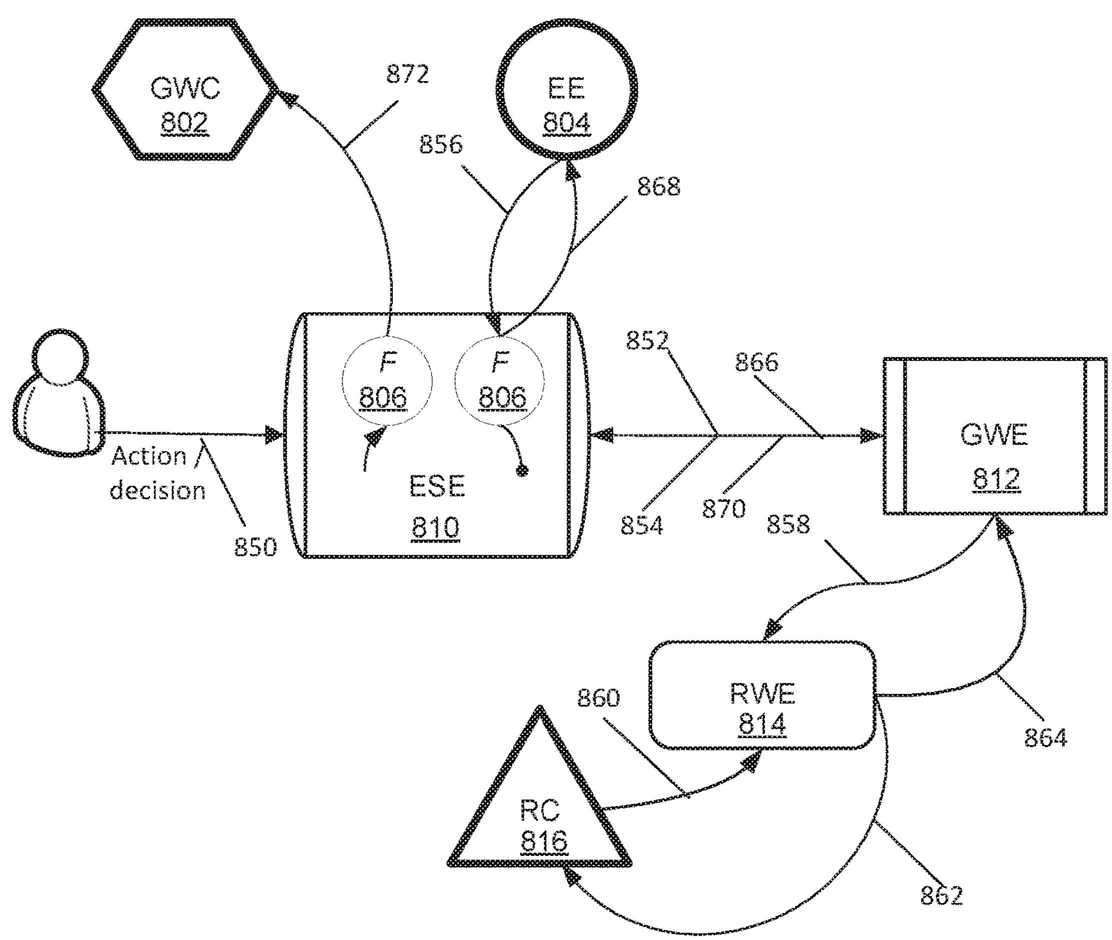
FIG. 8 illustrates a conceptual diagram of the interplay between aspects of an intermediate in-game resource hybrid game in accordance with some embodiments of the invention using Real World Currency (RC).

A conceptual diagram that illustrates the interplay between aspects of an intermediate in-game resource hybrid game in accordance with an embodiment of the invention using real world credit (RC) is illustrated in FIG. 8. Similar to FIG. 7, a player's actions and/or decisions can affect functions 806 that consume and/or accumulate GWC 802 and/or EE 804 in an entertainment game executed by an ESE 810. A GWE 812 can monitor the activities taking place within an entertainment game executed by an ESE 810 for gameplay gambling event occurrences. The GWE 812 can also communicate the gameplay gambling event occurrences to an RWE 814 that triggers a wager of RC 816 in a gambling game executed by the RWE 814.

In accordance with some embodiments of the invention, the following may occur during use of the intermediate in-game resource hybrid game. The user enters an input that represents an action or decision (850). The ESE 810 signals the GWE 812 with the input decision or action (852). The GWE 812 responds by signaling to ESE 810 with the amount of EE that is consumed by the player action or decision (854). The signaling from the GWE 812 configures a function 806 to control the EE consumption, decay, and/or accumulation.

The ESE 810 then adjusts the EE 804 accordingly (856). The GWE 812 signals the RWE 814 as to the profile of the wager proposition associated with the action or decision and triggers the wager (858). The RWE 814 consumes the appropriate amount of RC 816 and executes the wager (860). The RWE 814 then adjusts the RC 816 based upon the outcome of the wager (862) and informs the GWE 812 as to the outcome of the wager (864).

The GWE 812 signals the ESE 810 to adjust EE to one or more of the EEs of the ESE entertainment game (866). Function 806 of the ESE 810 performs the adjustment of EE 804 (868). The ESE 810 signals the GWE 812 as to the updated status (870). In response, the GWE 812 signals the ESE 810 to update GWC of the entertainment game. The ESE updates (872) the GWC 802 using a function 806.

The following is an example of the above flow in a first person shooter game, such a Call of Duty®, using an intermediate in-game resource hybrid game sequence in accordance with embodiments of the invention.

The process begins by a player selecting a machine gun to use in the game and then fires a burst of bullets at an opponent (850). The ESE 810 signals the GWE 812 of the player's choice of weapon, that a burst of bullets was fired, and the outcome of the burst (852). GWE 812 processes the information received and signals ESE 810 to consume 3 bullets (EE) with each pull of the trigger (854). The ESE 810 consumes 3 bullets for the burst using function 806 (856).

The GWE 812 signals the RWE 814 that 3 credits (RC) are to be wagered to match the three bullets consumed. The RWE 814 then determines the result of the wager and may determine the winnings from a pay table. On a particular pay table (Table Ln-RC), a determination is made by RWE 814 as to the amount of damage that the opponent has sustained. The RWE 814 consumes 3 credits of RC 816 for the wager and executes the specified wager (860). The RWE 814 determines that the player hit a jackpot of 6 credits and returns the 6 credits to the RC 816 (862) and signals the GWE 812 that 3 net credits were won by the player (864).

The GWE 812 signals ESE 810 to add 3 bullets to an ammunition clip (866). ESE 810 adds 3 bullets back to the ammo clip (EE 804) using a function 806 (868). The ammunition may be added by directly adding the ammunition to the clip or by allowing the user to find extra ammunition during game play. The GWE 812 logs the new player score (GWC 802) in the game (as a function of the successful hit on the opponent) based on the ESE 810 signaling, and the signals the ESE 810 to add 2 extra points to the player score since a jackpot has been won (870). The ESE 810 then adds 10 points to the player score (GWC 802) given the success of the hit which in this example is worth 8 points, plus the 2 extra points requested by GWE 812 (872). Note that the foregoing example is only intended to provide an illustration of how credits flow in an intermediate in-game resource hybrid game, but is not intended to be exhaustive and only lists only one of numerous possibilities of how an intermediate in-game resource hybrid game may be configured to manage its fundamental credits.

Figure 9:
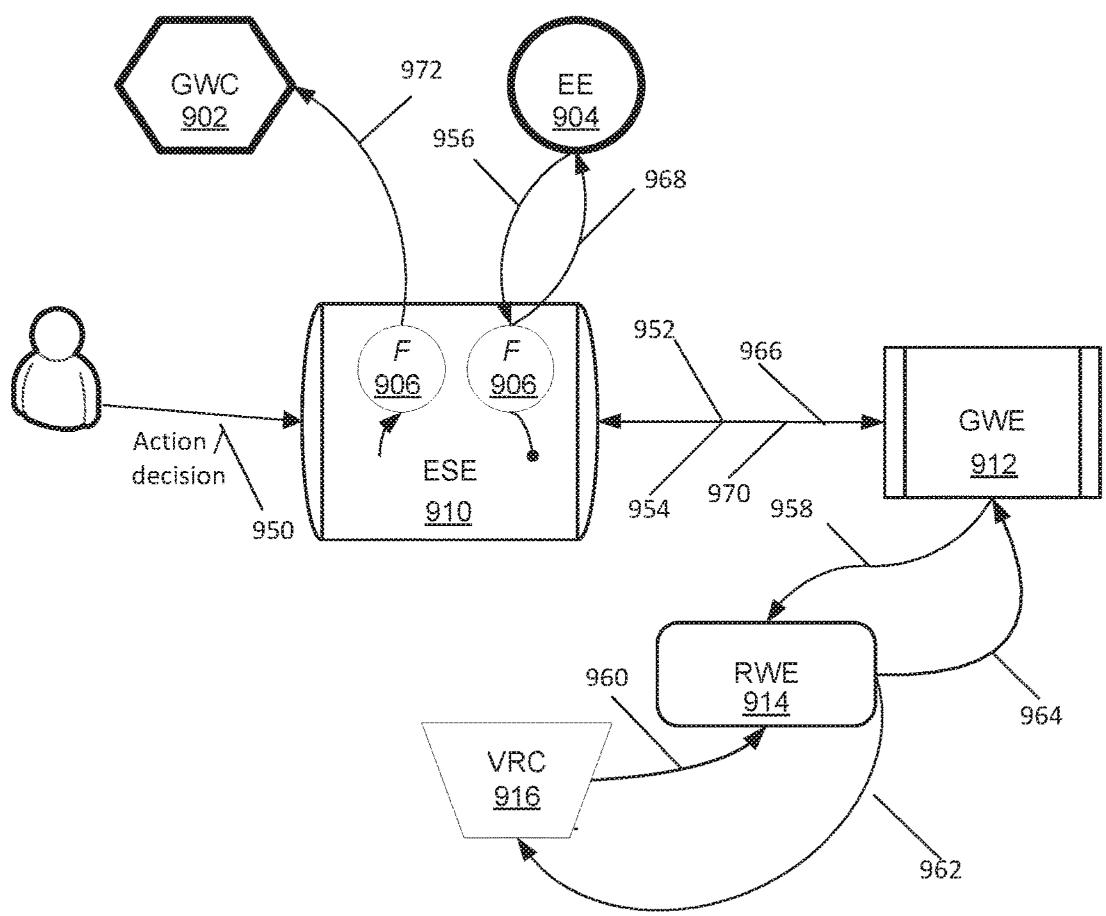
FIG. 9 illustrates a conceptual diagram of illustrates the interplay between aspects of an intermediate in-game resource hybrid game in accordance with other embodiments of the invention using Virtual Real World Currency (VRC).

A conceptual diagram that illustrates the interplay between aspects of an intermediate in-game resource hybrid game in accordance with an embodiment of the invention using virtual real world credit (VRC) is illustrated in FIG. 9. As seen in the FIG. 9, substituting VRC in place of RC is effected without impact to the architecture or operation of the intermediate in-game resource hybrid game. The implementation of FIG. 9 is not the only embodiment using virtual currency within an intermediate in-game resource hybrid game, but shows only one permutation of which many could exist.

Similar to FIG. 8, a player's actions and/or decisions can affect functions 906 that consume and/or accumulate GWC 902 and/or EE 904 in an entertainment game executed by an ESE 910 in the process shown in FIG. 9. A GWE 912 can monitor the activities taking place within an entertainment game executed by an ESE 910 for gameplay gambling event occurrences. The GWE 912 can also communicate the gameplay gambling event occurrences to a RWE 914. Unlike the process shown in FIG. 8, RWE 914 triggers a wager of virtual real world credit (VRC) 916 in a gambling game executed by the RWE 914.

For purposes of this discussion, VRC can be thought of as a form of alternate currency, which can be acquired, purchased or transferred, in unit or in bulk, by/to a player, but does not necessarily directly correlate to RC or real currency. As an example, there is a virtual currency called "Triax Jacks", 1000 units of which are given to a player by an operator of an intermediate in-game resource hybrid game, with additional blocks of 1000 units being available for purchase for $5 USD each block. Triax Jacks could be redeemed for various prizes, or could never be redeemed but simply used and traded purely for entertainment value by players. It would be completely consistent with the architecture of the intermediate in-game resource hybrid game that Triax Jacks would be wagered in place of RC, such that the intermediate in-game resource hybrid game could be played for free, or with played with operator sponsored Triax Jacks.

Returning to the process in FIG. 9, the following may occur during use of the intermediate in-game resource hybrid game in accordance with embodiments of the invention. The user enters an input that represents an action or decision (950). The ESE 910 signals the GWE 912 with the input decision or action (952). The GWE 912 responds by signaling to ESE 910 with the amount of EE that is consumed by the player action or decision (954). The signaling from the GWE 912 configures a function 906 to control the EE consumption, decay, and/or accumulation.

The ESE 910 then adjusts the EE 904 accordingly (956). The GWE 912 signals the RWE 914 as to the profile of the wager proposition associated with the action or decision and triggers the wager (958). The RWE 914 consumes the appropriate amount of RC 916 and executes the wager (960). The RWE 914 then adjusts the RC 916 based upon the outcome of the wager (962) and informs the GWE 912 as to the outcome of the wager (964).

The GWE 912 signals the ESE 910 to adjust EE to one or more of the EEs of the ESE entertainment game (966). Function 906 of the ESE 910 performs the adjustment of EE 904 (968). The ESE 910 signals the GWE 912 as to the updated status (970). In response, the GWE 912 signals the ESE 910 to update GWC 902 of the entertainment game. The ESE updates the GWC 902 using a function 906 (972).

In accordance with many embodiments, gambling events may be repeatedly triggered from the entertainment game via a GWE, thus providing an entertainment game having interleaved gambling events throughout the player's play of the intermediate in-game resource hybrid game.

Network Based Intermediate In-Game Resource Hybrid Game

Figure 10:
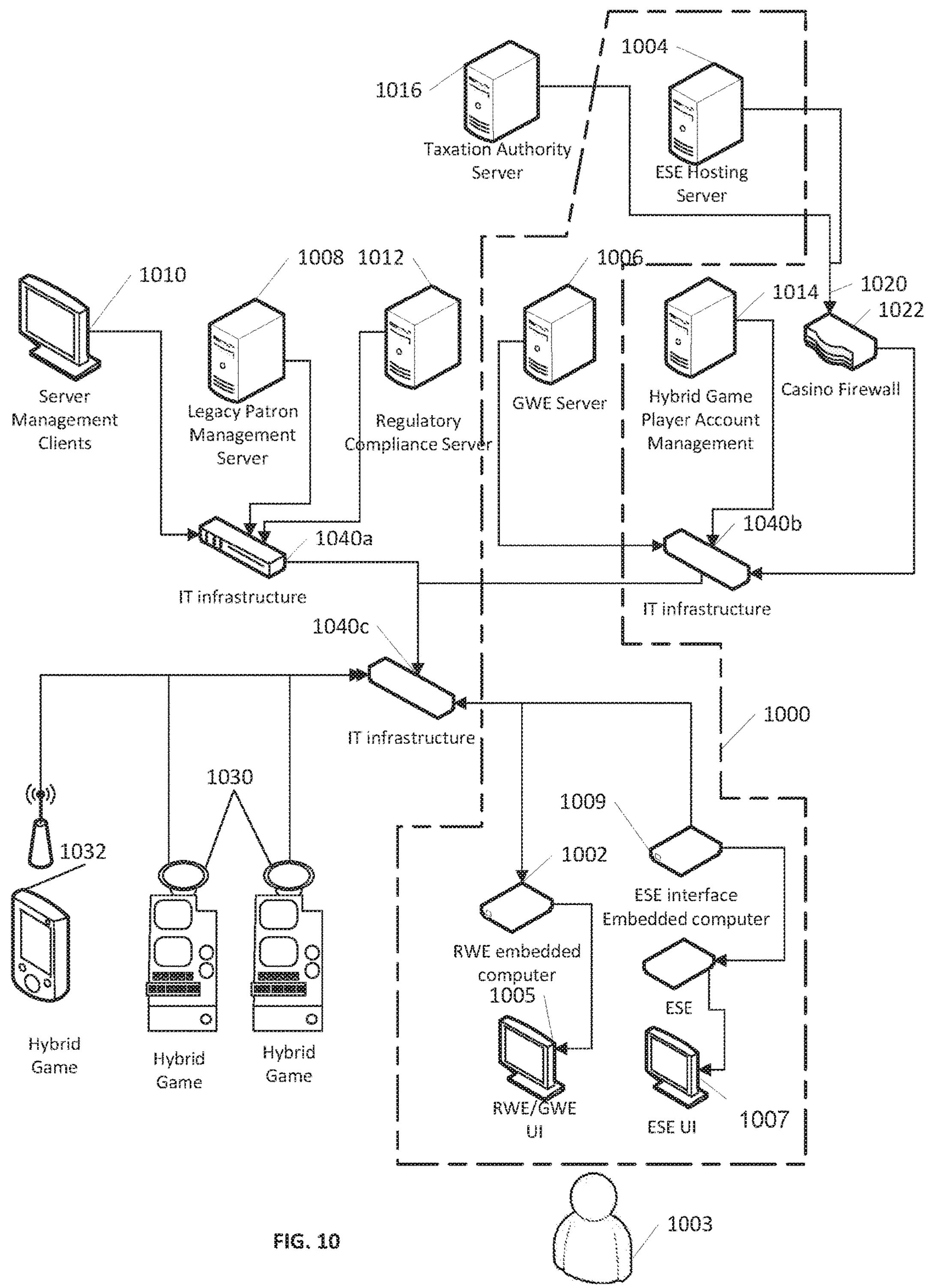
FIG. 10 illustrates a system diagram of an implementation of a network based intermediate in-game resource hybrid game in accordance with another embodiment of the invention.

A system diagram that illustrates an implementation of a network distributed intermediate in-game resource hybrid game with a GWE local server in accordance with embodiments of the invention is illustrated in FIG. 10. In the figure, the intermediate in-game resource hybrid game 1000 includes components, RWE 1002 embedded in a device used as the user interface for player 1003. The device provides both a RWE/GWE user interface 1005 and an ESE user interface 1007 for the player. The ESE is provisioned by an ESE hosting server 1004 via ESE interface 1009, and the GWE is provisioned by GWE server 1006 as indicated by the dashed line. Also pictured in the diagram are a number of other peripheral systems, such as player management 1008, casino management 1010, regulatory 1012, hybrid game player account management 1014, and taxation authority 1016 hosting servers that may be present in such an implementation. FIG. 10 also illustrates various other systems, which may reside outside the bounds of the casino and are connected to the framework via communications network, such as the Internet 1020, depicted by the connection lines past the casino firewall 1022. The end devices utilized for user interfaces for an intermediate in-game resource hybrid game include, but are not limited to, casino electronic game machines 1030 and wireless or portable devices, such as smart phone 1032, personal digital assistants, tablet computers, video gaming consoles or the like. These disparate devices are connected within and without the casino through the casino's information technology structure as illustrated by routers 1040*a*, 1040*b* and 1040*c*. It should be understood that FIG. 10 does not attempt to illustrate all servers and systems to which an intermediate in-game resource hybrid game 1000 might be inevitably be connected, and indeed one might expect there would be others, but rather provides an example of a set of a sub-set of systems which would be present in an exemplary embodiment of an installation.

Figure 11:
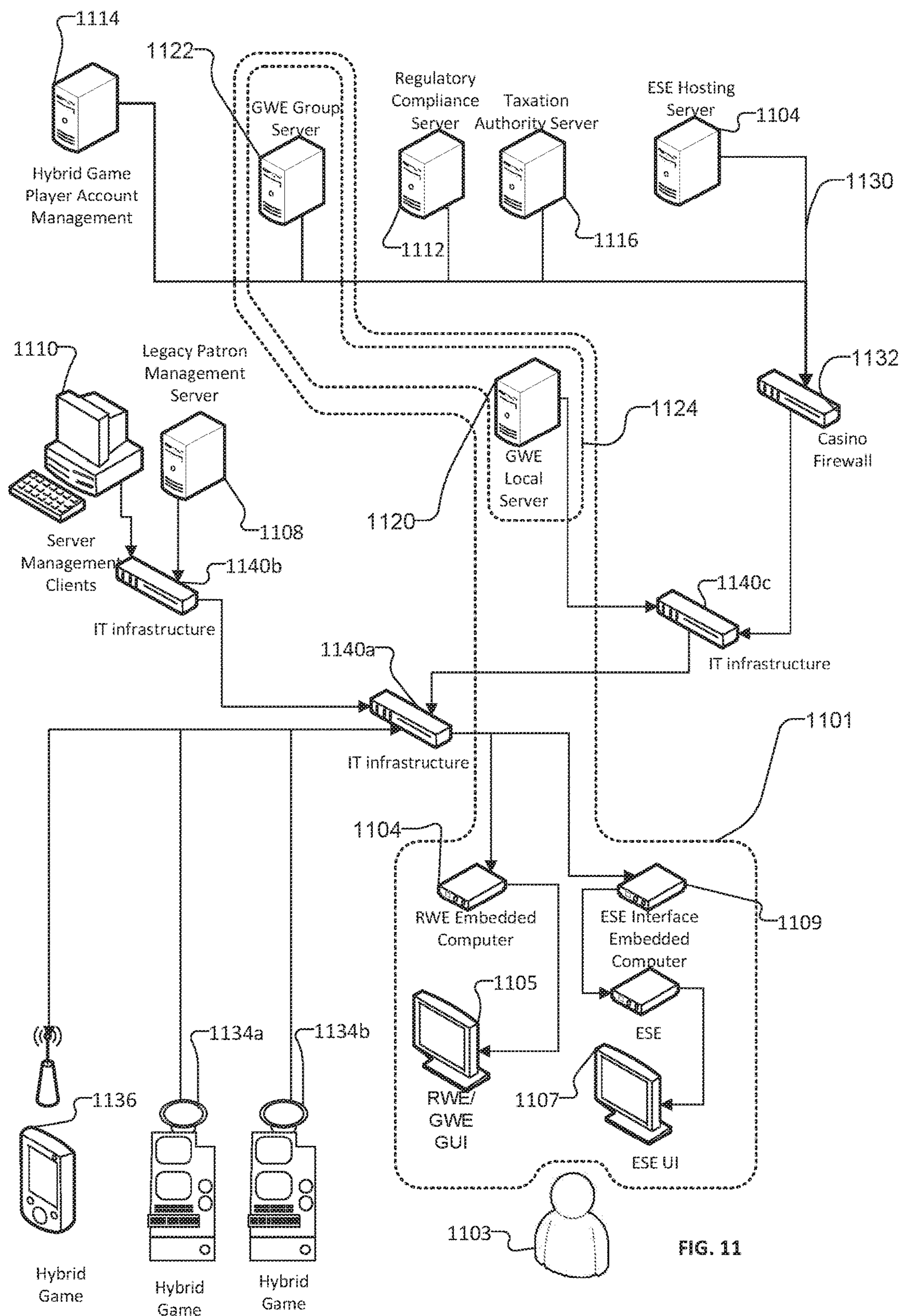
FIG. 11 illustrates a system diagram of an implementation of an Internet based intermediate in-game resource hybrid game in accordance with an embodiment of the invention.

FIG. 11 is a diagram showing another implementation of an intermediate in-game resource hybrid game in accordance with an exemplary embodiment. In the figure, the intermediate in-game resource hybrid game 1101 includes components, RWE 1104 embedded in a device used as the user interface for player 1103. The device provides both a RWE/GWE user interface 1105 and an ESE user interface 1007 for the player. The ESE is provisioned by an ESE hosting server 1104 via ESE interface 1109. Also pictured in the diagram are a number of other peripheral systems, such as player management 1108, casino management 1110, regulatory 1112, hybrid game player account management 1114, and taxation authority 1116 hosting servers that may be present in such an implementation. In the figure, note that the GWE is composed of two sub-components, a local GWE server 1120, and a cloud server 1122 (components within the dash line area 1124). In the figure, certain of the components are located within the bounds of the casino, namely the RWE, the ESE and a portion of the GWE, namely the local GWE server 1120. The Cloud Server GWE 1122 is located in the cloud connected to the casino bounded intermediate in-game resource hybrid game components via communications network such as the Internet 1130 through a firewall 1132. FIG. 11 also illustrates various other systems, which may reside outside the bounds of the casino and are connected to the framework via communications network. The end devices utilized for user interfaces for an intermediate in-game resource hybrid game include, but are not limited to, casino electronic game machines, 1134*a* and 1134*b*, and wireless or portable devices, such as smart phone 1136, personal digital assistants, tablet computers, video gaming consoles or the like. These disparate devices are connected within and without the casino through the casino's information technology structure as illustrated by routers 1140*a*, 1140*b* and 1140*c*. It should be understood that FIG. 11 does not attempt to illustrate all servers and systems to which an intermediate in-game resource hybrid game might be inevitably be connected, and indeed one might expect there would be others, but rather provides an example of a set of a sub-set of systems which would be present in an exemplary embodiment of an installation.

Figure 12:
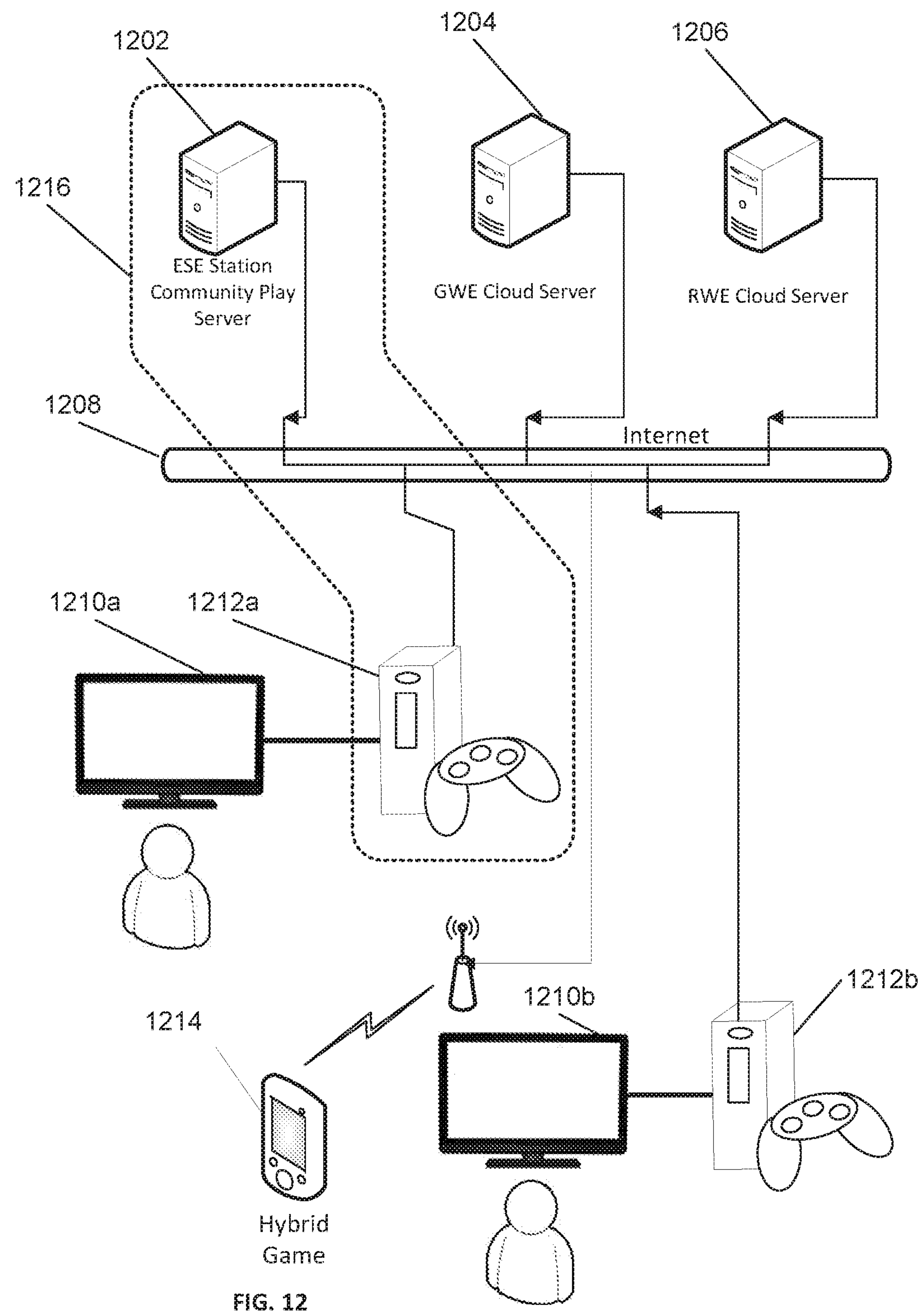
FIG. 12 illustrates a system diagram of an implementation of a cloud based intermediate in-game resource hybrid game in accordance with an embodiment of the invention.

A system diagram that illustrates an implementation of network a cloud based intermediate in-game resource hybrid game over the Internet in accordance with an embodiment of the invention is illustrated in FIG. 12. The system includes an ESE server 1202, GWE server 1204 and RWE server 1206 that each connect to a user interface, 1210*a* or 1210*b*, (such as, but not limited to, a television screen, computer terminal, tablet, touchscreen or PDA) of intermediate in-game resource hybrid games over the Internet 1208. Each intermediate in-game resource hybrid game includes a local ESE 1212*a* or 1212*b* (such as, but not limited to, a video game console or a gaming computer system) that interfaces with a remote ESE server 1002. Processes performed by an ESE 1212*a* services can be performed in multiple locations, such as, but not limited to, remotely on an ESE server 1202 and locally on a local ESE 1212*a*. In addition, an intermediate in-game resource hybrid game may include a Personal Digital Assistant (PDA) 1214 or other type of mobile computing device game coupled to the ESE hosting server 1202, thus providing the opportunity for a player to play an intermediate in-game resource hybrid game on the PDA through a mobile phone or data network.

There are many possible permutations of how an intermediate in-game resource hybrid game could be constructed, with FIGS. 10, 11 and 12 showing only three possible permutations and provided as examples, which are not intended to suggest limitations to the forms of the architecture. Other embodiments include a version where the entire intermediate in-game resource hybrid game is in the cloud with only a client running on player terminal within the bounds of the casino, or a version where the RWE and GWE are casino bound and the ESE exists in the cloud, accessed by a client running on a terminal in the casino.

Figure 13:
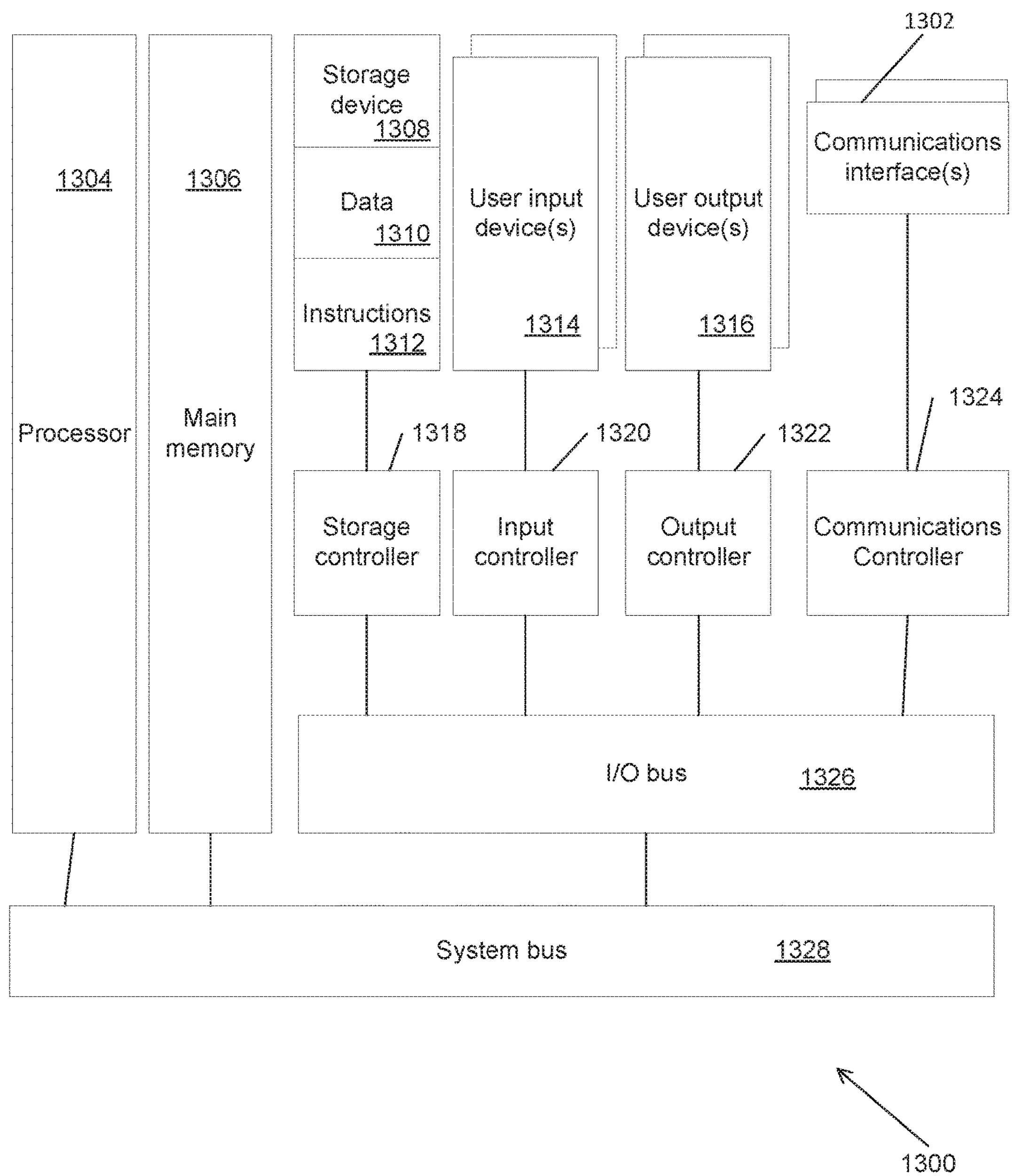
FIG. 13 illustrates a block diagram of components of a device implementing an intermediate in-game resource hybrid game in accordance with an embodiment of the invention.

Any of a variety of processing apparatuses can host various components of an intermediate in-game resource hybrid game in accordance with embodiments of the invention. In accordance with embodiments of the invention, these processing apparatuses can include, but are not limited to, a server, a client, a mobile device such as a smartphone, a personal digital assistant or the like, a wireless device such as a tablet computer or the like, an electronic gaming machine, a general purpose computer, a gaming console, a computing device and/or a controller. A processing apparatus that is constructed to implement an intermediate in-game resource hybrid game in accordance with embodiments of the invention is illustrated in FIG. 13. In the processing apparatus 1300, a processor 1304 is coupled to memory 1306 by a bus 1328. The processor 1304 is also coupled to non-transitory machine-readable storage media, such as a storage device 1308 that stores executable instructions 1312 and data 1310 through the system bus 1328 to an I/O bus 1326 through a storage controller 1318. The processor 1304 is also coupled to one or more interfaces that can be used to connect the processor to other processing apparatuses as well as networks as described herein. The processor 1304 is also coupled via the bus to user input devices 1314, such as tactile devices including, but not limited to, keyboards, keypads foot pads, touch screens, and/or trackballs; as well as non-contact devices such as audio input devices, motion sensors and motion capture devices that the processing apparatus can use to receive inputs from a user when the user interacts with the processing apparatus. The processor 1304 is connected to these user input devices 1314 through the system bus 1328, to the I/O bus 1326 and through the input controller 1320. The processor 1304 is also coupled via the bus to user output devices 1316 such as (but not limited to) visual output devices, audio output devices, and/or tactile output devices that the processing apparatus uses to generate outputs perceivable by the user when the user interacts with the processing apparatus. In accordance with some embodiments, the processor is coupled to visual output devices such as (but not limited to) display screens, light panels, and/or lighted displays. In accordance with particular embodiments, the processor is coupled to audio output devices such as (but not limited to) speakers, and/or sound amplifiers. In accordance with many of these embodiments, the processor 1304 is coupled to tactile output devices like vibrators, and/or manipulators. The processor 1304 is connected to output devices from the system bus 1328 to the I/O bus 1326 and through the output controller 1322. The processor 1304 can also be connected to a communications interface 1302 from the system bus 1328 to the I/O bus 1326 through a communications controller 1324.

In accordance with various embodiments, a processor 1304 can load instructions and data from the storage device into the memory 1306. The processor 1304 can also execute instructions that operate on the data to implement various aspects and features of the components of an intermediate in-game resource hybrid game. The processor 1304 can utilize various input and output devices in accordance with the instructions and the data in order to create and operate user interfaces for players or operators of an intermediate in-game resource hybrid game (such as but not limited to a casino that hosts the intermediate in-game resource hybrid game).

Although the processing apparatus 1300 is described herein as being constructed from a processor and instructions stored and executed by hardware components, the processing apparatus can be composed of only hardware components in accordance with other embodiments. In addition, although the storage device is described as being coupled to the processor through a bus, those skilled in the art of processing apparatuses will understand that the storage device can include removable media such as, but not limited to, a USB memory device, an optical CD ROM, magnetic media such as tape and disks. Also, the storage device can be accessed by processor 1304 through one of the interfaces or over a network. Furthermore, any of the user input devices or user output devices can be coupled to the processor 1304 via one of the interfaces or over a network. In addition, although a single processor 1304 is described, those skilled in the art will understand that the processor 1304 can be a controller or other computing device or a separate computer as well as be composed of multiple processors or computing devices including one or more processors.

Intermediate In-Game Resource Hybrid Games

An intermediate in-game resource, herein termed quanta, may be used to purchase or enable in-game resources, such as enabling elements (EE) or actionable elements (AE), which may change the state of the skill based game and/or offer the player benefits or advantages in the skill based game. Quanta is awarded to the player as a result of the outcome of wagers made using the RWE. Typically a winning wager (W>0) may result in quanta being added, whereas a losing result (W<0) or push (W=0) may not result in quanta being added. While this is a typical case, this may not be the case in all instances. The rules for awarding quanta in game, may vary from game to game and/or from operator to operator.

Figure 14:
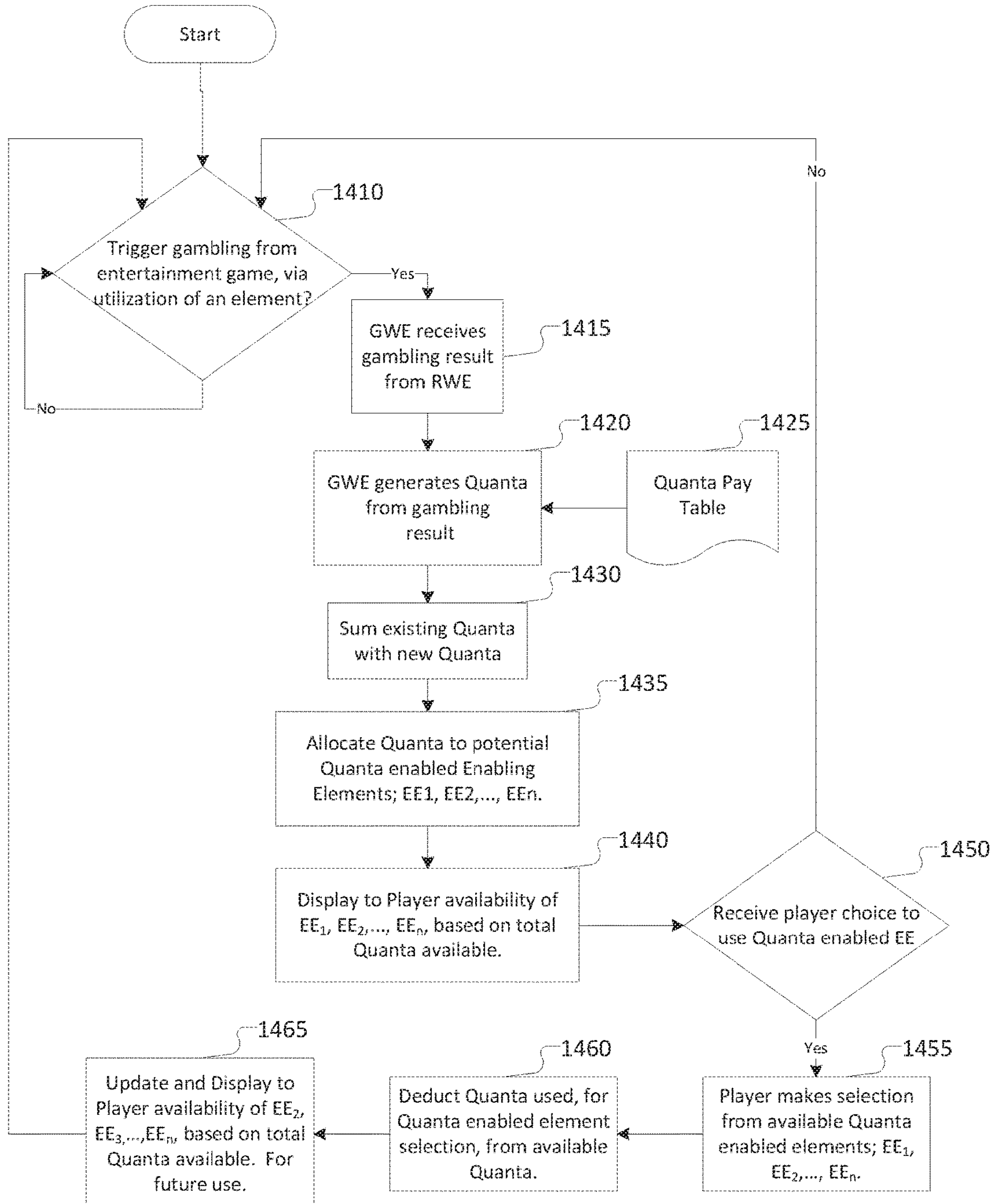
FIG. 14 is a process flow diagram of a process of an intermediate in-game resource hybrid game in accordance with an embodiment of the invention.

FIG. 14 is a flow chart for a process of providing a quanta selector user interface to a player, to display quanta available in an intermediate in-game resource hybrid game (HyG) and provide a means for selecting in-game elements utilizing quanta in accordance with an embodiment of the invention. In some embodiments of an intermediate in-game resource hybrid game (HyG), as shown in FIG. 14, gambling is triggered as a result of utilization 1410 of an element in the entertainment game, such as an EE, AE or the like. In a first person shooter, EE may be represented by ammunition for a weapon. In a crossword puzzle game, EE may be represented by letter tiles of varying value. In a driving game EE may be represented by fuel or nitrous. In various hybrid games the opportunity may exist for the player to win quanta as a result of a gambling win. The amount of quanta won may be a function of the amount of RC wagered, the amount of RC won, or other factors.

In various embodiments, once a gambling game is triggered by utilization of an element 1410, the gambling result is returned to the game world engine (GWE) by the real world engine (RWE) 1415. The GWE determines how much quanta to allocate 1420, if any, based on the gambling result received from the RWE 1415, and a quanta pay table 1425, resident in the GWE. As quanta may be carried over from turn to turn in the Entertainment System Engine (ESE) game, the quanta won is summed with existing or carried over quanta 1430. In the case where no quanta is won, the amount added to the existing quanta is zero. The quanta available is allocated to potential quanta enabled elements such as but not limited to EE, represented as EE1, EE2, . . . , EEn 1435, where n is the total number of quanta enabled EE in a specific game. The ESE may display the total amount of quanta available, as well as the availability of EE1, EE2, . . . , EEn, based upon the total amount of quanta available 1r40.

In some embodiments, quanta may be converted in to something other than elements. For example, quanta may be converted to things such as health points for the players controlled entity (CE), an actionable element (AE) such as a chance to replay a turn to portion of the game, or the ability to purchase special powers, special skills, spells, etc.

In some embodiments, a player may be able to convert quanta into items outside of the game, such as merchandise, a free drink, a free meal, etc.

In various embodiments, if enough quanta is available to use one or more of the quanta enabled elements, the ESE may receive a player choice 1450, as to which, if any of the quanta enabled element the player wises to use. If no quanta enabled element is selected, the game continues, until the next play of an element 1410, at which time the process described repeats. In the case that a player chooses to use a quanta enabled element, the player makes a selection from the available quanta enabled element 1455, as displayed by the ESE. In some embodiments, the opportunity may exist for the player to select more than one quanta enabled element in a given turn. Once selected and played, the quanta value of the selected element is deducted from the available quanta 1460, and the balance is displayed to the player, as well as the availability of EE1, EE2, . . . EEn, for future use 1465, via the ESE. Play resumes until the next gambling event is triggered by the utilization of an element 1410 in the skill based game.

In various embodiments, an intermediate in-game resource hybrid game (HyG) with a quanta selector user interface may trigger gambling and subsequently quanta allocation utilizing triggers other than EE, this may include, but is not limited to AEs or time (real time or game time).

In various embodiments, the quanta selector user interface may allow the user to use quanta to select and quanta enabled AE (QEAE), an example of a (QEAE) would be to allow the player to take an extra turn, in a turn based game.

FIGS. 15A to 15E illustrate a user display in accordance with an embodiment of the invention. In an embodiment of a crossword puzzle intermediate in-game resource hybrid game (HyG), "War of Words," a quanta selector user interface may be utilized. War of Words represents an intermediate in-game resource hybrid game (HyG) implementation of a Scrabble® type crossword puzzle game, which includes the use of quanta, and a quanta selector user interface 1500. In the game, players take turns spelling words using letter tiles 1501 drawn from a pool of letters. Each letter tile is assigned a point value. The words are spelled by placing the letter tiles onto a gridded board 1502. Players score points by summing up points assigned to the letter tiles that were used to spell the word. If a player covers up a background tile having a special characteristic, such as background tile 1526, the player receives additional points for spelling the word, such as additional points for the actual letter covering the background tile or additional points for an entire word which happens to cover the background tile. In many embodiments, the summed up points for playing the words constitute the GWC that the player earns for playing a letter tile. In many embodiments, each placement of a letter tile is an instance of utilization of an EE that triggers a wager in a gambling game of the intermediate in-game resource hybrid game (HyG) as described herein.

Figure 15A:
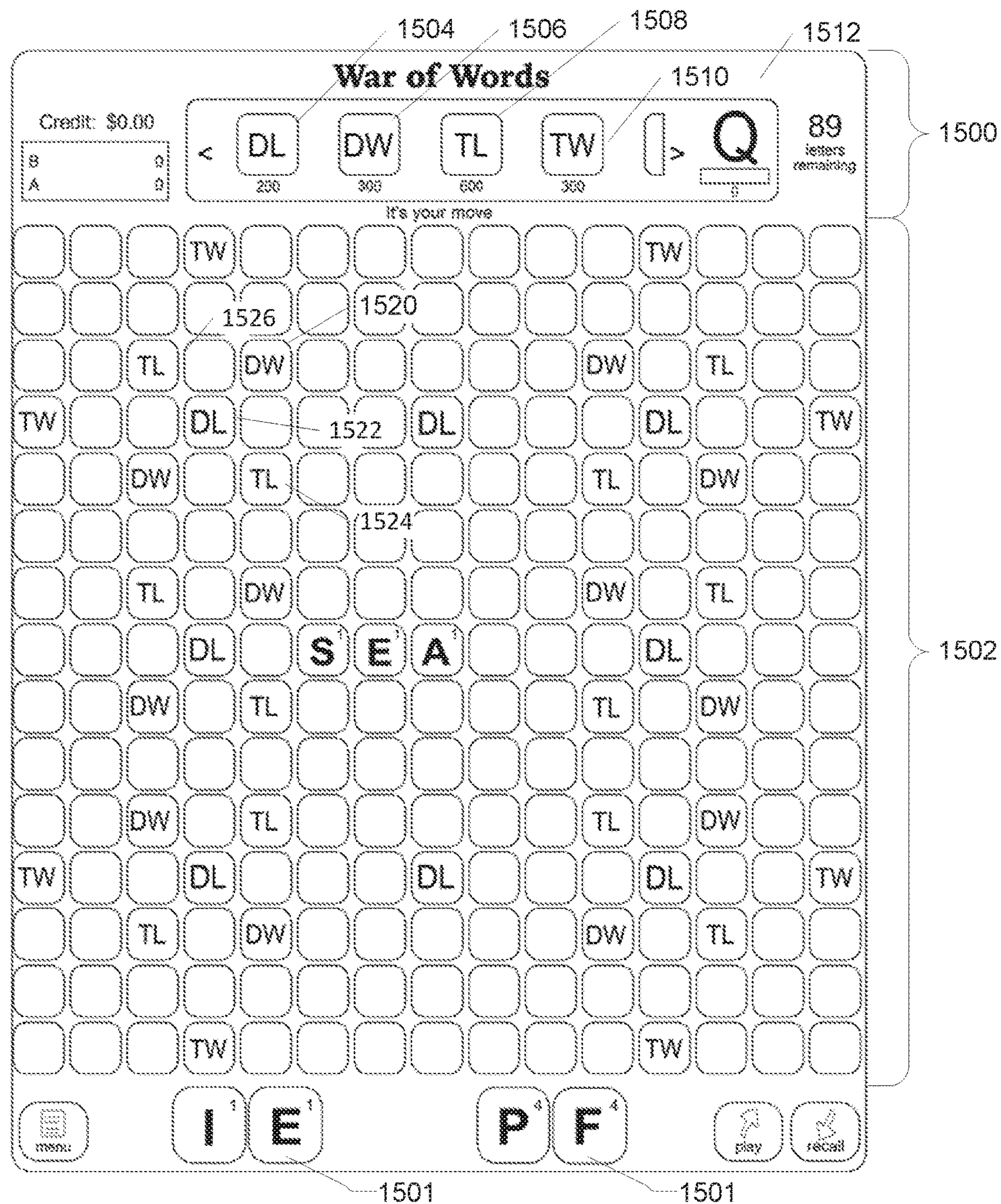
FIGS. 15A to 15E illustrate user displays of an intermediate in-game resource hybrid game in accordance with an embodiment of the invention.

In many embodiments, the intermediate in-game resource hybrid game (HyG) may offer quanta enabled elements for utilization in the entertainment game by the player, including but not limited to quanta enabled EE (QEEE), such as bonus background tiles indicated by indicators 1504, 1506, 1508 and 1510. The QEEE can be placed on a game board 1502 by the player, at a location of the player's choice, to change the state of the game and/or game board. The indicators are displayed to indicate an availability of the quanta enabled elements for selection on a basis of an amount of quanta awarded to the player. When played under a letter (or word), a bonus background may offer a letter or word multiplier, similar to those offered in fixed positions 1520, 1522, 1524 and 1526 on the game board. As an example, as shown in FIG. 15A, the following quanta enabled elements as QEEE are available; DL 1504 (double letter) for 200 quanta, DW 1506 (double Word) for 300 quanta, TL 1508 (triple letter) for 600 quanta and TW 1510 (triple word) for 300 quanta. As FIG. 15A shows, a the onset of play, zero (0) available quanta 1512 is shown, and the QEEE (namely DL, DW, TL and TW) are all shadowed in, showing there is no quanta available to enable them.

Figure 15B:
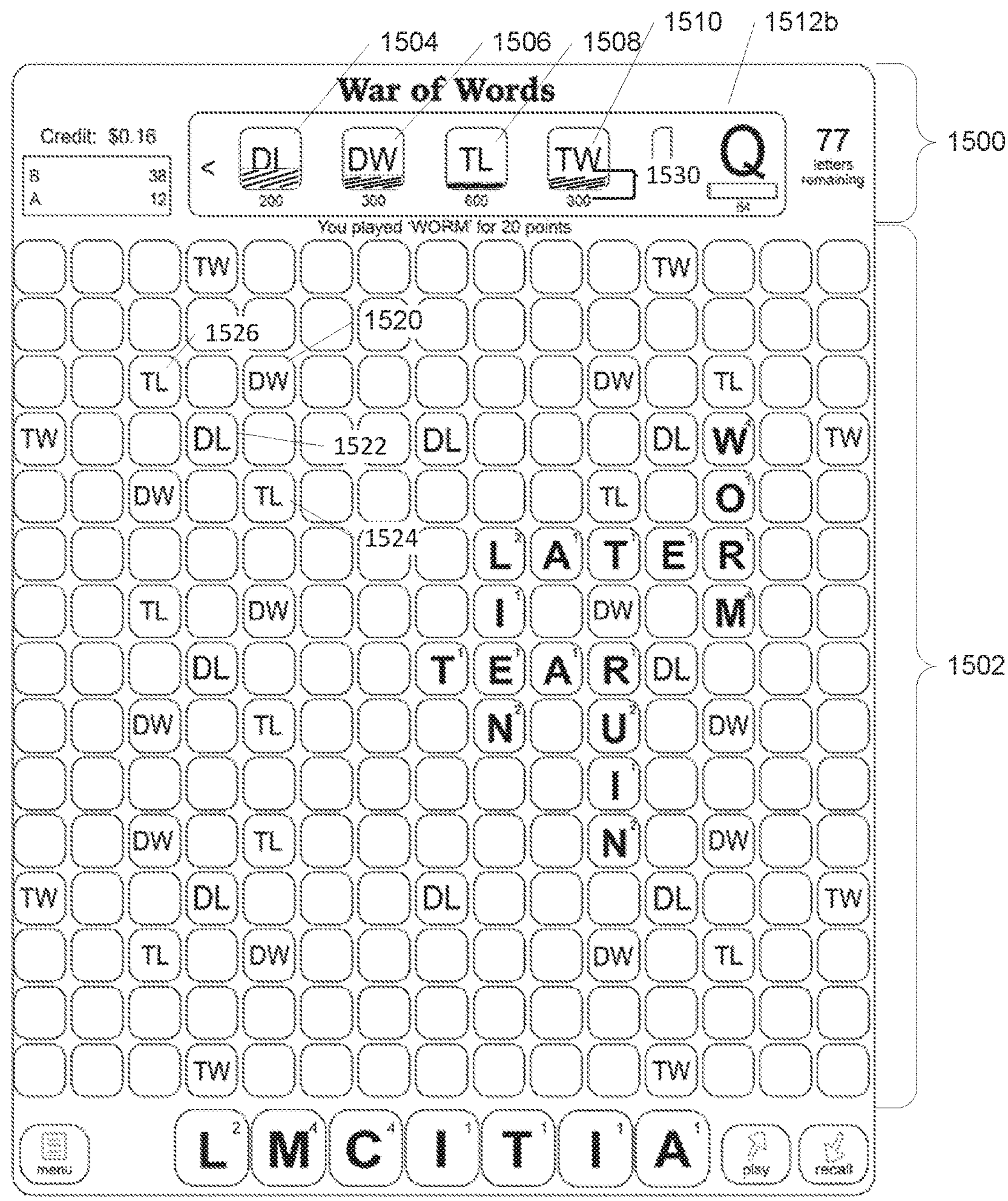

Referring now to FIG. 15B, after a few turns of play, the player has 64 available quanta 1512*b* while this is not enough to utilize any of the QEEE 1504, 1506, 1508 and 1510 (minimum value is 200), the quanta selector user interface implemented in this game, shows the total available quanta 210 (64) and a fuel gauge type display 1530 for each of the QEEE as shown by the removal of the grayed-out area on a QEEE indicator. As more quanta is won and available quanta 1512*b* increases, each of the QEEE elements "fill up" further by removing proportionally more of the grayed-out area. That is, an amount of the grayed-out areas of the indicators is indirectly proportional to the amount of quanta available to enable the QEEE. For example, if a quanta enabled element requires 100 quanta in order for the quanta enabled element to be enabled, and the player has 10 quanta, then 1/10th of an area of an indicator associated with the quanta enabled element will be clearly seen whereas 9/10th of the indicator associated with the quanta enabled element will be grayed out. A simple function to determine the proportion of of area to gray out is then Maximum (0, 1-Qa/Qn) where Qa is the amount of quanta available to enable the quanta enabled element, Qn is the amount of quanta needed to enable the quanta enabled element, and Maximum (N1,N2) returns the maximum value as between two values, N1 and N2.

In various embodiments, each quanta enabled element will have a respective amount of quanta required to enable the quanta enabled element. In such an embodiment, respective amounts of quanta required to enable each quanta enabled element may vary with the desirability of the quanta enabled element to the player. In some embodiments, the respective amounts of quanta required to enable each quanta enabled element may vary with the usefulness of the quanta enabled element to the player while playing the intermediate in-game resource hybrid game.

Figure 15C:
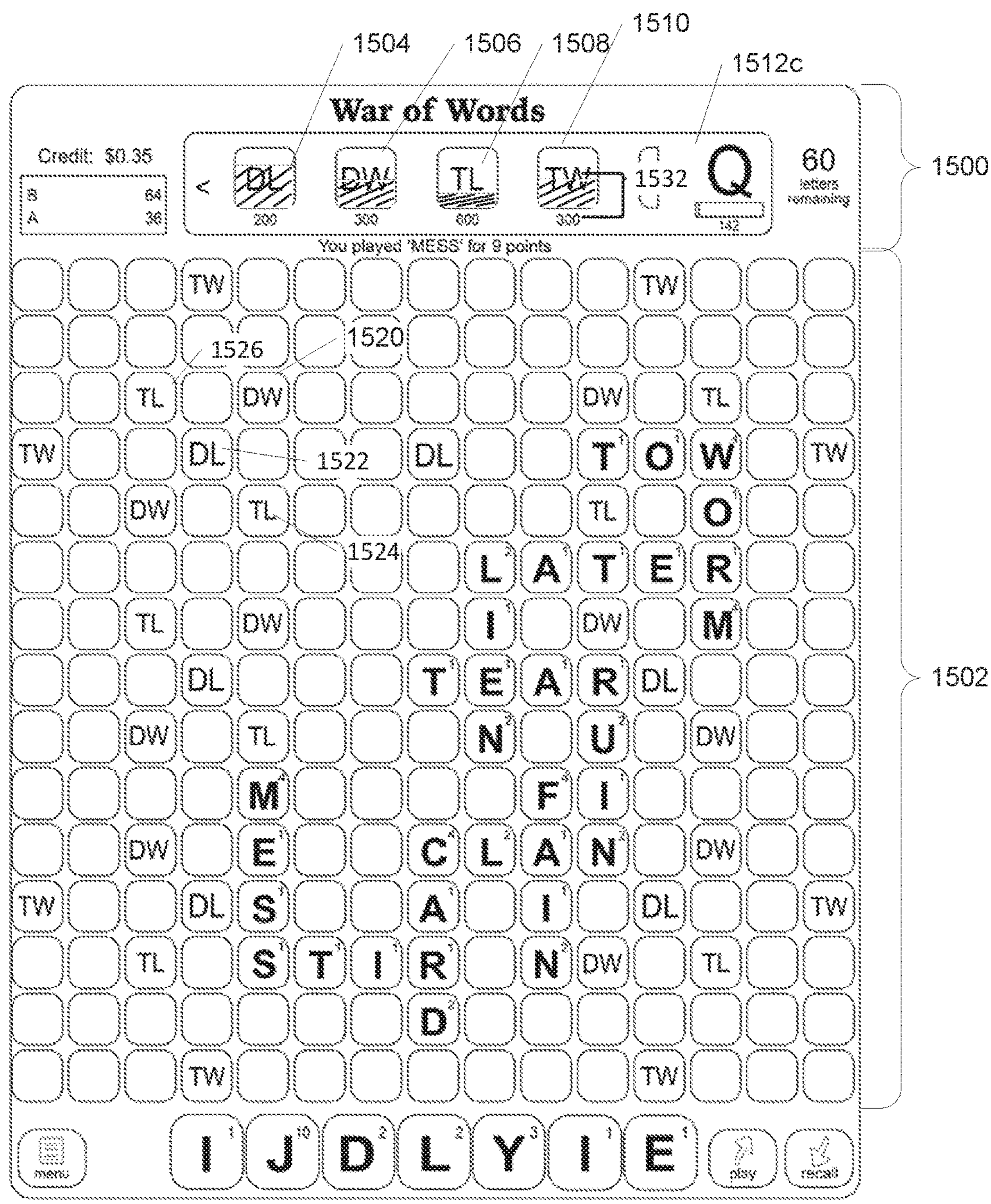

Referring now to FIG. 15C, play in the intermediate in-game resource hybrid game has progressed, and more quanta, has been won, and added to the available quanta 1512*c*, which is now, 142 quanta. Additionally, the QEEE indicator fuel gauges now register the additional quanta graphically, such as 1532, by graying out less and less of the QEEE indicator.

Figure 15D:
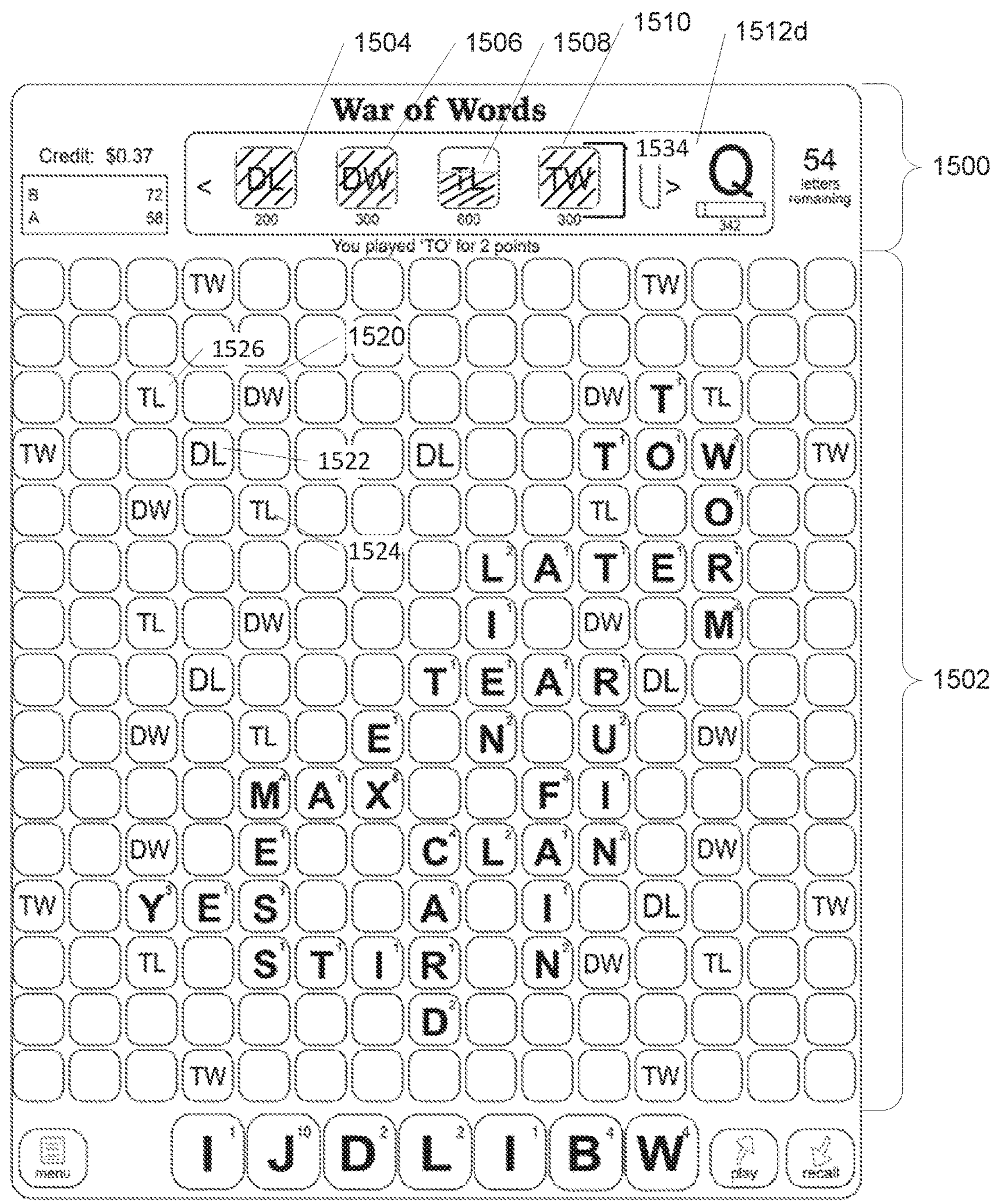

Referring now to FIG. 15D, play has progressed further and available quanta 1512*d* is now 342, and as show graphically by the QEEE fuel gauges, DL 1504, DW 1506 and TW 1510 are now available to use by the player. As illustrated by 1534, the entire QEEE indicator is no longer grayed-out.

Figure 15E:
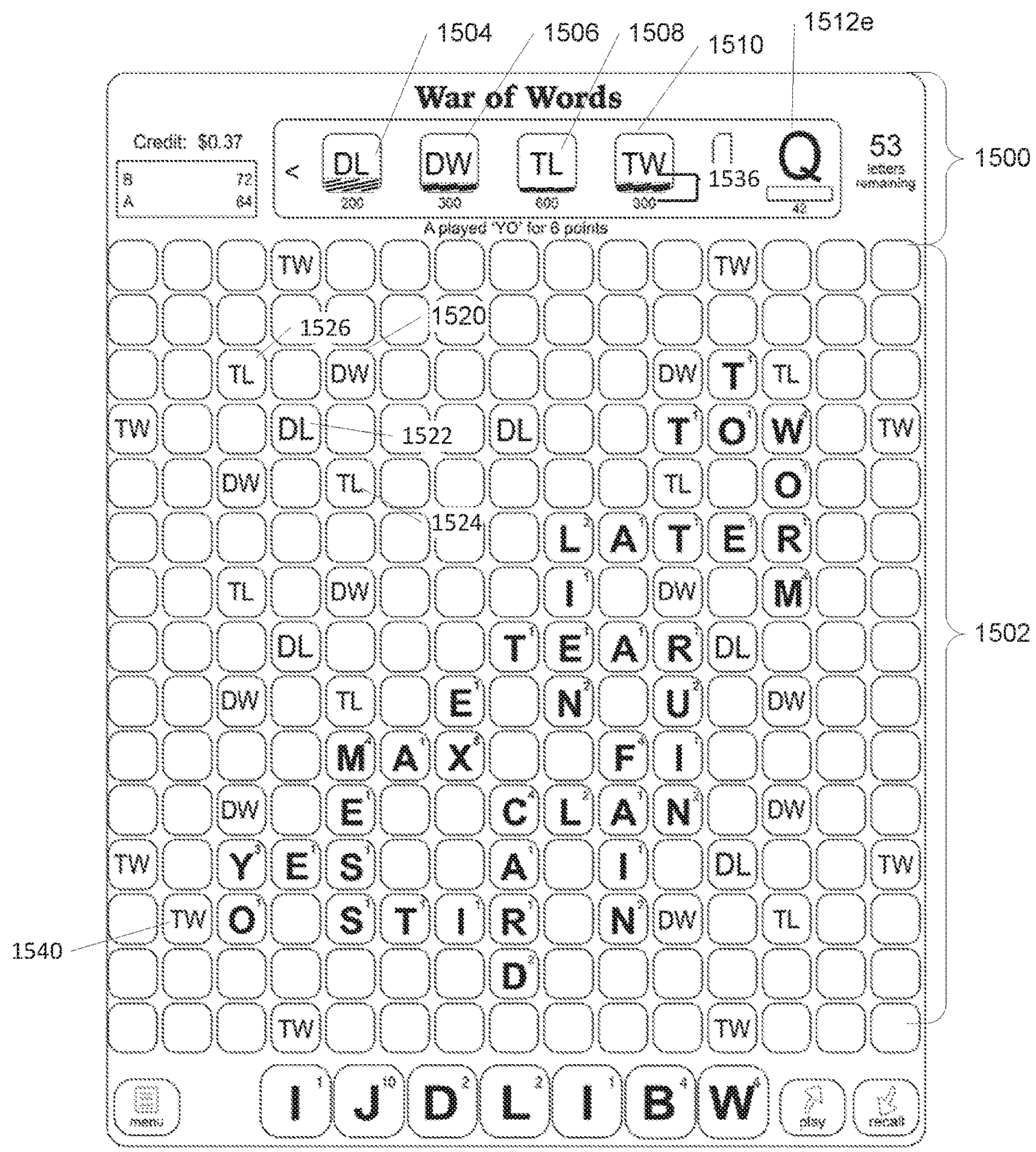

Referring now to FIG. 15E, the player has chosen to play and place the quanta enable TW background tile 1540. This tile has a value of 300 quanta, which has been deducted from the available quanta 1512*e*, additionally the QEEE indicators 1504, 1506, 1508 and 1510 have been updated to reflect the use of the quanta for the TW background tile 1540, such as by graying-out almost all of the indicator as illustrated by 1536.

In an embodiment of a first person shooter intermediate in-game resource hybrid game (HyG), with a quanta selector user interface, where ammunition is an EE, quanta may allow access to specialized ammunition. Specialized ammunition may include tracer ammunition, armor piercing ammunition, incendiary ammunition or explosive ammunition. The specialized ammunition may have different values in terms of quanta, based upon their value to the player in certain scenarios and/or their destructive capability. By firing their weapon, and expending EE, the player triggers gambling propositions within the RWE, the results of which can be converted by the GWE into quanta, which is available to the player. Once the player has earned enough quanta to enable one or more of the QEEE, the ammunition will become available to select through a quanta selector user interface that is an ammunition selection user interface. When a player selects the QEEE enabled ammunition using the quanta selector user interface, the value will be deducted from the total available quanta, which will be updated and displayed to the user via the ESE.

In another embodiment, an intermediate in-game resource hybrid game (HyG) enabled fantasy roll playing game with a quanta selector user interface includes game time as an EE. For this type of game other EE may include food or health. As time passes in the game world, wagers may be triggered. The result of gambling outcomes may be fed back to the GWE, and result in the allocation of quanta to the player and displayed in the quanta selector user interface. The quanta may enable the purchase of QEEE by the player's character or a controlled entity (CE). The total quanta is displayed to the player via the quanta selector user interface of the ESE as described herein, the CE may have the opportunity to trade with or purchase items in the game world. In some cases may only be made available to the player or their CE, if purchased using quanta, these items may include but are not limited to, special weapons, armor, portions or spells that may give the player or their CE a distinct benefit or advantage in the game world. Once a purchase is completed the purchase price will be deducted from the players available quanta, and displayed to the user via a display of the quanta selector user interface of the ESE as described herein. In some embodiments, purchases may require a combination of in game resources (for example gold and quanta).

Figure 16:
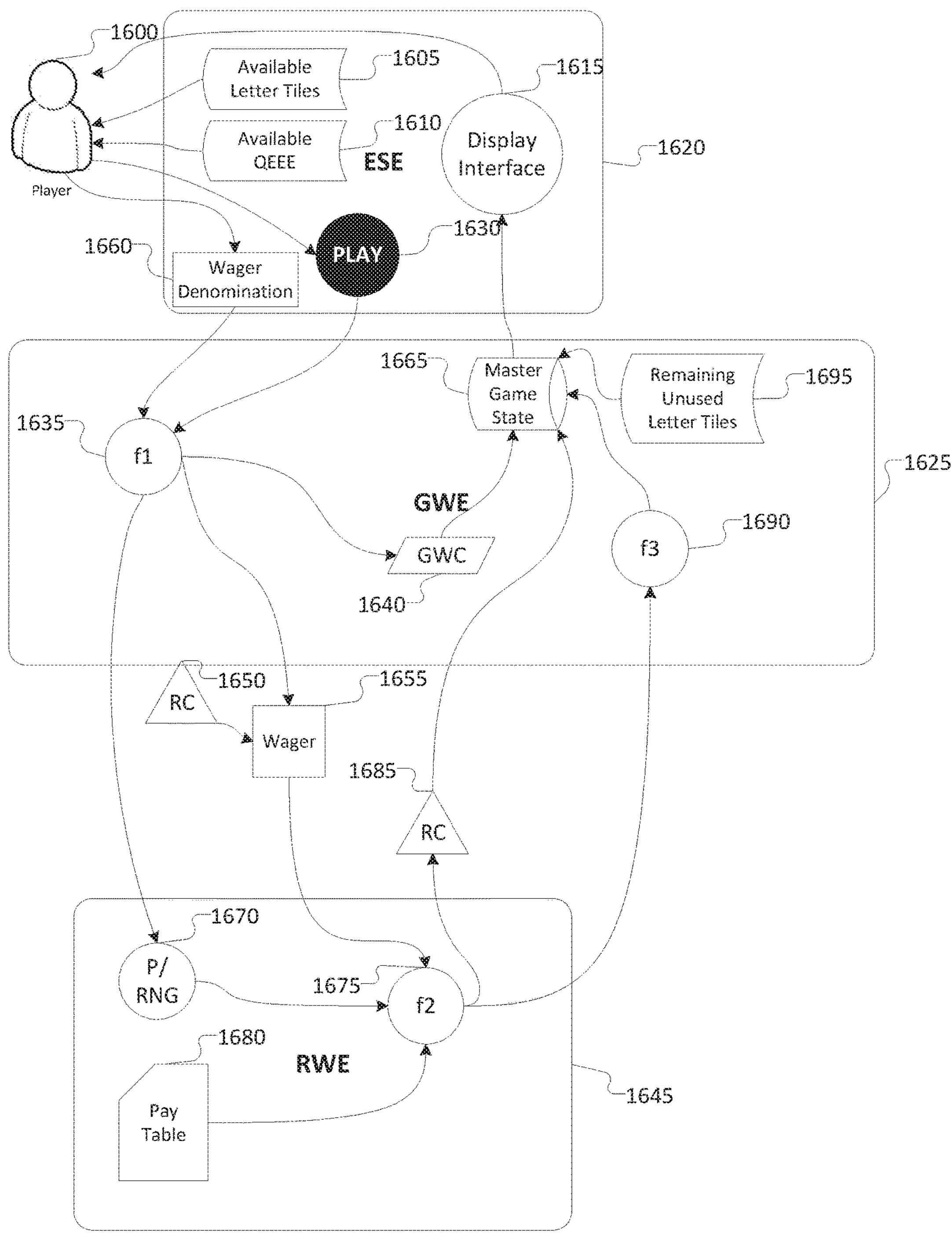
FIG. 16 is a flow diagram of a process of an intermediate in-game resource hybrid game in accordance with an embodiment of the invention.

In various embodiments, an intermediate in-game resource hybrid game (HyG) based upon a crossword puzzle word game similar to Scrabble™ may include quanta enabled enabling elements as shown in FIG. 16. A player 1600 may select a word to play, based on a number of letter tiles available. Furthermore, the player may have the opportunity to improve the score of their word by playing available quanta enabled elements, such as but not limited to quanta enable enabling elements (QEEE) 1610. QEEE may include, but are not limited to, double letter (DL), triple letter (TL), double word (DW) or triple word (TW) background tiles. When played, the background tile will act upon the letter or word played on the tile. If a player 1600 has enough quanta available to enable one or more of the QEEE, these will be shown as available QEEE, which the player 1600 may select from. The user interface is a function of the ESE. Once a user has selected QEEE (if any) and the word they wish to play, they submit their play to the GWE 1625, by invoking the play function 1630. The play function may be invoked by actuating a "Play" or "Submit" button, which is part of the user interface. Other actions may be used to invoke the play function, for example, pulling a slot machine style lever on a casino style gaming device, or clicking on a button on a PC based game.

In several embodiments, by invoking the play function 1630, the player 1600 commits to a gambling proposition, the parameters of which may be a function of f1 1635 in the GWE 1625. Function f1 may include the following processes:

- Verify that the word played and tile position are valid, prior to awarding GWC 1640 and triggering a wager in the RWE 1645.
- Compute the points or GWC earned based on the points total of the word(s) played, including background tiles, both standard background tiles and QEEE background tiles, if used.
- Generate GWC 1640, which would then be summed with the existing GWC and updated in the master game state 1665.
- Update the master game state 1665 in the GWE 1625, once the play has been verified.
- Determine the amount of real currency 1650 (RC) to be wagered 1655, based upon inputs which may include total points of word played (this may or may not include multiplying background tiles, either standard or QEEE type,) and wager denomination 1660 selected by the player 1600. For example a player opts to gamble $0.02 per point, and the player plays a 12 point word, with no multipliers, the amount of the wager would be $0.24, based on the formula wager=denomination*points for word(s). This formula is shown as an example, other formulae could be used, depending on casino, regulatory or other input or requirements.
- Trigger the pseudo random or random number generator 1670 (P/RNG)/gambling, in the RWE 1645.

In various embodiments, the RWE may contain a function f2 1675. f2 1675 may take as inputs, the amount of RC bet, or the wager 1655, the result of the P/RNG 1670, and a pay table 1680. Based on the P/RNG result and pay table look-up, and amount of RC 1650 wagered 1655, f2 1675 computes the amount of RC 1685, if any, won by the player 1600. RC 1685 won is fed back to the master game state 1665 and displayed to the player 1600, via the ESE 1620 display interface 1615.

In many embodiments, function f3 1690, which resides in the GWE 1625, includes an algorithm to determine how much, if any quanta, is to be awarded based on the outcome of the gambling proposition. The output of f2 1675, and by definition it's president inputs, including wager 1655, P/RNG 1670, and pay table 1680, may also serve as inputs to f3 1690. The algorithm to determine how much if any quanta is generated by f3 may very a significantly, based upon factors such as desired player experience, game personality desired, including how much influence the outcome of the gambling game may have on the skill based game. In some embodiments the amount of quanta generated may be inversely proportional to the gambling result, potentially allowing a player 1600 who is doing poorly in the gambling game to gain advantage in the skill game. The quanta generated by f3 1690, will be summed with existing quanta and stored with the master game state 1665, pending it's future use.

In many embodiments, the GWE 1625 will serve as the repository for unused (un-played) letter tiles, analogous to the draw pile of face down tiles unused tiles in a Scrabble® game. One aspect of the GWE 1625 is to replace tiles played by the player with random tiles from the remaining unused tiles 1695 repository. This information is stored with the master game state 1665 in the GWE 1625.

In various embodiments the master game state 1665, will pass information including, but not limited to, the state of the game board or field of play, current score (GWC 1640), opponents current score, quanta available, QEEE available, wager denomination, letters available to play, and current RC balance, which may be displayed to the player 1600, via the display interface 1615.

Figure 17:
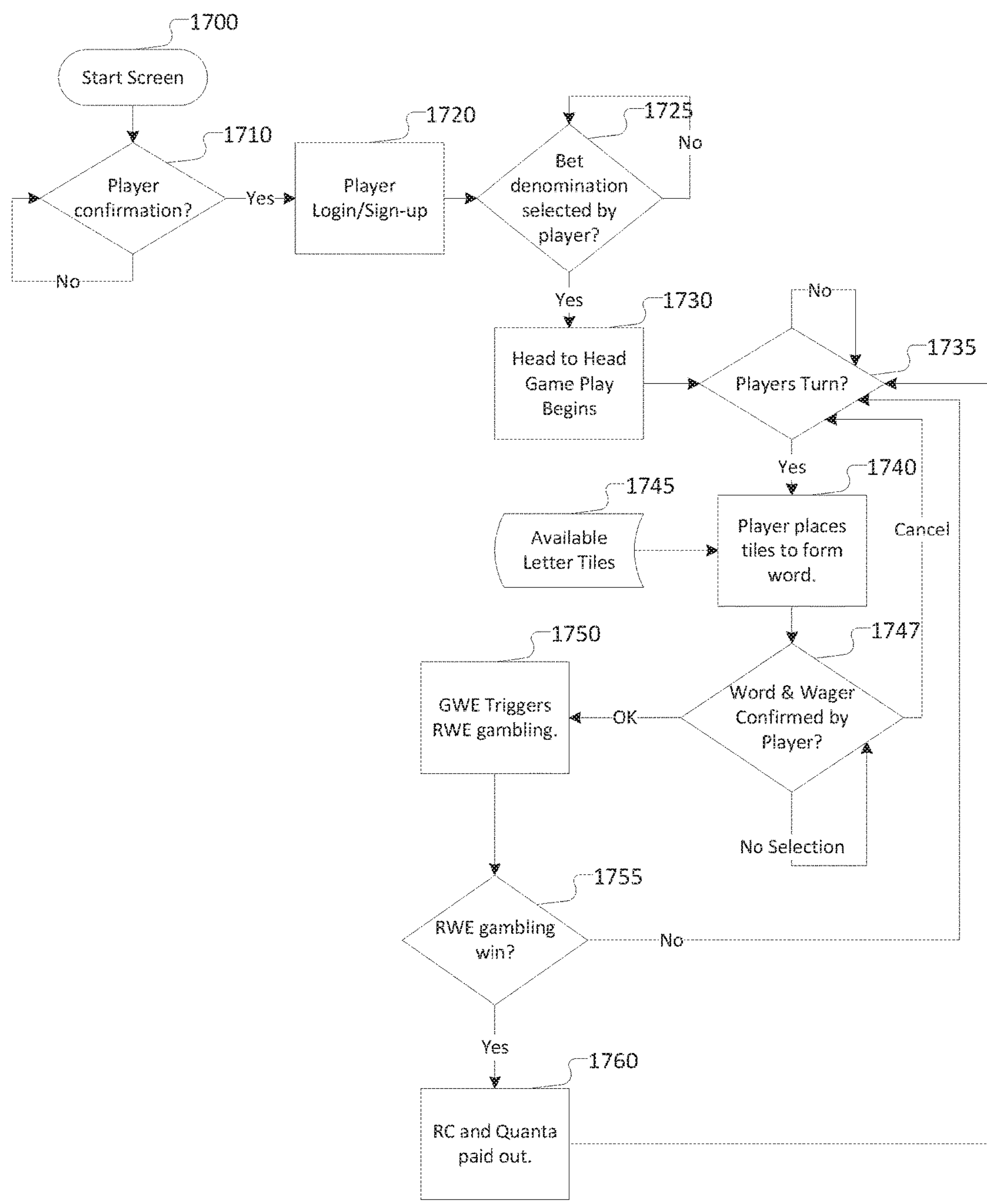
FIG. 17 is a flow diagram of a process of an intermediate in-game resource hybrid game in accordance with an embodiment of the invention.

FIG. 17 is a flow chart, for a process of a user interface, in a crossword puzzle game, which includes AE, EE, and QEEE.

Figure 18A:
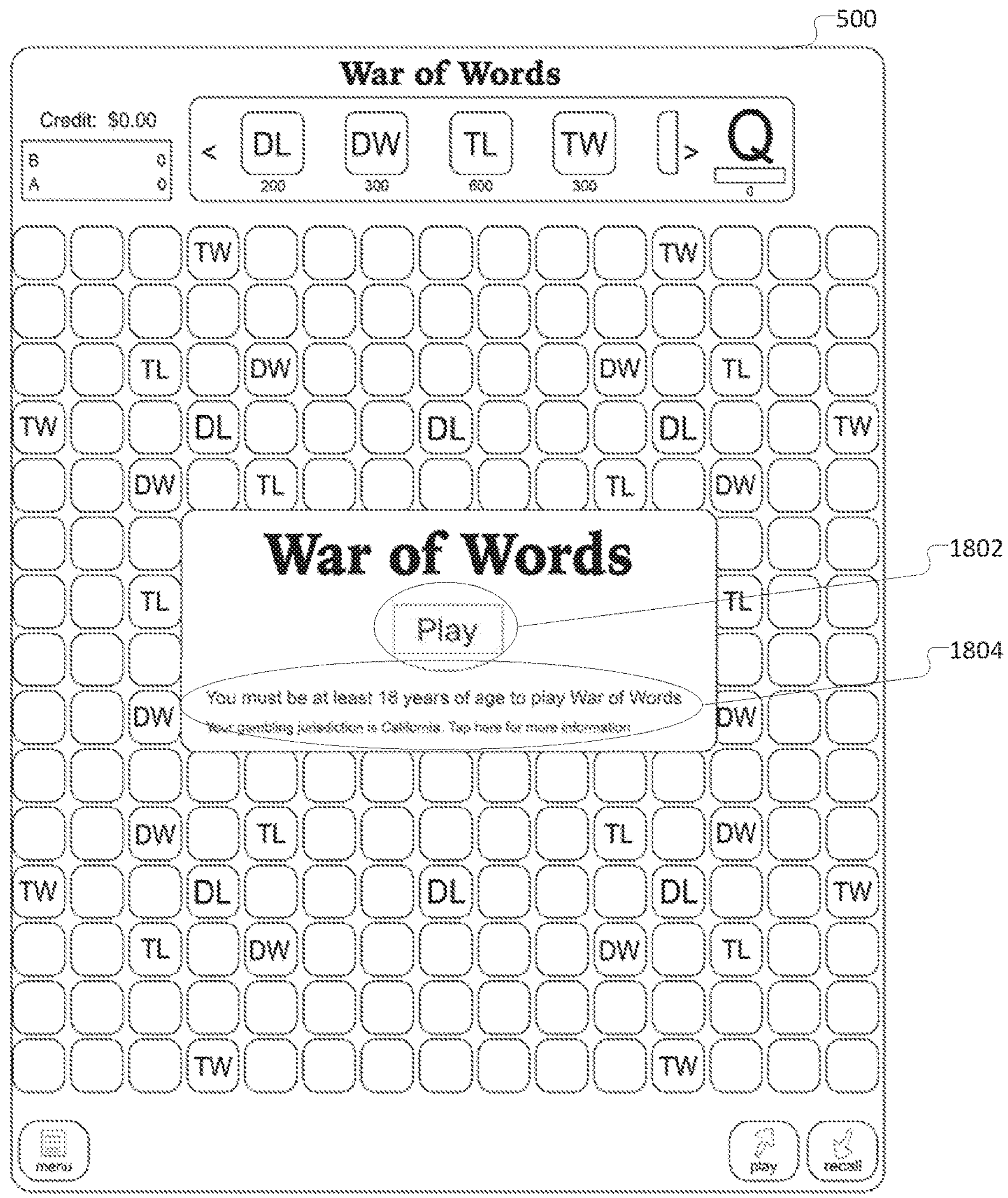
FIGS. 18A to 18H are illustrations of a user interface for an intermediate in-game resource hybrid game in accordance with an embodiment of the invention.
Figure 18B:
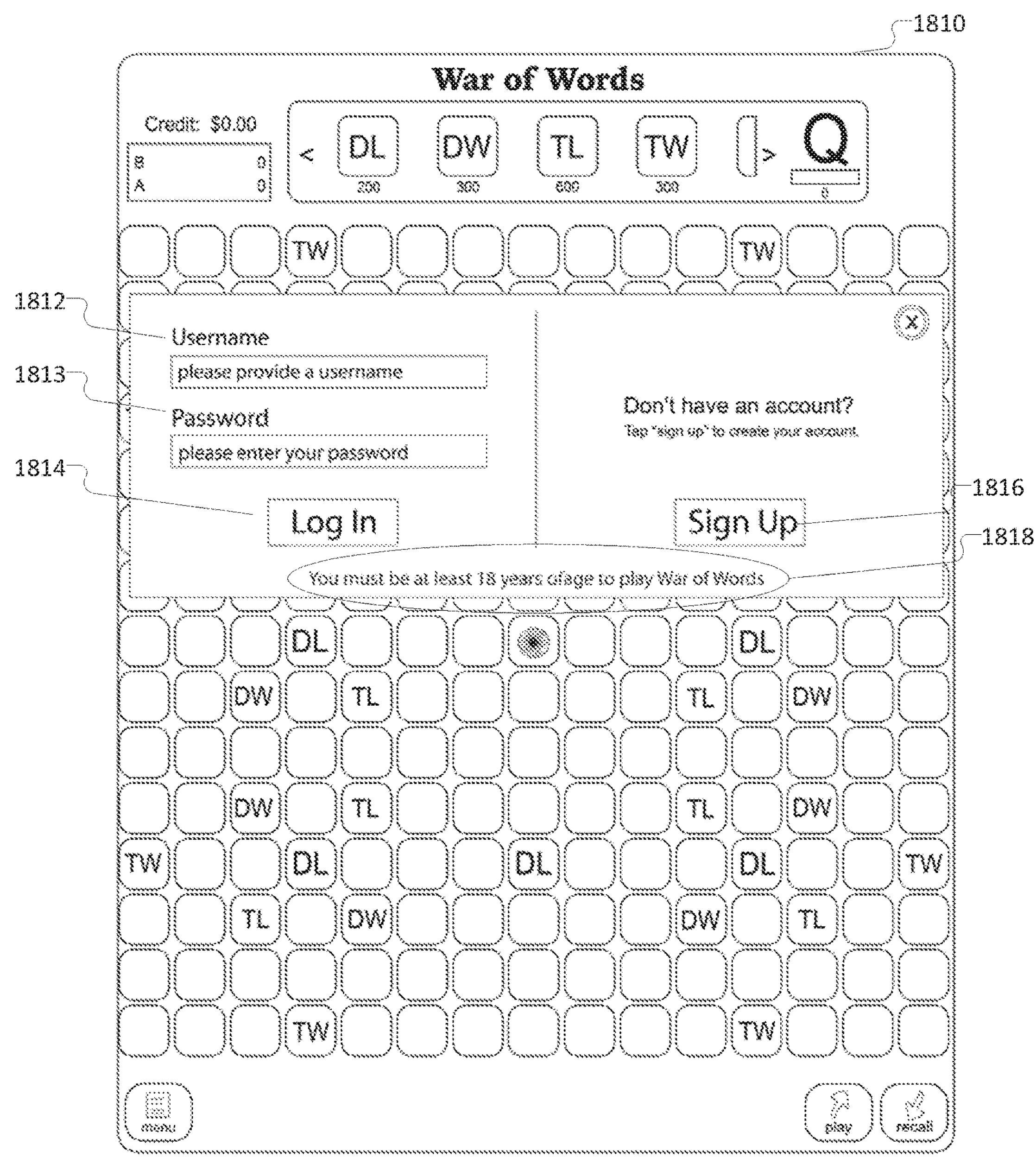

In various embodiments, at the onset of play, a start screen 1700 may be presented to the player, via the user interface, as illustrated in FIG. 18A. The ESE may not proceed until it receives player confirmation 1710 via player input. The ESE may then proceed to player login/sign-up 1720, as illustrated in FIG. 18B. If the player has an existing player account, they may be able to login by entering a user name and password for their account. If the player does not have an existing account, they will be guided through a sign-up process, which will include verifications, as dictated by the gaming authority, in which the intermediate in-game resource hybrid game will be operated. Once the player has successfully logged in or signed up, they may proceed to select the bet denomination 1725 for the new game they are about to enter. An example of a betting denomination screen is shown is FIG. 18C. Once the bet denomination has been selected by the player 1725, they will enter into head to head play, against another live player.

In various embodiments, the player's opponent may be selected by the player, by inviting a friend or someone known to the player to enter into a game. In other embodiments, the opponent may be selected at random by the operator or casino, based on a pool of available players that wish to enter into a game against a random opponent. In yet another embodiment, as system may be in place to rank players by their level of skill, and opponents may be assigned utilizing this skill ranking or banding, in order to offer the player an opponent with a similar level of skill to their own.

In various embodiments, once head to head play begins 1730, the player may have the option to play first, or their opponent may have the option to play first. Once it is the player's turn 1735, the player has the option, to place letter tiles to form a word 1740, from their available letter tiles 1745. An illustration of a play screen is shown in FIG. 18D. In many embodiments, other options may be available, via a menu, as illustrated in FIG. 18H, these options may include but are not limited to; settings, purchase, cash out, cancel, help, resign, and/or pass. When a player has played a word, a window or screen may appear, to confirm the word the player wishes to play, along with the value of the wager associated with the word. If the player cancels the play, the play and the wager will not proceed to the GWE, and the state of the intermediate in-game resource hybrid game will be reset to the state, prior to the current play. If the word and wager are confirmed by the player 1747, the GWE updates the intermediate in-game resource hybrid game state and GWC, earned by the placement of the word, along with any background tile multipliers (standard or QEEE), and the GWE triggers gambling in the RWE, based on the wager sent from the ESE and GWE.

In various embodiments, if the result of RWE gambling does not return a win 1755, no RC is paid out, and no quanta is generated, or paid out, play passes to the player's opponent, and the player awaits their next turn, 1735.

In various embodiments, if there is an RWE gambling win 1755, RC is paid out, and quanta may also be generated or paid out 1760. In the case of a win, where the RC won is equal to (push) or less than the RC wagered, RC is still returned to the player, and quanta may or may not be generated, depending upon the quanta pay table in use. Once RC and quanta have been paid out, play passes to the player's opponent, and the player awaits their next turn, 1735.

In some embodiments, quanta may be issued even when no RC is won, this is a function of the quanta pay table in use by the operator or casino.

FIG. 18A is an illustration of a start screen in accordance with an embodiment of the invention. As illustrated, the start screen 1800, that may be used in an embodiment of a game titled War of Words, which is a Scrabble® type crossword puzzle game, implemented as an intermediate in-game resource hybrid game (HyG). As shown, the start screen, may include the following elements, a play button 1802, to confirm the player wishes to play the intermediate in-game resource hybrid game (HyG), and information 1804, which may include, but is not limited to, age restrictions and information regarding the gambling jurisdiction the intermediate in-game resource hybrid game is being played in.

FIG. 18B is an illustration of a log in screen in accordance with an embodiment of the invention. A log in/sign up screen 1810, that may be used in an embodiment of a game titled War of Words, which is a Scrabble® type crossword puzzle game, implemented as an intermediate in-game resource hybrid game (HyG). As shown, this screen allows a player with an existing account, to enter their username 1812, password 1813, and log in 1814. In the case that the player does not have an existing account, they may sign up 1816 for an account, via this screen 1810. Other information 1818, including but not limited to, jurisdictional rules or regulations may also be displayed to the user on this screen 1810.

Figure 18C:
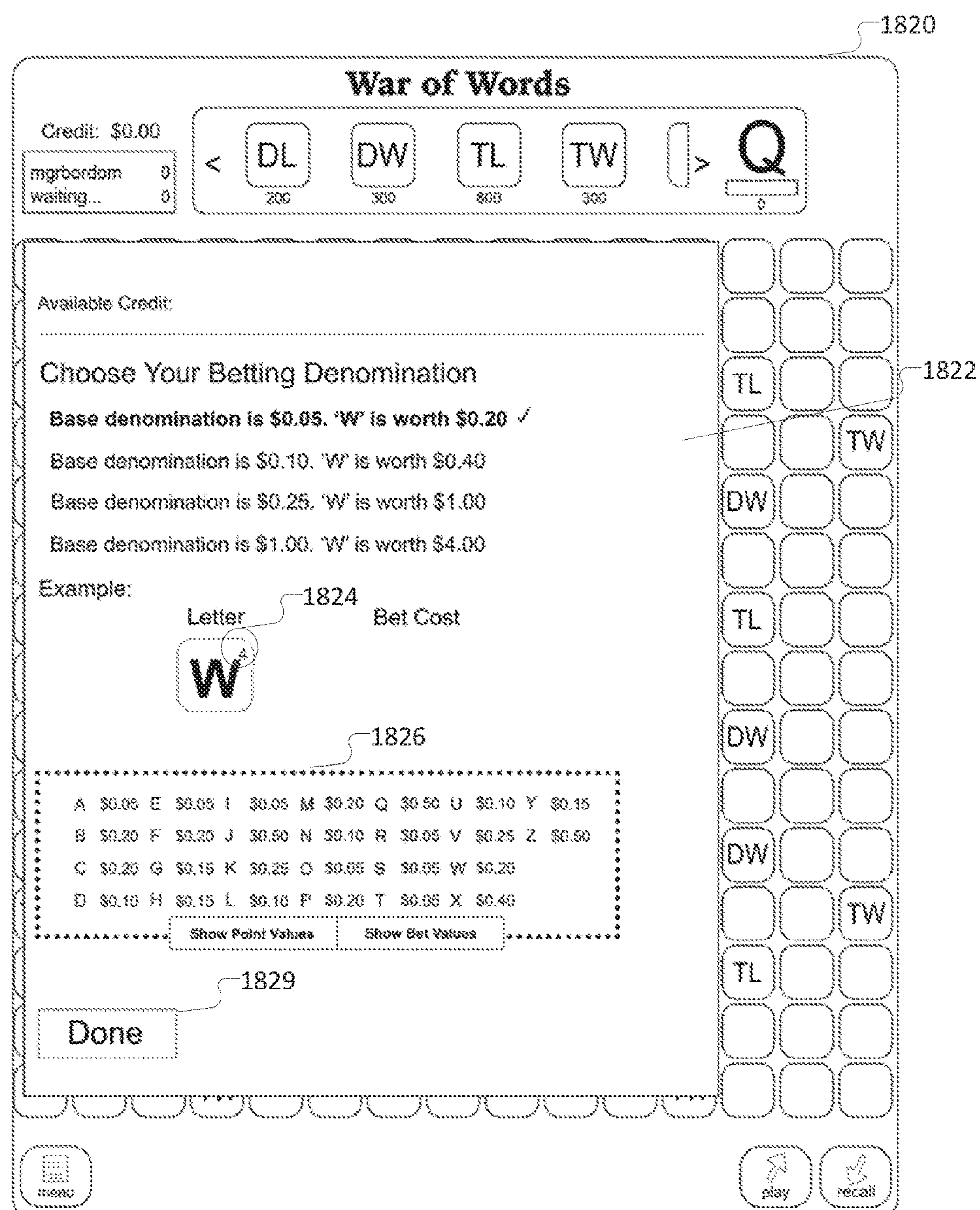
Figure 18D:
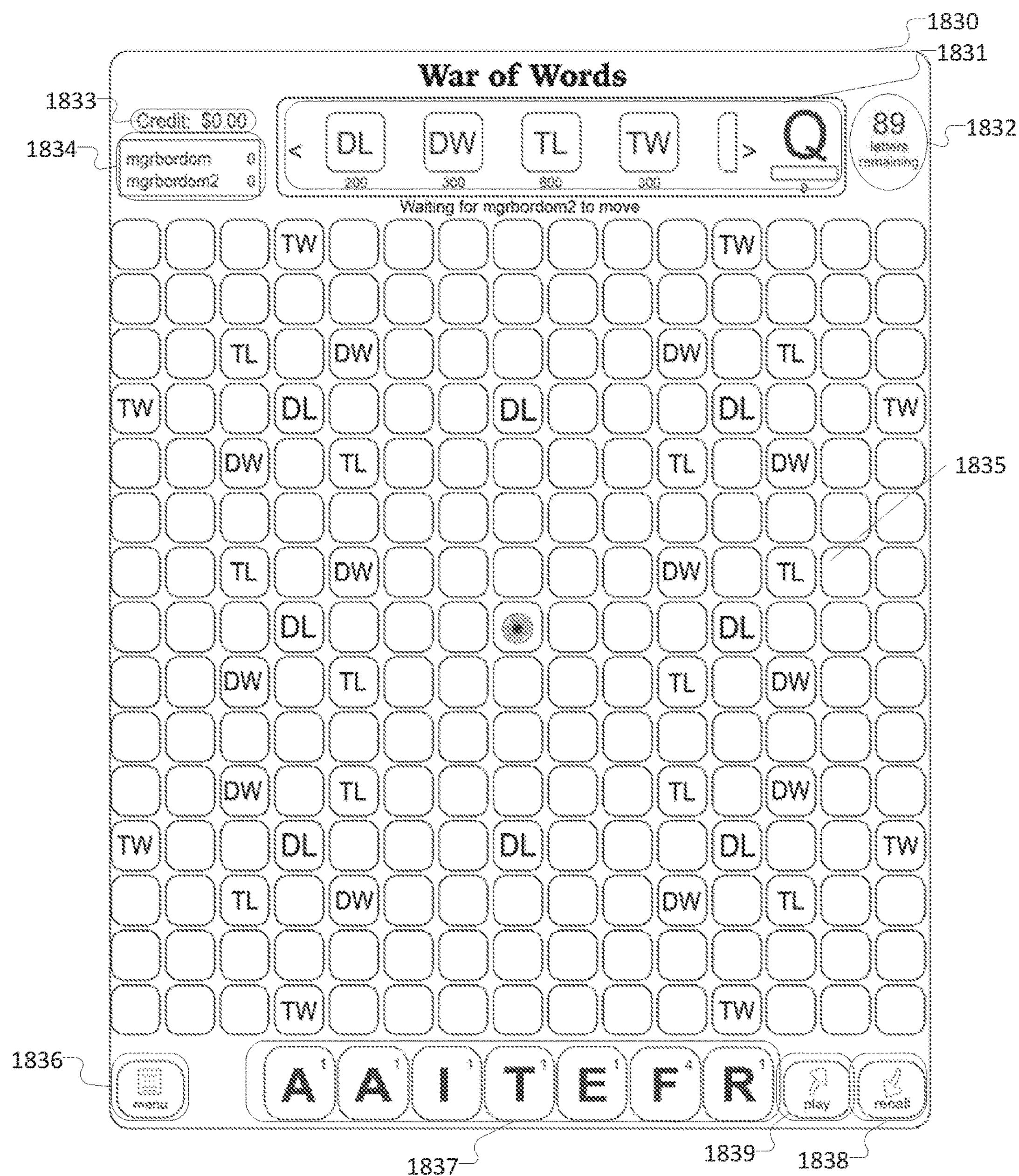

FIG. 18C is an illustration of a denomination setting screen in accordance with an embodiment of the invention. The denomination setting screen 1820 may be used in an embodiment of a intermediate in-game resource hybrid game (HyG) titled "War of Words," which is a Scrabble® type crossword puzzle game. The screen 1820, may include a window 1822, which allows a user to choose the betting denomination for the intermediate in-game resource hybrid game they are about to enter. This window 1822 uses the examples of $0.05, $0.10, $0.25, or $1.00 per point, where points are the values in the corner of each letter tile. The denominations shown are for example only, the denominations available may be set by the operator, casino, regulatory guidelines, etc. As shown in the example in FIG. 18C, if the player selects a base denomination of $0.05, each point on a letter tile would have a wager value of $0.05. A table 1826, is displayed, which can show the RC value of each letter tile, based on the denomination chosen. Once a player is satisfied with the denomination value they have chosen, they may lock-in the denomination value by actuating the done button 1829.

FIG. 18D is an illustration of a game play screen in accordance with an embodiment of the invention.

Screen 1830 may be used in an embodiment of an intermediate in-game resource hybrid game (HyG) titled "War of Words," which is a Scrabble® type crossword puzzle game. The screen 1830, represents a game screen at the beginning of play. Elements of the game screen 1830, may include, but are not limited to the following:

A quanta and quanta selector user interface 1831.

An indicator showing the number of tiles available in the unused tile pile 1832.

A display of the RC credit balance 1833.

A display of showing the player and competitor's username and GWC score 1834.

An example of a game board 1835, including example locations of background bonus tiles, such as DL, DW, TL, TW.

A menu button 1836. (FIG. 18H includes menu function details)

Available tiles 1837 for the player to place on the game board and form words.

A recall button 1838, which when activated returns any tiles placed by the player during this turn (prior to activating the play button), returns the tiles to the available tiles 1837 area at the bottom of the screen.

A play button 1839, which submits the player's word, for play and wagering.

Figure 18E:
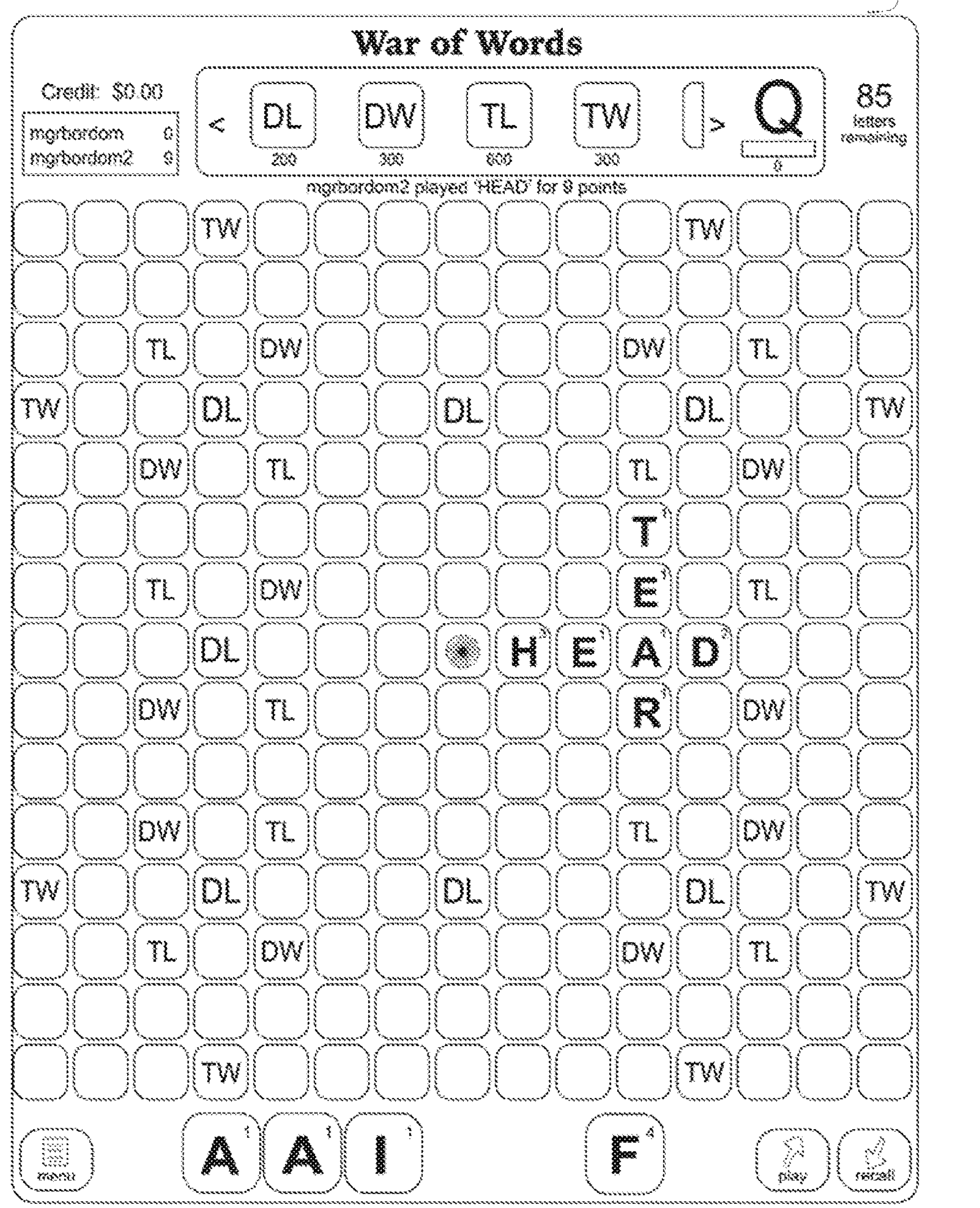

FIG. 18E is an illustration of another game play screen in accordance with an embodiment of the invention. Screen 1840 may be used in an embodiment of an intermediate in-game resource hybrid game (HyG) titled "War of Words," which is a Scrabble® type crossword puzzle game. The screen 1840 is an example of a game that is in progress, the player's opponent has played the word, "HEAD," for a total of 9 points of GWC. The player has placed the letters T E and R, from their available letters, to form the word, "TEAR."

Figure 18F:
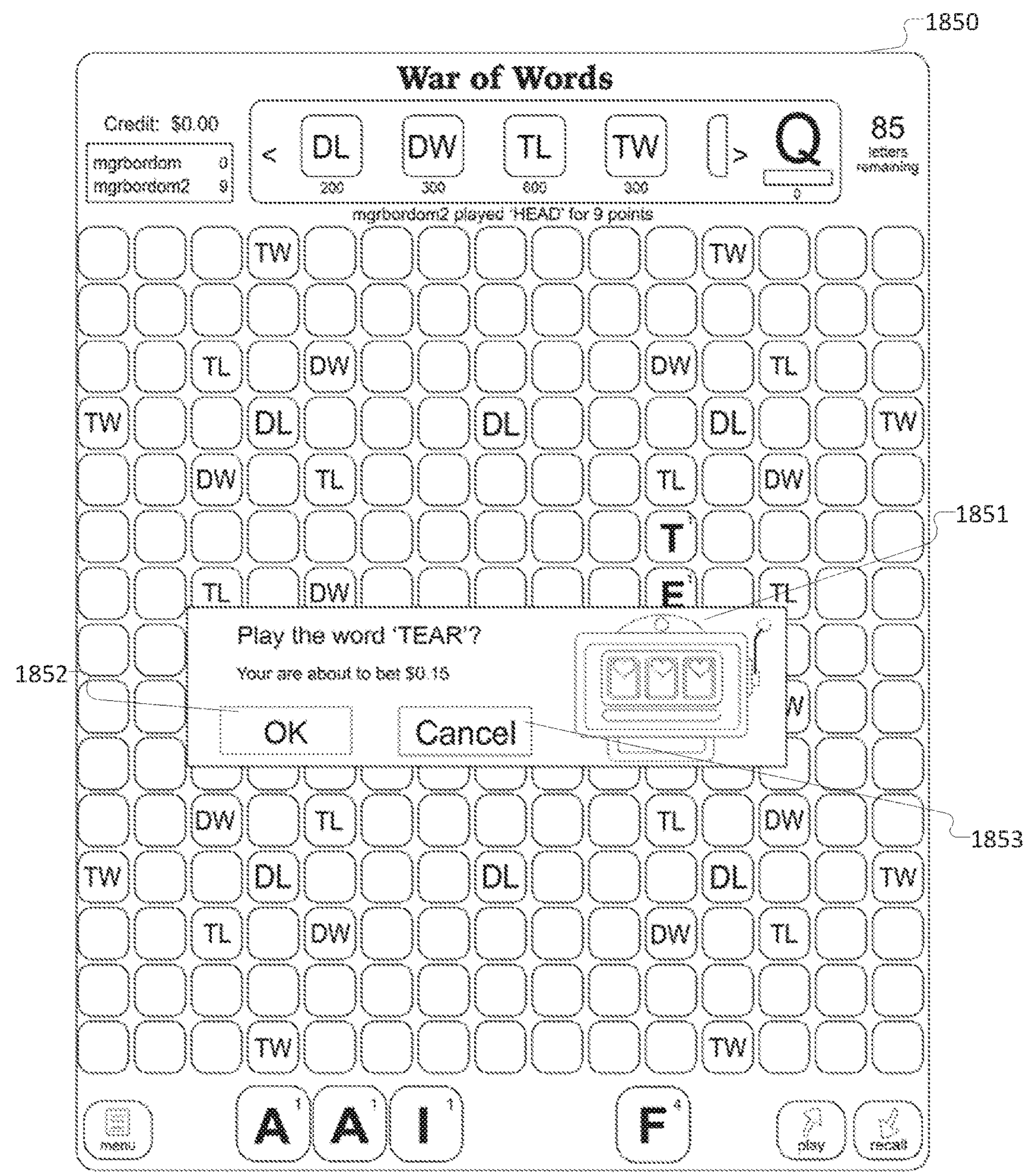
Figure 18G:
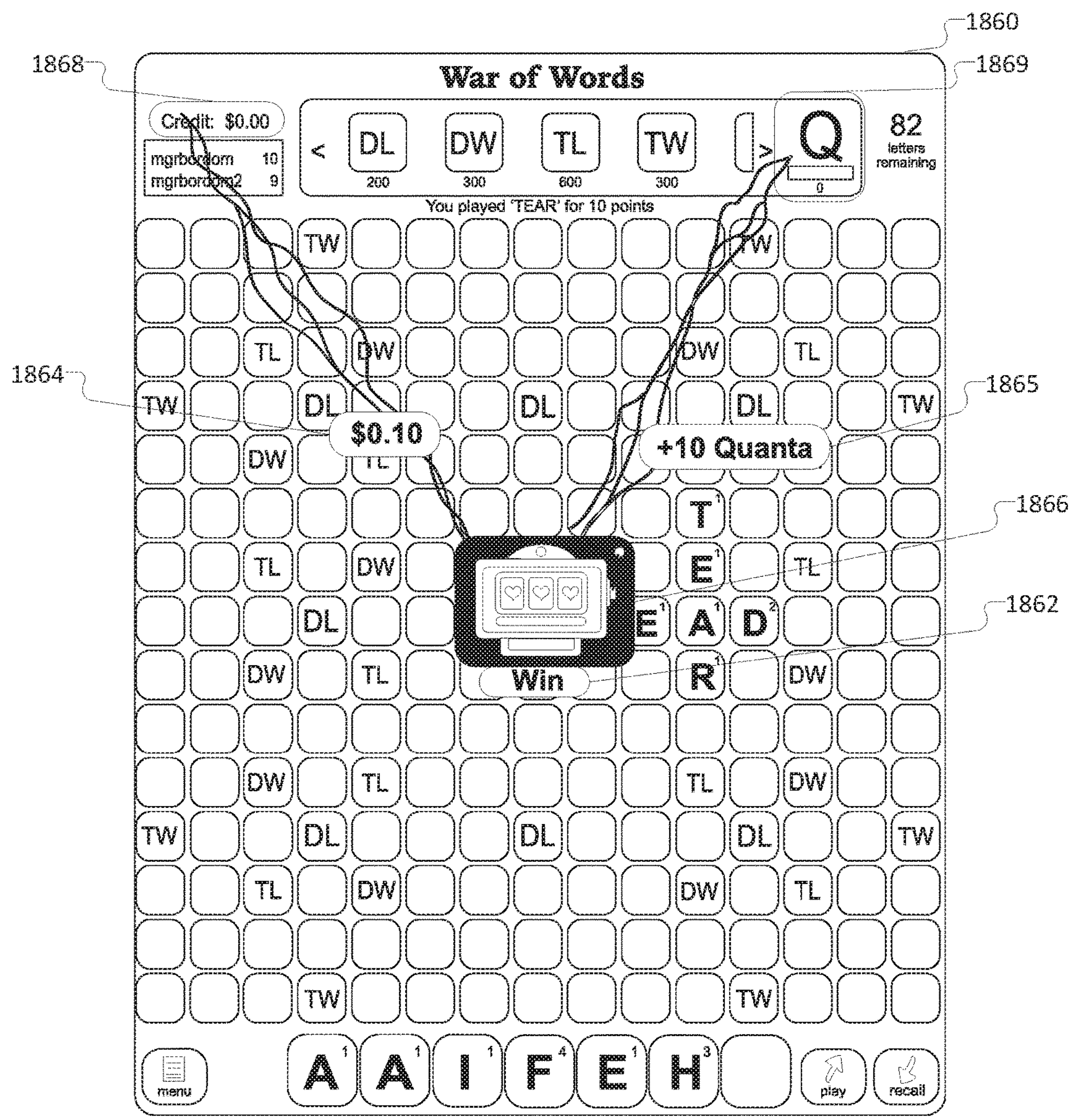
Figure 18H:
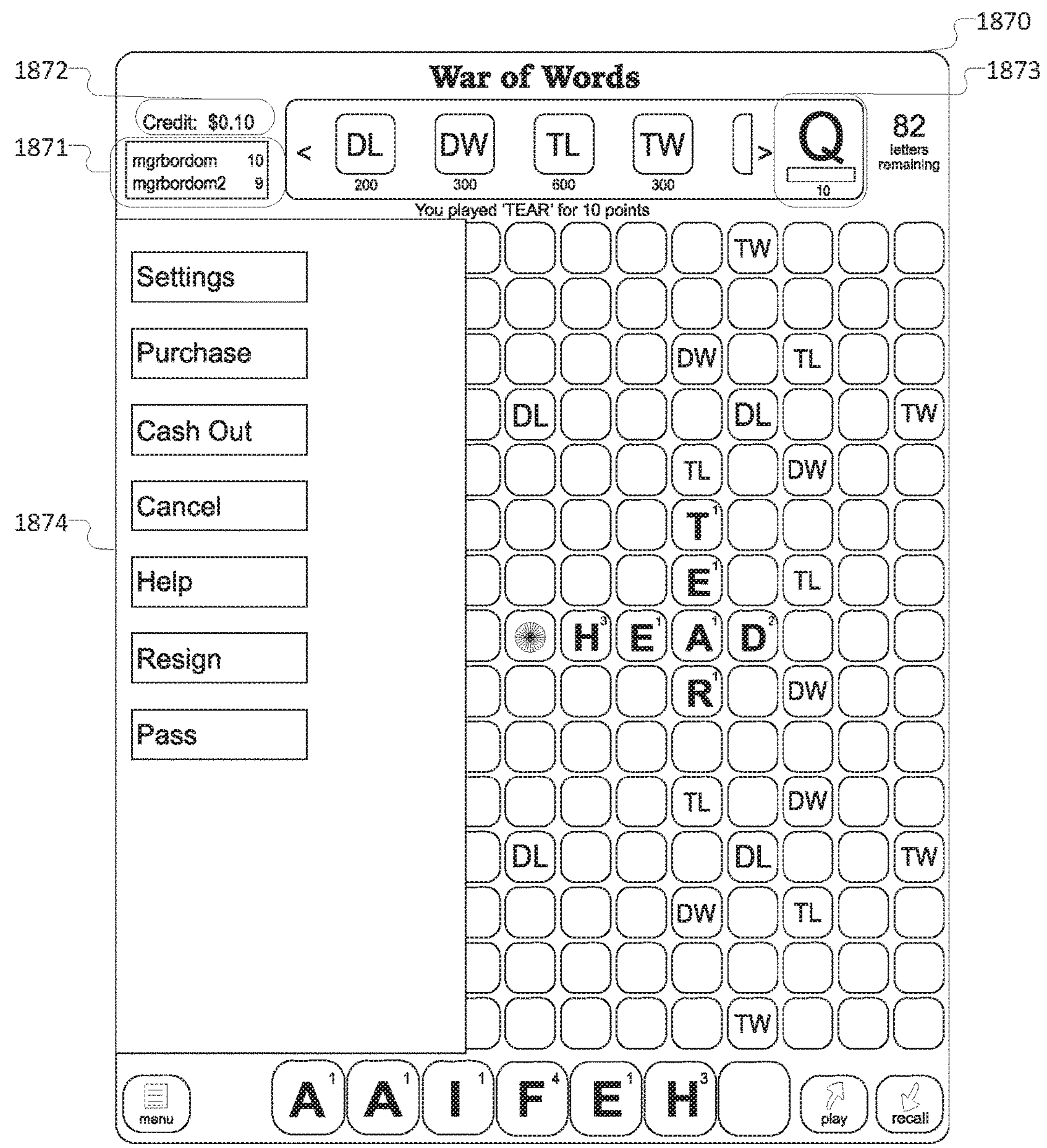

FIG. 18F is an illustration of another game play screen in accordance with an embodiment of the invention. Screen 1850 may be used in an embodiment of an intermediate in-game resource hybrid game (HyG) titled "War of Words," which is a Scrabble® type crossword puzzle game. The screen 1850, features a pop-up window 1851, which verifies the word (TEAR) that the player has submitted, as well as the amount which will be wagered, when this word is played. The player has the option to confirm the play, by actuating the OK button 1852, or cancel the play and the wager, but actuating the cancel button 1853.

FIG. 18F is an illustration of another game play screen in accordance with an embodiment of the invention. Screen 1860 may be used in an embodiment of an intermediate in-game resource hybrid game (HyG) titled "War of Words," which is a Scrabble® type crossword puzzle game. The screen 1860, is showing a win 1862, in which RC 1864 and quanta 1865 are paid out. In the on-screen animation, the RC 1864 and quanta 1865 winnings float up from the slot machine 1866 and are added to the total RC 1868 and total quanta 1869 respectively. The result of the can be seen in FIG. 18H.

FIG. 18H is an illustration of another game play screen in accordance with an embodiment of the invention. Screen 1870 may be used in an embodiment of an intermediate in-game resource hybrid game (HyG) titled "War of Words," which is a Scrabble® type crossword puzzle game. The screen 1870 shows the updated GWC score, to reflect the player's play of the word, "TEAR," as well as the updated RC total 1872 and quanta total 1873. On this screen 1870, the player has invoked the menu function, causing the menu window to appear at the left side of the screen. The menu may offer the player functions that include, but are not limited to settings, purchase, cash out, cancel, help, resign, and/or pass.

Although certain specific embodiments of a gaming system have been described herein, many additional modifications and variations would be apparent to those skilled in the art. For example, the features of the various embodiments described herein may be implemented independently, cooperatively or alternatively without deviating from the spirit of the disclosure. It is therefore to be understood that the gaming system may be practiced otherwise than as specifically described. Thus, the foregoing description of the gaming system should be considered in all respects as illustrative and not restrictive, the scope of any claims to be determined as supported by this disclosure and the claims' equivalents, rather than the foregoing description.

What is claimed is:

1. An electronic gaming machine constructed to receive real credits from a user, comprising:

a real world engine connected to a game world engine, wherein the real world engine is constructed to:

provide a gambling proposition, whereof the gambling proposition is configured to provide a randomly generated payout for a wager of an amount of credits;

receive from the game world engine, gameplay gambling event occurrences, wherein the gambling event occurrences are based upon a player's skillful execution of an entertainment game that triggers the wager of the amount of credits of the gambling proposition and generation of the randomly generated payout for the gambling proposition for the wager of the amount of credits;

determine, an outcome of a gambling event using a random number generator;

communicate, to the game world engine, the outcome of the gambling event;

an entertainment system engine connected to the game world engine, wherein the entertainment system engine is constructed to:

execute the entertainment game providing the outcome upon the player's skillful execution of the entertainment game, wherein the entertainment game includes a quanta selector user interface that displays on a user output device a selection of a plurality of elements for the entertainment game, the quanta selector user interface allowing the player to select between the plurality of elements based on the outcome of the gambling event;

communicate, to the game world engine, gameplay gambling event occurrences, wherein the gambling event occurrences are based upon the player's skillful execution of the entertainment game that trigger the wager of the amount of credits of the gambling proposition and generation of the randomly generated payout for the gambling proposition for the wager of the amount of credits;

receive, from the game world engine, the outcome of the gambling event;

receive, from the game world engine, an amount of quanta to allocate; and the game world engine connecting the entertainment system engine to the real world engine, wherein the game world engine is constructed to:

manage the entertainment game;

receive, from the entertainment system engine, gameplay gambling event occurrences, wherein the gambling event occurrences are based upon the player's skillful execution of the entertainment game that trigger the wager of the amount of credits of the gambling proposition and generation of the randomly generated payout for the gambling proposition for the wager of the amount of credits communicate, to the real world engine, gameplay gambling event occurrences received from the entertainment system engine to the real world engine, wherein the gambling event occurrences are based upon the player's skillful execution of the entertainment game that trigger the wager of the amount of credits of the gambling proposition and generation of the randomly generated payout for the gambling proposition for the wager of the amount of credits;

receive, from the real world engine, the outcome of the gambling event;

communicate, to the entertainment system engine, the outcome of the gambling event;

determine the amount of quanta to award the player based on the outcome of the gambling event and a quanta pay table distinct from a pay table utilized of the gambling proposition, wherein quanta is an intermediate in-game resource used to provide the plurality of entertainment game in-game elements; and communicate, to the entertainment system engine, the amount of quanta to allocate.

2. The electronic gaming machine of claim 1, wherein the entertainment system engine is further constructed to display a plurality of indicators of the plurality entertainment game in-game elements, the plurality of indicators displayed to indicate an availability of the plurality entertainment game in-game elements for selection on a basis of the amount of the quanta awarded to the player.

3. The electronic gaming machine of claim 2, wherein the entertainment system engine is further constructed to gray-out the plurality of indicators in inverse proportion to the amount of quanta.

4. The electronic gaming machine of claim 1, wherein the game world engine is further constructed to allocate the quanta to enabled elements.

5. The electronic gaming machine of claim 1, wherein the game world engine is further constructed to convert the quanta to actionable elements.

6. The electronic gaming machine of claim 1, wherein the game world engine is further constructed to issue quanta even when the outcome of the gambling event issues no real credit.

7. An electronic gaming machine constructed to receive real credits from a user, comprising:

an entertainment system engine connected to a game world engine, wherein the entertainment system engine is constructed to:

execute an entertainment game providing an outcome upon a player's skillful execution of the entertainment game, wherein the entertainment game includes a quanta selector user interface that displays on a user output device a selection of a plurality of elements for the entertainment game, the quanta selector user interface allowing the player to select between the plurality of elements based on the outcome of a gambling event;

communicate, to the game world engine, gameplay gambling event occurrences, wherein the gambling event occurrences are based upon the player's skillful execution of the entertainment game that trigger a wager of an amount of credits in a gambling proposition and generation of a randomly generated payout for the gambling proposition for the wager of the amount of credits;

receive, from the game world engine, the outcome of the gambling event;

receive, from the game world engine, an amount of quanta to allocate; and the game world engine connecting the entertainment system engine to a real world engine, wherein the game world engine is constructed to:

manage the entertainment game;

receive, from the entertainment system engine, gameplay gambling event occurrences, wherein the gambling event occurrences are based upon the player's skillful execution of the entertainment game that trigger the wager of the amount of credits of the gambling proposition and generation of the randomly generated payout for the gambling proposition for the wager of the amount of credits communicate, to the real world engine, gameplay gambling event occurrences received from the entertainment system engine to the real world engine, wherein the gambling event occurrences are based upon the player's skillful execution of the entertainment game that trigger the wager of the amount of credits of the gambling proposition and generation of the randomly generated payout for the gambling proposition for the wager of the amount of credits;

receive, from the real world engine, the outcome of the gambling event based on the output of a random number generator;

communicate, to the entertainment system engine, the outcome of the gambling event;

determine the amount of quanta to award the player based on the outcome of the gambling event and a quanta pay table distinct from a pay table utilized of the gambling proposition, wherein quanta is an intermediate in-game resource used to provide the plurality of entertainment game in-game elements; and communicate, to the entertainment system engine, the amount of quanta to allocate.

8. The electronic gaming machine of claim 7, wherein the entertainment system engine is further constructed to display a plurality of indicators of the plurality entertainment game in-game elements, the plurality of indicators displayed to indicate an availability of the plurality entertainment game in-game elements for selection on a basis of the amount of the quanta awarded to the player.

9. The electronic gaming machine of claim 8, wherein the entertainment system engine is further constructed to gray-out the plurality of indicators in inverse proportion to the amount of quanta.

10. The electronic gaming machine of claim 7, wherein game world engine is further constructed to allocate the quanta to enabled elements.

11. The electronic gaming machine of claim 7, wherein the game world engine is further constructed to convert the quanta to actionable elements.

12. The electronic gaming machine of claim 7, wherein the game world engine is further constructed to issue quanta even when the outcome of the gambling event issues no real credit.

13. An electronic gaming machine constructed to receive real credits from a user, comprising:

a real world engine connected to a game world engine, wherein the real world engine is constructed to:

provide a gambling proposition, whereof the gambling proposition is configured to provide a randomly generated payout for a wager of an amount of credits;

receive from the game world engine, gameplay gambling event occurrences, wherein the gambling event occurrences are based upon a player's skillful execution of an entertainment game that triggers the wager of the amount of credits of the gambling proposition and generation of the randomly generated payout for the gambling proposition for the wager of the amount of credits;

determine an outcome of a gambling event using a random number generator;

communicate, to the game world engine, the outcome of the gambling event; and the game world engine connecting a entertainment system engine to the real world engine, wherein the game world engine is constructed to:

manage the entertainment game;

receive, from the entertainment system engine, gameplay gambling event occurrences, wherein the gambling event occurrences are based upon the player's skillful execution of the entertainment game using a user input device that triggers the wager of the amount of credits of the gambling proposition and generation of the randomly generated payout for the gambling proposition for the wager of the amount of credits;

communicate, to the real world engine, gameplay gambling event occurrences received from the entertainment system engine to the real world engine, wherein the gambling event occurrences are based upon the player's skillful execution of the entertainment game that trigger the wager of the amount of credits of the gambling proposition and generation of the randomly generated payout for the gambling proposition for the wager of the amount of credits;

receive, from the real world engine, the outcome of the gambling event;

communicate, to the entertainment system engine, the outcome of the gambling event;

determine the amount of quanta to award the player based on the outcome of the gambling event and a quanta pay table distinct from a pay table utilized of the gambling proposition, wherein quanta is an intermediate in-game resource used to provide the plurality of entertainment game in-game elements; and communicate, to the entertainment system engine, the amount of quanta to allocate.

14. The electronic gaming machine of claim 13, wherein the entertainment system engine is further constructed to display a plurality of indicators of the plurality entertainment game in-game elements, the plurality of indicators displayed to indicate an availability of the plurality entertainment game in-game elements for selection on a basis of the amount of the quanta awarded to the player.

15. The electronic gaming machine of claim 14, wherein the entertainment system engine is further constructed to gray-out the plurality of indicators in inverse proportion to the amount of quanta.

16. The electronic gaming machine of claim 13, wherein the game world engine is further constructed to allocate the quanta to enabled elements.

17. The electronic gaming machine of claim 13, wherein the game world engine is further constructed to convert the quanta to actionable elements.

18. The electronic gaming machine of claim 13, wherein the game world engine is further constructed to issue quanta even when the outcome of the gambling event issues no real credit.

* * * * *